United States Patent
Tokuchi

(10) Patent No.: US 10,922,029 B2
(45) Date of Patent: *Feb. 16, 2021

(54) INFORMATION PROCESSING DEVICE AND NON-TRANSITORY COMPUTER READABLE MEDIUM

(71) Applicant: FUJI XEROX CO.,LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 138 days.

This patent is subject to a terminal disclaimer.

(21) Appl. No.: 15/965,983

(22) Filed: Apr. 30, 2018

(65) Prior Publication Data

US 2019/0079704 A1 Mar. 14, 2019

(30) Foreign Application Priority Data

Sep. 11, 2017 (JP) .............................. JP2017-174222

(51) Int. Cl.
| | | |
|---|---|---|
| *G06F 3/0482* | (2013.01) | |
| *G06F 3/12* | (2006.01) | |
| *H04L 12/58* | (2006.01) | |
| *H04L 29/08* | (2006.01) | |
| *H04L 29/06* | (2006.01) | |

(52) U.S. Cl.
CPC .......... *G06F 3/1204* (2013.01); *G06F 3/0482* (2013.01); *G06F 3/1226* (2013.01); *G06F 3/1232* (2013.01); *G06F 3/1259* (2013.01); *G06F 3/1288* (2013.01); *H04L 51/02* (2013.01); *H04L 51/20* (2013.01); *H04L 67/18* (2013.01); *H04L 67/38* (2013.01)

(58) Field of Classification Search
CPC ................... G06F 2203/04803; G06F 3/04886
See application file for complete search history.

(56) References Cited

U.S. PATENT DOCUMENTS

| | | | |
|---|---|---|---|
| 2007/0156805 A1 | 7/2007 | Bristol et al. | |
| 2014/0143404 A1* | 5/2014 | Kennedy | H04L 67/18 709/224 |
| 2014/0251987 A1* | 9/2014 | Reay | H05B 6/6447 219/756 |
| 2014/0280288 A1* | 9/2014 | Hwang | G06F 16/332 707/766 |
| 2016/0174035 A1* | 6/2016 | Hughes | H04M 1/72533 455/456.3 |
| 2016/0294581 A1* | 10/2016 | So | H04L 25/03019 |
| 2016/0301543 A1* | 10/2016 | Minezawa | H04W 68/005 |
| 2017/0068507 A1* | 3/2017 | Kim | G06F 3/04817 |
| 2017/0336926 A1* | 11/2017 | Chaudhri | G06F 3/04817 |

FOREIGN PATENT DOCUMENTS

JP 2009522687 6/2009

* cited by examiner

*Primary Examiner* — Rayeez R Chowdhury
(74) *Attorney, Agent, or Firm* — JCIPRNET

(57) ABSTRACT

An information processing device includes a controller that changes, depending on a position of a user, display of a conversation partner who is responding in an interface for the user to make a conversation with the conversation partner. In a further modification of the invention, depending on a positional relationship between the user and a partner, the controller may change the display of the conversation partner who is responding, to display of the partner.

16 Claims, 26 Drawing Sheets

FIG.5

<DEVICE FUNCTION MANAGEMENT TABLE>

| DEVICE ID | DEVICE NAME (TYPE) | FUNCTION | IMAGE ID |
|---|---|---|---|
| A | PC | DISPLAY FUNCTION, SAVING FUNCTION, ... | ... |
| B | MULTIFUNCTION DEVICE | PRINT FUNCTION, SCAN FUNCTION, COPY FUNCTION, FACSIMILE FUNCTION, POST-PROCESSING FUNCTION, ... | ... |
| C | PROJECTOR | PROJECTION FUNCTION, ... | ... |
| ... | ... | ... | ... |

FIG.6

<LINKAGE FUNCTION MANAGEMENT TABLE>

| DEVICE ID COMBINATION | DEVICE NAME (TYPE) | LINKAGE FUNCTION |
|---|---|---|
| A, B | PC (A), MULTIFUNCTION DEVICE (B) | SCAN TRANSFER FUNCTION |
| | | PRINT FUNCTION |
| A, C | PC (A), PROJECTOR (C) | PROJECTION FUNCTION |
| | | PRINT FUNCTION |
| B, C | MULTIFUNCTION DEVICE (B), PROJECTOR (C) | PROJECTION FUNCTION |
| | | PRINT FUNCTION |
| ... | ... | ... |

FIG.17

<LINKAGE FUNCTION MANAGEMENT TABLE>

| FUNCTION ID COMBINATION | FUNCTION NAME (TYPE) | LINKAGE FUNCTION |
|---|---|---|
| α, β | DATA TRANSMITTING (α), PASSWORD SETTING (β) | ... ... |
| α, γ | DATA TRANSMITTING (α), VOICE OUTPUTTING (γ) | ... ... |
| β, γ | PASSWORD SETTING (β), VOICE OUTPUTTING (γ) | ... ... |
| ... | ... | ... |

FIG.20

<LINKAGE FUNCTION MANAGEMENT TABLE>

| ID COMBI-NATION | DEVICE NAME, FUNC-TION NAME (TYPE) | LINKAGE FUNCTION |
|---|---|---|
| A, α | PC (A), DATA TRANSMITTING (α) | ... |
| | | ... |
| A, β | PC (A), PASSWORD SETTING (β) | ... |
| | | ... |
| B, α | MULTIFUNCTION DEVICE (B), DATA TRANSMITTING (α) | ... |
| | | ... |
| ... | ... | ... |

*FIG.24*

<LINKAGE FUNCTION MANAGEMENT TABLE>

| FILE FORMAT COMBINATION | LINKAGE FUNCTION |
|---|---|
| DOCUMENT FORMAT, TABLE FORMAT | ・INSERT TABLE INTO DOCUMENT<br>・INSERT DOCUMENT INTO TABLE |
| DOCUMENT FORMAT, IMAGE FORMAT | ・INSERT IMAGE INTO DOCUMENT<br>・SUPERIMPOSE DOCUMENT ON IMAGE |
| DOCUMENT FORMAT, VIDEO FORMAT | ・INSERT VIDEO INTO DOCUMENT<br>・INSERT STILL IMAGE INTO DOCUMENT |
| DOCUMENT FORMAT, DOCUMENT FORMAT | ・INTEGRATE DOCUMENTS WITH EACH OTHER |
| TABLE FORMAT, TABLE FORMAT | ・INTEGRATE TABLES WITH EACH OTHER |
| VIDEO FORMAT, VIDEO FORMAT, | ・INTEGRATE VIDEOS WITH EACH OTHER |
| SHEET FORMAT, DOCUMENT FORMAT, | ・INSERT DOCUMENT INTO PRESENTATION SHEET |
| ... | ... | ns
INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-174222 filed Sep. 11, 2017.

BACKGROUND

Technical Field

The present invention relates to an information processing device and a non-transitory computer readable medium.

SUMMARY

According to an aspect of the invention, an information processing device includes a controller that changes, depending on a position of a user, display of a conversation partner who is responding in an interface for the user to make a conversation with the conversation partner.

BRIEF DESCRIPTION OF THE DRAWINGS

Exemplary embodiments of the present invention will be described in detail based on the following figures, wherein:

FIG. 5 is a diagram illustrating a device function management table;

FIG. 6 is a diagram illustrating a linkage function management table;

FIG. 17 is a diagram illustrating a linkage function management table;

FIG. 20 is a diagram illustrating a linkage function management table;

FIG. 24 is a diagram illustrating a linkage function management table;

DETAILED DESCRIPTION

First Exemplary Embodiment

Figure 1:
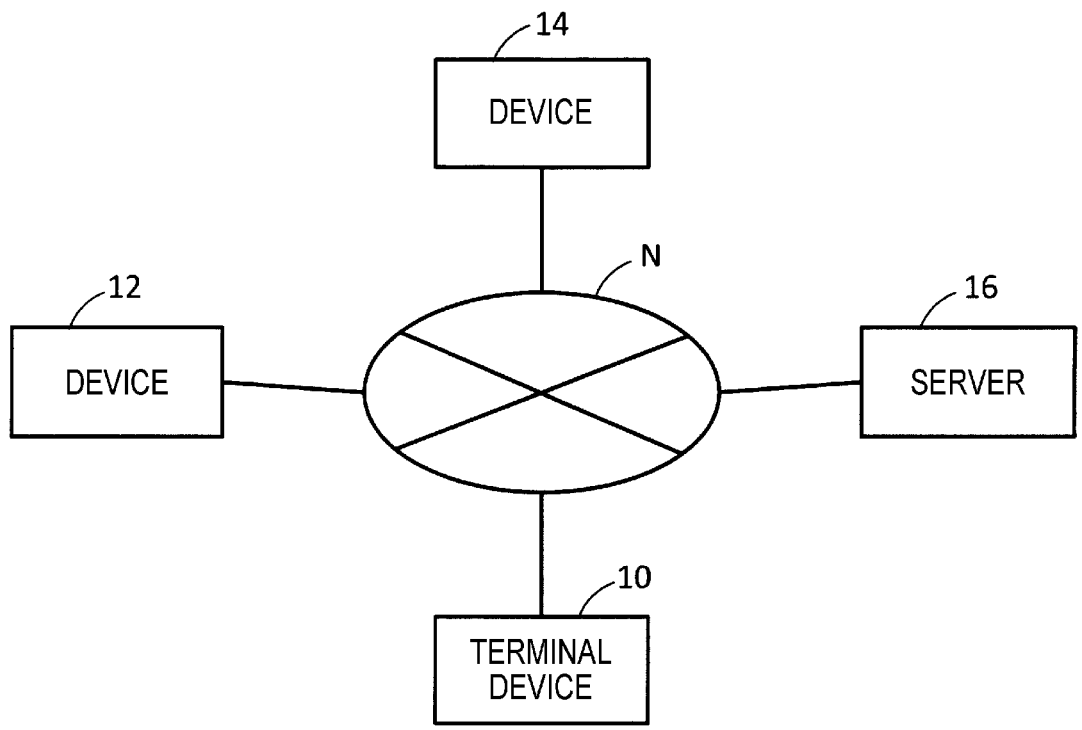
FIG. 1 is a block diagram illustrating a configuration of a device system according to a first exemplary embodiment of the present invention.

A device system as an information processing system according to a first exemplary embodiment of the present invention will be described with reference to FIG. 1. FIG. 1 illustrates an example of the device system according to the first exemplary embodiment.

The device system according to the first exemplary embodiment includes a terminal device 10, devices (for example, devices 12 and 14), and a server 16 as an example of an external device. In the example illustrated in FIG. 1, the terminal device 10, the devices 12 and 14, and the server 16 have a function of communicating with each other via a communication path N such as a network. Of course, the terminal device 10, the devices 12 and 14, and the server 16 may communicate with other devices via different communication paths without using the communication path N. In the example illustrated in FIG. 1, two devices (devices 12 and 14) are included in the device system, but one device or three or more devices may be included in the device system. Further, plural terminal devices 10 and plural servers 16 may be included in the device system. The server 16 may not be included in the device system.

The terminal device 10 is a device such as a personal computer (PC), a tablet PC, a smartphone, a mobile phone, or the like, and has a function of transmitting and receiving data to and from other devices. The terminal device 10 may be a wearable terminal (for example, a wrist watch type terminal, a wristband type terminal, an eyeglass type terminal, a finger ring type terminal, a contact lens type terminal, an intracorporeal implantable terminal, a hearable terminal, or the like). For example, the terminal device 10 functions as a user interface unit (UI unit) when using the device.

The devices 12 and 14 are devices having functions, and examples thereof include an image forming device having an image forming function, a PC, a tablet PC, a smartphone, a mobile phone, a robot (a humanoid robot, an animal robot other than humanoid, etc.), a projector, a display device (a liquid crystal display or the like), a recording device, a reproducing device, an image capturing device (a camera or the like), a refrigerator, a rice cooker, a microwave oven, a coffee maker, a vacuum cleaner, a washing machine, an air conditioner, a lighting device, a clock, a surveillance camera, an automobile, a bicycle, an aircraft (for example, an unmanned aerial vehicle (a so-called drone)), a game machine, and various types of sensing devices (for example, a temperature sensor, a humidity sensor, a voltage sensor, a current sensor, etc.). The devices 12 and 14 may be devices that output an output to a user (for example, an image forming device or a PC), or may be devices that do not output an output to a user (for example, a sensing device). Further, all of the devices in the plural devices that execute linkage functions described below may be devices that output an output to a user. Alternatively, some devices may be devices that output an output to the user and other devices may be devices that do not output any output to the user. Alternatively, all of the devices may be devices that do not output an output to the user. The concept of the devices 12 and 14 may include all kinds of devices. For example, the devices according to the present exemplary embodiment may also include an information device, a video device, an audio device, and other devices. In addition, the devices 12 and 14 have a function of transmitting and receiving data to and from other devices.

The server 16 is a device that manages data, manages user information, and manages the devices 12 and 14. In addition, the server 16 has a function of transmitting and receiving data to and from other devices.

In the terminal device 10, a conversation partner having a function of making a conversation with the user is used. The conversation partner has a function of receiving a message of the user and analyzing the message contents to create a reply such as an answer to the message and provide the reply to the user. For example, the message of the user is performed using character input, voice input, image input, or the like, and the reply such as an answer is performed using character output, voice output, image output, or the like. The conversation partner is implemented by executing, for example, a program, and the program is installed in, for example, the terminal device 10. Of course, the program related to the conversation partner may be installed in an external device such as the server 16, and the function of the conversation partner may be provided to the terminal device 10 from the external device such as the server 16.

The conversation partner is configured with, for example, an automatic response artificial intelligence (AI), which is implemented by AI. The automatic response AI has a function of analyzing message contents of a user and providing a reply such as an answer to the message contents to the user. An automatic response AI may be a chatbot (an automated chatting program using artificial intelligence). An automatic response AI may have a learning function based on artificial intelligence and have an ability to make a determination close to that of a human by the learning function. Further, neural network type deep learning may be used, or reinforcement learning may be used to partially reinforce the learning field. In addition, genetic algorithms, cluster analysis, self-organizing maps, ensemble learning, and the like may be used. Of course, other artificial intelligence techniques may be used.

With the automatic response AI, the user is notified of the functions that each device has, or notified of the linkage functions executable using plural functions, while making a conversation with the automatic response AI. A process of specifying the functions that each device has and the linkage functions may be performed by the terminal device 10 or may be performed by an external device such as the server 16. In the following description, the specifying process is performed by the terminal device 10.

Figure 2:
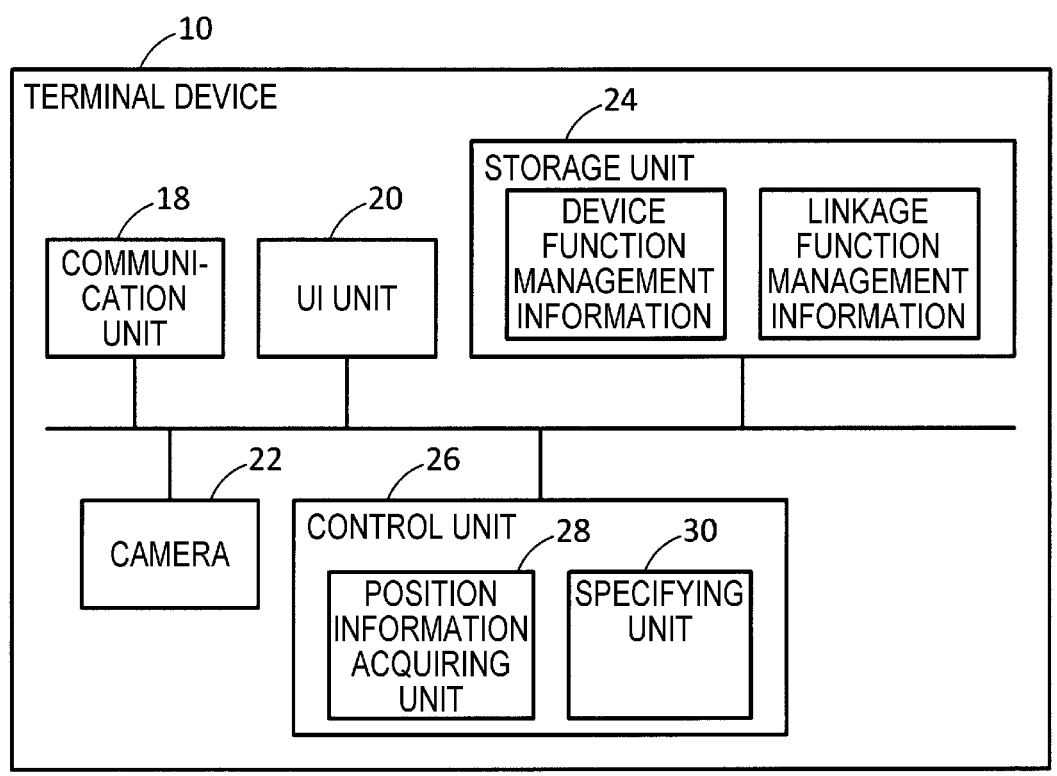
FIG. 2 is a block diagram illustrating a configuration of a terminal device.

Hereinafter, the configuration of the terminal device 10 will be described in detail with reference to FIG. 2.

A communication unit 18 is a communication interface and has a function of transmitting data to another device and a function of receiving data from another device. The communication unit 18 may be a communication interface having a wireless communication function or a communication interface having a wired communication function. For example, the communication unit 18 is compatible with one or plural types of communication methods and may communicate with a communication partner according to a communication method suitable for the communication partner (that is, a communication method with which the communication partner is compatible). The communication method is, for example, infrared communication, visible light communication, Wi-Fi (registered trademark) communication, near-field wireless communication (for example, near field communication (NFC), etc.), and the like. Examples of the near-field wireless communication include Felica (registered trademark), Bluetooth (registered trademark), RFID (Radio Frequency Identifier), and the like. Of course, other types of wireless communication may be used as near-field wireless communication. For example, the communication unit 18 may switch the communication method or the frequency band depending on the communication partner, or switch the communication method or the frequency band depending on the surrounding environment.

A UI unit 20 is a user interface unit and includes a display unit and an operation unit. The display unit is, for example, a display device such as a liquid crystal display. The operation unit is an input device such as a touch panel or a keyboard. Of course, it may be a user interface that serves as a display unit and an operation unit (for example, a touch-type display, a device for electronically displaying a keyboard or the like on a display, etc.). Further, the UI unit 20 may include a voice collecting unit such as a microphone or a voice generating unit such as a speaker. In this case, information may be input to the terminal device 10 by a voice input, or information may be generated by voice.

The display unit of the UI unit 20 displays thereon, for example, an image captured by the camera, a device image associated with a device identified as a device to be used (for example, a device used alone or a device to be linked), a function image associated with a function, and the like. The device image associated with the device may be an image (still image or moving image) representing the device captured by the camera, or may be an image schematically representing the device (for example, an icon). For example, the schematically indicated image data may be created by a control unit 26 of the terminal device 10, may be stored in advance in a storage unit 24 of the terminal device 10, may be stored in the server 16 and provided from the server 16 to the terminal device 10, or may be stored in another device and provided from the other device to the terminal device 10. The function image associated with a function is, for example, an image such as an icon representing the function.

A camera 22 as an image capturing unit generates image data (for example, still image data or moving image data) by capturing an object to be captured. The image is displayed on, for example, a display unit of the UI unit 20. The image displayed on the display unit may be operated by the user. Image data captured by an external camera may be transmitted to the terminal device 10 via a communication path, and the image may be displayed on the display unit of the UI unit 20. Even in this case, the image may be operated by the user.

A storage unit 24 is a storage device such as a hard disk or memory (for example, SSD etc.). The storage unit 24 stores, for example, device function management information, linkage function management information, various data, various programs (for example, an operating system (OS), a program for implementing an automatic response AI (software), various application programs (application software), etc.), information indicating the address of each device (device address information), information indicating the address of the server 16 (server address information), information on the identified device, information on the identified device to be linked, information on functions that the identified device has, information on the linkage functions, and the like. Of course, these may be stored in separate storage devices or may be stored in one storage device. The program for implementing the automatic response AI may be stored in an external device such as the server 16. Thus, when the program itself is executed by the external device, the function of the automatic response AI may be provided from the external device to the terminal device 10. In this case, the program for implementing the automatic response AI may not be stored in the storage unit 24.

Hereinafter, the device function management information and the linkage function management information will be described.

The device function management information is information for managing the functions that respective devices have, and includes, for example, information indicating association between device identification information for identifying a device (device identification information) and function information indicating the function of the device. The device identification information includes, for example, a device ID, a device name, information indicating the type of the device, the model number of the device, information for managing the device (for example, asset management number, etc.), information indicating the location where the device is installed (position information of the device), a device image associated with the device, address information of the device, and the like. The device image is, for example, an external appearance image representing the device. The external appearance image may be an image representing the outside of the device (for example, the casing of the device), an image representing a state where the casing is opened such that the inside thereof is seen from the outside (for example, the internal structure), or an image representing a state where the device is covered with a packaging sheet or the like. The device image may be an image generated by capturing the device (such as an image representing the outside of the device or an image representing the inside), or an image imitating the device (for example, an icon). The function information includes, for example, a function ID, a function name, or the like. For example, when the device 12 is an image forming device and the image forming device has a print function, a scan function, and a copy function, the device identification information of the image forming device has, as an example, function information indicating the print function, function information indicating the scan function, and function information indicating the copy function, which are associated with each other. The functions that each device has are specified (identified) by referring to the device function management information.

The device managed by the device function management information is, for example, a device (for example, the device 12 or 14) included in the device system. Of course, devices not included in the device system may be managed by the device function management information. For example, the terminal device 10 may acquire information on a new device not included in the device system (information including device identification information and function information) and newly register the information in the device function management information. The information on the device may be acquired, for example, by using the Internet or the like, or may be input by an administrator or the like. Further, the terminal device 10 may update the device function management information at any timing, regularly, or at a timing designated by an administrator or the like. Thus, in some cases, function information indicating a function that the device does not have before updating but the device has after updating may be registered in the device function management information. Similarly, in some cases, function information indicating a function that the device has before updating but the device does not have after updating may be deleted from or registered as unusable information in the device function management information. The information for updating may be acquired, for example, using the Internet or the like, or may be input by an administrator or the like. Of course, the terminal device 10 itself may not perform acquisition of information on the device and generation or update of the device function management information, and an external device such as the server 16 may perform the acquisition of information on the device and the generation or update of the device function management information. In this case, the device function management information generated or updated by the external device is transmitted from the external device to the terminal device 10, and is stored in the storage unit 24.

The linkage function management information is information for managing linkage functions executed by linking plural functions to each other. When plural functions are linked to each other, one or plural linkage functions are executed. For example, the linkage functions may be functions executable by linking plural functions that a single device has (for example, the device 12) to each other, or functions executable by linking plural functions that plural devices (for example, the devices 12 and 14) have to each other. Further, the terminal device 10 issuing the operation instruction may also be used as a device to be linked, and the function that the terminal device 10 has may also be used as a part of the linkage functions.

The linkage function may be a function executed without using a device as hardware. For example, the linkage function may be a function executed by linking plural software to each other. Of course, the linkage function may be a function executed by linking the function that the device has as hardware and the function implemented by software to each other.

The linkage function management information is information indicating, for example, association between a combination of function information indicating each function used in the linkage function and linkage function information indicating the linkage function. The linkage function information includes, for example, a linkage function ID, a linkage function name, or the like. When a solo function is updated, the linkage function management information is also updated along with the update. As a result, the linkage function by plural functions that are unable to be linked to each other before updating becomes usable after updating, and on the contrary to this, the linkage function that is usable before updating become unusable after updating. The linkage function information indicating the linkage function that becomes usable after updating is registered in the linkage function management information, and the linkage function information indicating the linkage function that became unusable after updating is deleted from or registered as unusable information in the device function management information. The update of the linkage function management information may be performed by the terminal device 10 or may be performed by an external device such as the server 16. When the update of the linkage function management information is executed by an external device, the updated linkage function management information is transmitted from the external device to the terminal device 10, and is stored in the storage unit 24.

In the case of linking plural devices to each other, for example, the linkage function management information is information for managing a linkage function that uses plural functions that plural devices have, and is information indicating association between the combination of the device identification information for identifying each device used for the linkage function and the linkage function information. Further, in a case of linking a device that has plural output functions (a device that outputs an output to a user and has plural output functions) and a sensing device that does not have an output function (a device that does not output any output to a user), the linkage function management information may include information indicating a combination of specific sensing device with a specific output function of the plural output functions. Therefore, the output function used in combination with a specific sensing device is specified from among the plural output functions. As described above, when the device function management information is updated, the linkage function management information is also updated along with the update. As a result, the linkage function by plural devices that are unable to be linked to each other before updating becomes usable after updating, and on the contrary to this, the linkage function that is usable before updating become unusable after updating.

The linkage function may be a function executable by linking plural functions, which are different from each other, to each other, or by linking the same functions to each other. The linkage function may be a function that is unusable before the linkage. The function that is unusable before the linkage may be a function that is usable by using the same function among the functions that a device to be linked has or that is usable by combining different functions. For example, when a device having a print function (printer) and a device having a scan function (scanner) are linked to each other, a copy function is implemented as a linkage function. That is, the copy function is implemented by linking the print function and the scan function to each other. In this case, the copy function as a linkage function and a combination of the print function and the scan function are associated with each other. In the linkage function management information, for example, linkage function information indicating the copy function as a linkage function is associated with a combination of device identification information for identifying a device having a print function and device identification information for identifying a device having a scan function.

The concept of the linkage function may include a coalescing function enabling a new function to be executed by linking plural functions or plural devices to each other. For example, an extended display function may be implemented as a coalescing function by combining plural displays. As another example, a recording function may be implemented as a coalescing function by combining a television and a recorder. The recording function may be a function of recording an image displayed on the television. In addition, a capturing area extension function may be implemented as a coalescing function by combining plural cameras. The extension function is, for example, a function of capturing by connecting the capturing areas of the respective cameras. In addition, a translated call function (a function of translating a conversation via a telephone) may be implemented as a coalescing function by combining a telephone with a translator or translation software. As described above, the concept of the linkage function includes a function that may be implemented by linking the same types of devices or functions to each other and a function that may be implemented by linking different types of devices or functions to each other.

A control unit 26 controls the operation of each unit of the terminal device 10. The control unit 26 controls communication, for example, by the communication unit 18, and controls display of information on the display unit of the UI unit 20. Further, the control unit 26 includes a position information acquiring unit 28 and a specifying unit 30.

The position information acquiring unit 28 has a function of acquiring information (position information) indicating the positions of the terminal device 10 and each device (for example, each of the devices 12 and 14) by using, for example, a global positioning system (GPS). The position information of the device includes device identification information for identifying the device.

The specifying unit 30 has a function of specifying functions that a device has or linkage functions executable using plural devices. The specifying unit 30 is implemented by, for example, the automatic response AI. Of course, the specifying unit 30 may be implemented by another program or the like, instead of being implemented by the automatic response AI.

The specifying unit 30 receives device identification information for identifying a device designated by a user and specifies function information indicating a function associated with the device identification information in the device function management information stored in the storage unit 24. Therefore, the function that the device has is specified (identified).

Further, the specifying unit 30 may receive device identification information included in the position information acquired by the position information acquiring unit 28 and specify function information indicating the function associated with the device identification information in the device function management information. For example, the specifying unit 30 specifies the positional relationship between the terminal device 10 (the user) and the device based on the position information of the terminal device 10 and the position information of the device. When the positional relationship falls within a predefined specific positional relationship, the specifying unit 30 may specify the function that the device has based on the device identification information included in the position information of the device and the device function management information. For example, when the terminal device 10 exists in a predetermined area including the device, the specifying unit 30 specifies the function that the device has.

The control unit 26 controls notification (guidance) of information on the function specified by the specifying unit 30 (for example, function information, function explanation information, and the like). As the notification, the control unit 26 may cause the display unit of the UI unit 20 to display the information on the function, or may use a speaker or the like to generate information on the function as voice information. Further, the control unit 26 may control the execution of the function. Further, the designation of the device by the user may be performed on the screen of the display unit of the UI unit 20, or may be performed by voice. For example, when an image associated with a device is displayed on the screen of the UI unit 20, the user may designate the device by designating the image on the screen. As another example, the user may designate the device by voice, regardless of whether or not an image associated with the device is displayed on the screen of the UI unit 20. For example, when the user issues a device name by voice, the voice is collected by a voice collecting unit such as a microphone, and voice information indicating the device name is input to the terminal device 10. The specifying unit 30 determines that the device having the device name is designated by the user and specifies the function. In this manner, the device designating operation and the function notification may be performed by on-screen display or by voice. The on-screen display and the voice may be combined. For example, the device may be designated by the user's designation of an image associated with the device on the screen, and information indicating the function may be displayed on the screen. As another example, the device may be designated by the user's designation of an image associated with the device on the screen, and information indicating a function may be generated by voice. As still another example, the device may be designated by inputting the device name to the terminal device 10 as voice information, and information indicating a function may be displayed on the screen. As yet another example, the device may be designated by inputting the device name to the terminal device 10 as voice information, and information indicating a function may be generated by voice.

The process of specifying the function may be performed by the server 16. In this case, the device identification information is transmitted from the terminal device 10 to the server 16, and the specifying unit 30 provided in the server 16 specifies function information indicating a function associated with the device identification information. In the case where the specifying process is performed by the server 16, the device function management information is stored in the server 16. The information on the function may be transmitted from the server 16 to the terminal device 10 and displayed on the display unit of the UI unit 20 or generated as voice information.

Further, the specifying unit 30 receives the device identification information for identifying respective devices to be linked and specifies linkage function information indicating a linkage function associated with a combination of respective device identification information in the linkage function management information stored in the storage unit 24. Therefore, the linkage function executable by linking the functions that the respective devices to be linked have is specified (identified). The control unit 26 controls notification (guidance) of information on the specified linkage function (for example, linkage function information, linkage function explanation information, and the like). The control unit 26 may cause the display unit of the UI unit 20 to display the information on the linkage function, or may generate information on the linkage function as voice information. Similarly, the designation of each device to be linked may be performed on the screen or by voice.

The specifying unit 30 may receive the device identification information included in the position information of each device and specify the linkage function based on each device identification information and the linkage function management information.

The process of specifying the linkage function may be performed by the server 16. In this case, plural pieces of device identification information are transmitted from the terminal device 10 to the server 16, and the specifying unit 30 provided in the server 16 specifies linkage function information indicating linkage functions associated with the plural pieces of device identification information. In the case where the specifying process is performed by the server 16, the linkage function management information is stored in the server 16. The information on the linkage functions may be transmitted from the server 16 to the terminal device 10 and displayed on the display unit of the UI unit 20 or generated as voice information.

For example, when one device is designated, a function that the device has is specified, and when plural devices are designated, a linkage function executable using the plural devices is specified.

Further, the specifying unit 30 may receive function information indicating respective functions used for the linkage function and specify the linkage function information indicating the linkage function associated with a combination of respective function information in the linkage function management information. Therefore, the linkage function executable by linking the respective functions to be linked is specified (identified). The specifying process is also performed by the server 16, and the process result may be displayed on the display unit of the UI unit 20 or may be generated as voice information.

For example, the device is designated as the user transmits the device information to the automatic response AI. When the user transmits information of plural devices to the automatic response AI, the specifying unit 30 identifies the plural devices as devices to be linked and specifies the linkage functions executable using the plural devices. Further, when the user transmits information of one device to the automatic response AI, the specifying unit 30 identifies the device and specifies the function that the device has. The information of the device is device identification information for identifying the device, and examples thereof include a device image associated with the device, character information or voice information indicating the device identification information, and the like. For example, when a user transmits a device image associated with a device to an automatic response AI, or when a user inputs a character string indicating device identification information of the device into the terminal device 10 and gives it to the automatic response AI, or when a user gives the device identification information of the device to the automatic response AI by voice, the specifying unit 30 (the specifying unit 30 implemented by the automatic response AI) identifies the device.

Functions usable by a user (a solo function or linkage function that the device has) may be managed for each user. The management may be performed by the terminal device 10 or may be performed by an external device such as the server 16. The functions usable by a user include, for example, a function provided to the user for free, a function provided to the user for a charge and purchased by the user, and the like. Usable function information indicating functions usable by the user (for example, function purchase history information) may be created and managed for each user. When the management of the usable functions is performed by the terminal device 10, the usable function information is stored in the storage unit 24. When the management is performed by an external device such as the server 16, the usable function information is stored in the external device. Of course, there are also functions that may be used for free, additional update functions, and functions that are specifically managed by an administrator. Therefore, the usability of the function may not be determined based on the presence or absence of purchase. A process of purchasing the functions is performed, for example, by an external device such as the server 16.

The usable function management information is information for managing the functions usable by respective users, and is, for example, information indicating association between user identification information for identifying a user and function information indicating the function usable by the user (which may include linkage function information). As described above, the function usable by the user is, for example, a function provided to the user for free, a function purchased by the user, and the like, which may be a single function or a linkage function. The user identification information is, for example, user account information such as user ID and name. The functions usable by each user are specified (identified) by referring to the usable function management information. The usable function management information may be updated, for example, each time when a function is provided to the user (for example, each time when a function is provided to the user for free or for a charge).

When the functions usable by a user are managed, the specifying unit 30 may receive user identification information for identifying the user and specify function information indicating each function associated with the user identification information in the usable function management information (for example, the information stored in the terminal device 10 or server 16). As a result, functions usable by the user are specified (identified). The control unit 26 may cause the display unit of the UI unit 20 to display the information on the specified function, or may generate the information as voice information. For example, the specifying unit 30 receives the device identification information and the user identification information, specifies function information indicating a function associated with the device identification information in the device function management information, and further specifies function information indicating a function associated with the user identification information in the usable function management information. As a result, the function that the device specified by the device identification information has and is usable by the user identified by the user identification information, is specified.

The functions usable by the user may be specified by an external device such as the server 16. In this case, the user identification information is transmitted from the terminal device 10 to the server 16, and the specifying unit 30 provided in the server 16 specifies function information indicating a function associated with the user identification information. In the case where the specifying process is performed by the server 16, the usable function information is stored in the server 16. Information on each function usable by the user may be transmitted from the server 16 to the terminal device 10 and displayed on the display unit of the UI unit 20 or generated as voice information.

Figure 3:
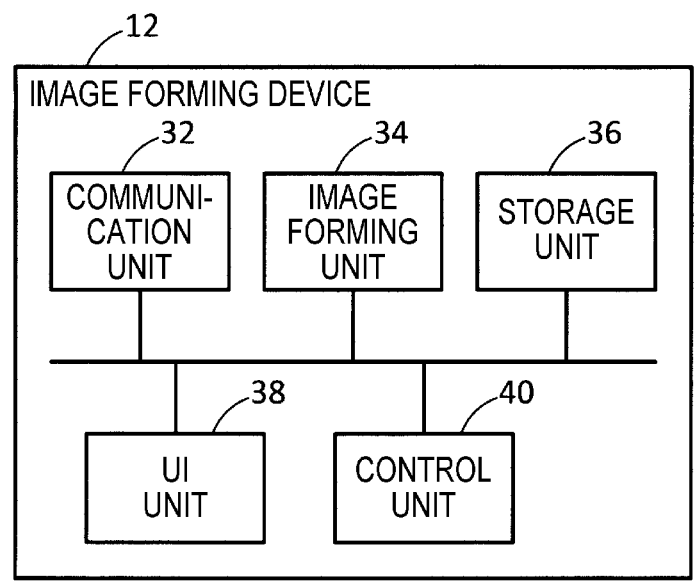
FIG. 3 is a block diagram illustrating a configuration of an image forming device.

Hereinafter, the configuration of the device 12 will be described in detail with reference to FIG. 3. As an example, it is assumed that the device 12 is an image forming device. Hereinafter, the device 12 may be referred to as the image forming device 12 in some cases. FIG. 3 illustrates the configuration of the image forming device 12.

A communication unit 32 is a communication interface and has a function of transmitting data to another device and a function of receiving data from another device. The communication unit 32 may be a communication interface having a wireless communication function or a communication interface having a wired communication function. For example, the communication unit 32 is compatible with one or plural types of communication methods and may communicate with a communication partner according to a communication method suitable for the communication partner (that is, a communication method with which the communication partner is compatible). The communication method is, for example, infrared communication, visible light communication, Wi-Fi communication, near-field wireless communication, and the like. For example, the communication unit 32 may switch the communication method or the frequency band depending on the communication partner, or switch the communication method or the frequency band depending on the surrounding environment.

An image forming unit 34 has an image forming function. Specifically, the image forming unit 34 has at least one function among a scan function, a print function, a copy function, or a facsimile function. When the scan function is executed, a document is read and scan data (image data) is generated. When the print function is executed, the image is printed on a recording medium such as paper. When the copy function is executed, the document is read and printed on the recording medium. When the facsimile function is executed, the image data is transmitted by facsimile transmission or facsimile reception. In addition, a linkage function using plural functions may be executed. For example, a scan transfer function which is a combination of a scan function and a transmission function (transfer function) may be executed. When the scan transfer function is executed, a document is read to generate scan data (image data), and the scan data is transmitted to a transmission destination (for example, an external device such as the terminal device 10). Of course, this linkage function is merely an example, and another linkage function may be executed.

A storage unit 36 is a storage device such as a hard disk or memory (for example, SSD etc.). The storage unit 36 stores, for example, information indicating an instruction of image formation (for example, job information), image data to be printed, scan data generated by executing the scan function, device address information indicating addresses of other devices, information indicating an address of the terminal device 10 (terminal address information), server address information of the server 16, various control data, various programs, and the like. Of course, these may be stored in separate storage devices or may be stored in one storage device.

A UI unit 38 is a user interface unit and includes a display unit and an operation unit. The display unit is, for example, a display device such as a liquid crystal display. The operation unit is an input device such as a touch panel or a keyboard. Of course, it may be a user interface that serves as a display unit and an operation unit (for example, a touch-type display, a device for electronically displaying a keyboard or the like on a display, etc.). The image forming device 12 may not have the UI unit 38, or may have a hardware user interface unit (hardware UI unit) as hardware without a display unit. The hardware UI unit is, for example, a hardware key (for example, numeric keypad) specialized for numeric input, a hardware key (for example, direction instruction key) specialized for direction instruction, and the like.

A control unit 40 controls the operation of each unit of the image forming device 12.

Figure 4:
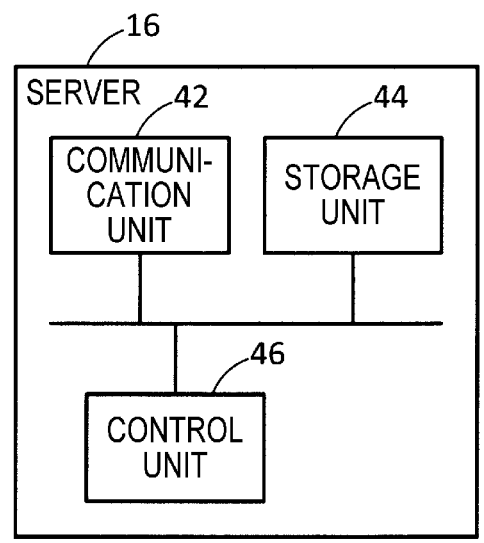
FIG. 4 is a block diagram illustrating a configuration of a server.

Hereinafter, the configuration of the server 16 will be described in detail with reference to FIG. 4. FIG. 4 illustrates the configuration of the server 16.

A communication unit 42 is a communication interface and has a function of transmitting data to another device and a function of receiving data from another device. The communication unit 42 may be a communication interface having a wireless communication function or a communication interface having a wired communication function.

A storage unit 44 is a storage device such as a hard disk or memory (for example, SSD etc.). The storage unit 44 stores, for example, various data, various programs, terminal address information of the terminal device 10, device address information of each device, server address information of the server 16, and the like. Of course, these may be stored in separate storage devices or may be stored in one storage device.

When the functions that the respective devices have and the linkage functions are managed by the server 16, the above-described device function management information and linkage function management information may be stored in the storage unit 44, and then, the device function management information and the linkage function management information may be updated in the server 16. In this case, when a process of specifying the function is performed by the terminal device 10, the device function management information and the linkage function management information (the updated information when the information is updated) are transmitted from the server 16 to the terminal device 10. The transmission may be performed regularly or at a designated timing. Thus, the information stored in the terminal device 10 is updated. Of course, the specifying unit 30 of the terminal device 10 may specify functions that the device has or linkage functions by referring to the device function management information and the linkage function management information stored in the server 16. Further, the process of specifying the function may be executed by the server 16.

The control unit 46 controls the operation of each unit of the server 16. The control unit 46 controls communication, for example, by the communication unit 42.

The control unit 46 may execute a function purchase and manage the history of the purchase. For example, when a paid function is purchased by a user, the control unit 46 may apply a charging process to the user.

Further, the control unit 46 may execute functions related to image processing such as, for example, a character recognition function, a translation function, an image processing function, and an image forming function. Of course, the control unit 46 may execute functions related to any process other than the image processing. By executing the character recognition function, characters in the image are recognized and character data indicating the character is generated. By executing the translation function, the characters in the image are translated into characters represented in a specific language, and character data indicating the translated characters is generated. By executing the image processing function, the image is processed. The control unit 46 may receive, for example, scan data generated by executing the scan function from the image forming device 12 and execute functions related to the image processing such as the character recognition function, the translation function, the image processing function, and the like, with respect to the scan data. The control unit 46 may receive image data from the terminal device 10 and execute the respective functions on the image data. The character data and image data generated by the control unit 46 are transmitted, for example, from the server 16 to the terminal device 10. The server 16 is used as an external device, and the linkage function may be a function of using functions that plural devices including the server 16 have.

As described above, the device function management information may be stored in the storage unit 44 of the server 16. In this case, the device function management information may not be stored in the storage unit 24 of the terminal device 10. Similarly, the linkage function management information may not be stored in the storage unit 44 of the server 16. In this case, the linkage function management information may not be stored in the storage unit 24 of the terminal device 10. The control unit 46 of the server 16 may have the specifying unit 30 described above, and may identify the device based on the device identification information and specify the function that the device has or may specify a linkage function executable using plural functions. In this case, the terminal device 10 may not have the specifying unit 30.

When usable function management information is created, the usable function management information may be stored in the storage unit 44 of the server 16. In this case, the usable function management information may not be stored in the storage unit 24 of the terminal device 10. The control unit 26 of the terminal device 10 may manage the history of the purchase of functions by a user. In this case, the control unit 46 of the server 16 may not have the management function thereof.

As still another example, the device function management information and the linkage function management information may be stored in the devices such as the devices 12 and 14, or the devices such as the devices 12 and 14 may have the specifying unit 30. That is, the process by the specifying unit 30 may be performed in the terminal device 10, the devices such as the devices 12 and 14, the server 16, or another device.

Hereinafter, the device system according to the first exemplary embodiment will be described in more detail.

The device function management information will be described in detail with reference to FIG. 5. FIG. 5 illustrates an exemplary device function management table as the device function management information. In the device function management table, as an example, the device ID, the information indicating the device name (for example, the type of the device), the information indicating the function that the device has (function information), and the image ID are associated with each other. The device ID and the device name correspond to an example of the device identification information. The image ID is an example of image identification information for identifying a device image associated with the device. The device function management table may not include the image ID. For example, a device whose device ID is "B" is a multifunction device (an image forming device having plural image forming functions), and has functions such as a print function and a scan function. The device is associated with an image ID for identifying a device image associated with the device. The data of the device image associated with the device may be stored in, for example, the terminal device 10, the server 16, or another device.

For example, the position information acquired by the position information acquiring unit 28 includes information indicating the device ID and device name as device identification information. The specifying unit 30 of the terminal device 10 specifies the device name, the function, and the image ID associated with the device ID by referring to the device function management table. Therefore, the device to be used is identified. Information indicating the device name or the device image may be displayed on the display unit of the UI unit 20. Of course, the image itself captured by the camera 22 may be displayed on the display unit of the UI unit 20. Further, when the device image associated with the device (for example, an image captured by the camera 22 or an image schematically representing the device) is designated by the user in the UI unit 20, information on the function that the device has (for example, function information, function explanation information, etc.) may be displayed on the display unit of the UI unit 20.

Hereinafter, the linkage function management information will be described in detail with reference to FIG. 6. FIG. 6 illustrates an exemplary linkage function management table as the linkage function management information. In the linkage function management table, as an example, a combination of the device IDs, the information indicating the names of the devices to be linked (for example, the types of the devices), and the information indicating the linkage functions of the devices (linkage function information) are associated with each other. For example, the device whose device ID is "A" is a PC (personal computer), and the device whose device ID is "B" is a multifunction device. When the PC (A) and the multifunction device (B) are linked to each other, for example, "scan transfer function" and "print function" are implemented as linkage functions. The "scan transfer function" is a function of transferring image data generated by scanning by the multifunction device (B) to the PC (A). The "print function" is a function of transmitting data (for example, image data and document data) saved in the PC (A) to the multifunction device (B) and printing it with the multifunction device (B). A linkage function executable using three or more devices may be specified. In this case, a combination of three or more devices and a linkage function are associated with each other, and the association is registered in the linkage function management table.

Hereinafter, the operation of the terminal device 10 will be described in detail with specific examples.

Figure 7:
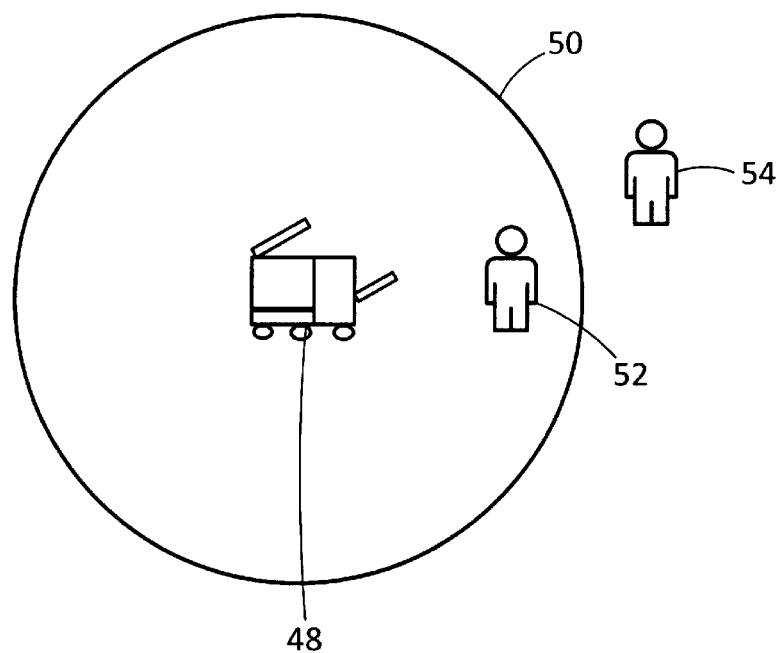
FIG. 7 is a diagram illustrating a positional relationship between a user and a device.

A positional relationship between the device and the user (the terminal device 10 that the user has) will be described with reference to FIG. 7. FIG. 7 illustrates the positional relationship. An area is defined for each device. For example, the multifunction device (B) as a device 48 has an area 50 having a predetermined size. The area 50 may be an area having a circular shape around an installation position of the multifunction device (B), an area having a rectangular shape, or an area having any shape. Further, the multifunction device (B) may not be installed at the center of the area 50. Areas for other devices are also determined in the same manner as that of the multifunction device (B). The areas for respective devices may have the same size and the same shape as each other, or may have different sizes and different shapes from each other. A user 52 is a user who exists in the area 50, and a user 54 is a user who exists outside the area 50. For example, information indicating an area of each device is stored in the storage unit 24 of the terminal device 10. Of course, the information indicating the area of each device may be stored in an external device such as the server 16 or may be stored in the device. The position information of the device may also include information indicating the area of the device.

The specifying unit 30 identifies the position of the user (the terminal device 10) based on the position information of the terminal device 10 acquired by the position information acquiring unit 28. Similarly, the specifying unit 30 identifies the position of the multifunction device (B) based on the position information of the multifunction device (B) acquired by the position information acquiring unit 28. Further, the specifying unit 30 identifies the area 50 of the multifunction device (B) based on the information indicating the area 50 of the multifunction device (B). The information indicating the area 50 may be included in the position information of the multifunction device (B), may be stored in the storage unit 24 of the terminal device 10, or may be stored in an external device such as the server 16.

The specifying unit 30 may calculate the distance between the multifunction device (B) and the user based on the position information of the multifunction device (B) and the position information of the user (the terminal device 10), and determine the positional relationship between the multifunction device (B) and the user based on the distance. For example, when the distance is equal to or less than a threshold value, the specifying unit 30 determines that the user exists in the area 50 of the multifunction device (B). When the distance exceeds the threshold value, the specifying unit 30 determines that the user exists outside the area 50 of the multifunction device (B). The same applies to other devices.

Figure 8:
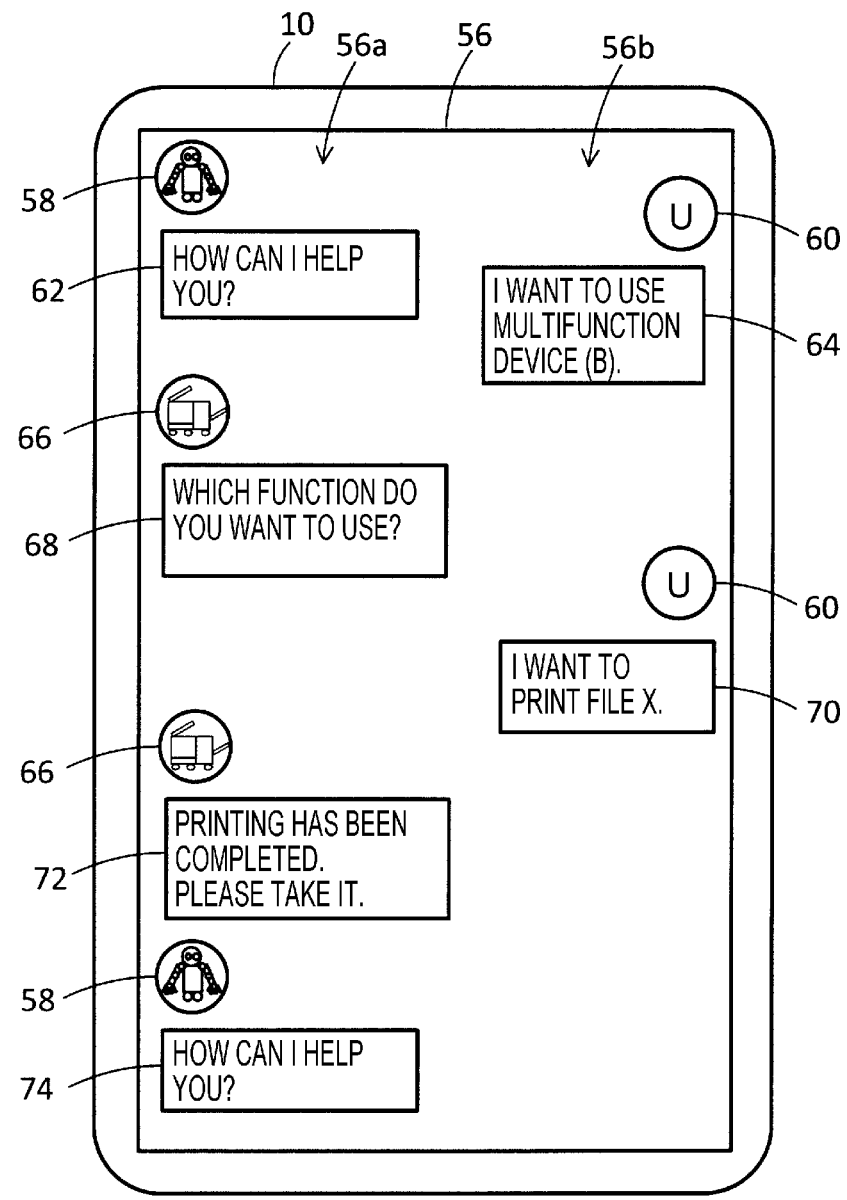
FIG. 8 is a diagram illustrating a screen.

Hereinafter, a screen displayed on the terminal device 10 will be described with reference to FIG. 8. FIG. 8 illustrates an example of the screen displayed on the terminal device 10. The control unit 26 of the terminal device 10 causes the display unit of the UI unit 20 to display a screen 56 and causes the screen 56 to display various kinds of information. The screen 56 is an interface (conversation response screen) for the user to make a conversation with the automatic response AI. The screen 56 displays thereon information (for example, a character string or an image) input by the user to the terminal device 10 and information indicating a message content of the automatic response AI (for example, a character string or an image). The conversation between the user and the automatic response AI may be a conversation in a so-called chat format (that is, a conversation in a real-time format, in other words, a conversation in which the user and the automatic response AI make messages). For example, a program for making a conversation with the automatic response AI (for example, a chatting program) is executed, and the screen 56 for the conversation (conversation response screen) is displayed on the display unit of the UI unit 20.

The screen 56 is provided with a display area for each conversation participant is provided, and a message content of each conversation participant may be displayed in his/her own display area. For example, the display area 56a is an area where the message contents of the automatic response AI are displayed, and a display area 56b is an area where the message contents of the user (the information input by the user to the terminal device 10) are displayed. In the example illustrated in FIG. 8, the display area 56a for the automatic response AI is provided on the left side toward the screen 56, and the display area 56b for the user is provided on the right side. Of course, this display example is merely an example, and the arrangement relationship of the display areas may be reversed, the display areas may be provided in the vertical direction, or all or some of the display areas may overlap each other. The latest message content may be displayed in a specific area (for example, the central area) on the screen 56, and the past message contents may be displayed around that area. Further, the respective display areas may have the same size as each other, may have different sizes from each other, or may be enlarged or reduced depending on an amount of the content of a single message or the number of times of messages. The setting and size of the display area are controlled by the control unit 26.

In an example illustrated in FIG. 8, only one user and one automatic response AI are present in the conversation, but plural users and plural automatic response Ms may participate in the conversation. In this case, a display area for each conversation participant may be provided on the screen 56. For example, when two users and one automatic response AI participate in a conversation, three display areas are provided on the screen 56, and the message content of each conversation participant is displayed in its own display area. For example, when plural users make a conversation with each other via the screen 56 by communicating with plural terminal devices 10, the message contents of the plural users are displayed on the screen 56. The same applies to a case where plural automatic response AIs participate in a conversation. Plural automatic response AI programs may be installed in the same terminal device 10, and the plural automatic response AIs may be stored in the same terminal device 10. Alternatively, a program related to each of the plural automatic response Ms may be installed in a separate terminal device 10, and each automatic response AI may be stored in a separate terminal device 10. For example, the screen 56 displays the message contents of the automatic response AI stored in the terminal device 10 as its own device, and the message contents of the automatic response AI stored in another terminal device 10. The automatic response AI stored in another terminal device 10 participates in the conversation, for example, via a communication path N.

When the chatting program is activated, the control unit 26 of the terminal device 10 causes the display unit of the UI unit 20 to display the screen 56. An image 58 associated with the automatic response AI is displayed on the display area 56a for the automatic response AI, and an image 60 associated with the user is displayed on the display area 56b for the user. The image 58 is an image for identifying the automatic response AI, and the image 60 is an image for identifying the user. A character string indicating the automatic response AI (a character string for identifying the automatic response AI) may be displayed in place of the image 58 or along with the image 58. Similarly, a character string indicating the user (a character string for identifying the user, such as a name, a user ID, a handle name, a nickname, etc.) may be displayed in place of the image 60 or along with the image 60. The automatic response AI is an automatic response AI that does not depend on the device, and may be a general-purpose automatic response AI.

Thereafter, a conversation is made between the user and the automatic response AI. In the conversation, the message contents of the user may be input to the terminal device 10 as the user operates the UI unit 20 to input information such as a character string or an image, or may be input by voice. The message contents of the user may be displayed on the screen 56 as information such as a character string or an image, or may not be displayed. Similarly, the message contents of the automatic response AI may be displayed on the screen 56 as information such as a character string or an image, may not be displayed, or may be generated as voice while being displayed. In the following description, as an example, the message contents of each conversation participant is displayed on the screen 56. However, the message contents may be generated by voice.

When the conversation progresses on the screen 56, the screen 56 scrolls, so that the past message contents which are unable to be displayed on the screen 56 disappears from the screen 56, and the latest message contents and the immediate message contents are displayed on the screen 56.

When the chatting program is activated, the automatic response AI first issues a common question (a question asking about the user's request) such as "How can I help you?" and a character string indicating the question as a message content 62 of the automatic response AI is displayed in the display area 56a. Of course, the message content of the automatic response AI may be generated by voice in place of the character string or along with the character string. Since the message content 62 is a message content of the automatic response AI, the control unit 26 displays the message content 62 in the display area 56a as a message content associated with the image 58 of the automatic response AI. The same applies to the following conversation.

The position information acquiring unit 28 acquires position information of the terminal device 10 and position information of each device. The position information acquiring unit 28 may acquire the position information at any time, may acquire the position information at a predetermined timing, may acquire the position information periodically, or may acquire the position information at a timing designated by the user. The specifying unit 30 specifies the positional relationship between the terminal device 10 (user) and each device based on the position information of the terminal device 10 and the position information of each device obtained by the position information acquiring unit 28.

For example, as illustrated in FIG. 7, it is assumed that the user (the terminal device 10) exists in the area 50 of the multifunction device (B) (see the user 52). In this case, the specifying unit 30 determines that the user (the terminal device 10) exists in the area 50 of the multifunction device (B) based on the position information of the terminal device 10 and the position information of the multifunction device (B). When the distance between the terminal device 10 and the multifunction device (B) is equal to or less than the threshold value, the specifying unit 30 may determine that the user (the terminal device 10) exists in the area 50 of the multifunction device (B).

When the user (the terminal device 10) exists in the area 50 of the multifunction device (B), the specifying unit 30 identifies the multifunction device (B) as a device to be used and specifies a function associated with the device identification information included in the position information of the multifunction device (B), for example, in the device function management table illustrated in FIG. 5. Therefore, the function that the multifunction device (B) has is identified.

Further, when the user (the terminal device 10) exists in an area of a device, the control unit 26 switches the display of the conversation partner (for example, an image associated with the conversation partner or a character string indicating the conversation partner) from the display of the general-purpose automatic response AI (for example, an image 58 associated with the general-purpose automatic response AI or a character string indicating the general-purpose automatic response AI) to the display of the device (for example, an image associated with the device or a character string indicating the device).

When the user exists in the area 50 of the multifunction device (B), the control unit 26 displays the device image 66 associated with the multifunction device (B) in the display area 56a as an image associated with the conversation partner, in place of the image 58 associated with the automatic response AI. The device image 66 may be an image generated by capturing the multifunction device (B) (for example, an external appearance image of the multifunction device (B)), or may be an image imitating the multifunction device (B) (for example, an icon). Of course, the control unit 26 may display a character string indicating the multifunction device (B) in the display area 56a as information indicating the conversation partner, in place of the device image 66 or along with the device image 66.

Further, the control unit 26 displays a message content 68 such as "Which function do you want to use?" in the display area 56a as a message content of the multifunction device (B). The message content 68 itself is a message content created by the general-purpose automatic response AI. The control unit 26 displays the message content 68 in the display area 56a as a message content associated with the device image 66 of the multifunction device (B), in order to act as if the multifunction device (B) makes the message content 68. The control unit 26 may display a list of the functions that the multifunction device (B) specified by the specifying unit 30 has, in the display area 56a as a message content of the multifunction device (B). Since the multifunction device (B) is a device having an image forming function such as a print function or a copy function, the control unit 26 may display a character string or an image indicating a list of the image forming functions in the display area 56*a* as a message content of the multifunction device (B).

Further, when the user requests use of a device by making a message such as "I want to use the multifunction device (B)", a character string indicating the request may be displayed as a message content 64 of the user in the display area 56*b*. The user may input information indicating the message content to the terminal device 10 by operating the screen 56 to input a character string, or may input information indicating the message content to the terminal device 10 by voice. Since the message content is a message content of the user, the control unit 26 displays the message content 64 in the display area 56*b* as a message content associated with the image 60 of the user. The same applies to the following conversation.

When the user inputs the message content 64 to the terminal device 10 as described above, the specifying unit 30 may identify the multifunction device (B) as a device to be used, and the control unit 26 may switch the image 58 associated with the automatic response AI to the image 66 associated with the multifunction device (B). The automatic response AI identifies the request of the user by analyzing the message content of the user, and, when a reply is required, creates a reply such as an answer to the request. The control unit 26 displays the character string indicating the reply in the display area 56*a* as a message content of the automatic response AI. The automatic response AI may search information using the Internet or the like and analyze the results of the search, or may acquire information on the devices 12 and 14 and analyze the information. The automatic response AI may reflect the results of the analysis in the reply. Further, the automatic response AI may manage history of use of various applications by the user, history of operation of the terminal device 10 by the user, history of use of the devices 12 and 14 by the user, and the like. Further, the automatic response AI may communicate with another automatic response AI stored in the other device and acquire information from that automatic response AI. The automatic response AI may reflect information managed or acquired by itself in the reply.

In response to the above message content 68, the user input a process content to be performed using the multifunction device (B) to the terminal device 10 as a message content of the user. In the example illustrated in FIG. 8, a message content 70 indicating the process content such as "I want to print a file X" is input to the terminal device 10 as a message content of the user.

The control unit 26 analyzes the message content 70 of the user to specify the process content requested by the user, and causes the multifunction device (B) to execute the process content. For example, the control unit 26 transmits a print job including the data of file X to the multifunction device (B). The multifunction device (B) that receives the print job prints the file X according to the print job. The control unit 26 may cause the UI unit 20 to display a screen for setting printing conditions (for example, conditions such as the number of printing units, color printing, and black and white printing). The print job includes the conditions set on the screen, and the multifunction device (B) prints according to the conditions.

When the printing of the file X is completed, the control unit 26 displays a message content 72 indicating that the printing has been completed, in the display area 56*a* as a message content of the multifunction device (B). Even in this case, the control unit 26 displays the device image 66 associated with the multifunction device (B) in the display area 56*a*, and displays the message content 72 in the display area 56*a* as a message content associated with the device image 66 of the multifunction device (B). The message content 72 itself is a message content created by the general-purpose automatic response AI.

When the user (the terminal device 10) moves out of the area 50 of the multifunction device (B), the control unit 26 displays the image 58 associated with the general-purpose automatic response AI in the display area 56*a* as an image associated with the conversation partner, in place of the device image 66 associated with the multifunction device (B). Further, the control unit 26 displays a message content 74 indicating a common question such as "How can I help you?" in the display area 56*a* as a message content of the automatic response AI.

As described above, according to the first exemplary embodiment, when the user (the terminal device 10) exists in an area of a device, the device is identified as a device to be used, and the display of a conversation partner who is responding is switched to the display of the device. In this manner, the user may visually confirm the conversation partner who is responding.

When the user exists in the area of the device, the display of the conversation partner may be switched from the display of the general-purpose automatic response AI to the display of the device, and the automatic response AI (for example, the program) as a conversation partner for the user may be switched from the general-purpose automatic response AI to an automatic response AI equipped in the device.

In the example illustrated in FIG. 8, when the automatic response AI is equipped in the multifunction device (B) (when a program of the automatic response AI is installed in the multifunction device (B)), the control unit 26 switches the automatic response AI as a conversation partner for the user from the general-purpose automatic response AI equipped in the terminal device 10 (the program of the automatic response AI installed in the terminal device 10) to the automatic response AI equipped in the multifunction device (B).

In this case, the control unit 26 transmits the information indicating the message contents of the user to the multifunction device (B) via the communication path N. The automatic response AI equipped in the multifunction device (B) receives the information indicating the message contents of the user transmitted from the terminal device 10, analyzes the message contents of the user, and creates a reply such as an answer to the message contents. The automatic response AI of the multifunction device (B) transmits information indicating the message contents including the reply to the terminal device 10. For example, the message contents 68 and 72 illustrated in FIG. 8 are created by the automatic response AI equipped in the multifunction device (B), and information indicating the message contents 68 and 72 is transmitted from the multifunction device (B) to the terminal device 10. The control unit 26 displays the message contents (for example, the message contents 68 and 72) transmitted from the multifunction device (B) as a message content of the multifunction device (B) in the display area 56*a* in association with the device image 66 of the multifunction device (B).

When the user moves out of the area 50 of the multifunction device (B), the control unit 26 switches the image associated with the conversation partner from the device image 66 associated with the multifunction device (B) to image 58 associated with the general-purpose automatic response AI as illustrated in FIG. 8, and switch the automatic response AI as a conversation partner for the user from the automatic response AI equipped in the multifunction device (B) to the general-purpose automatic response AI equipped in the terminal device 10.

In the case where the automatic response AI is equipped in the device, the conversation is made between the automatic response AI and the user by performing the above process. Therefore, during that time, the load of the process of the automatic response AI equipped in the terminal device 10 is reduced. Further, when the automatic response AI equipped in the device has a higher level of control and information collection capability than that of the general-purpose automatic response AI, the automatic response AI equipped in the device may provide the user with more useful information by making a conversation with the user as the conversation partner for the user.

(Modification 1)

Hereinafter, Modification 1 will be described. In Modification 1, the control unit 26 controls the output of an instruction related to a device to the conversation partner who is responding, depending on the position of the user. For example, when the user exists in the area of the device, the control unit 26 receives an instruction related to the device from the user. Meanwhile, when the user exists outside the area of the device, the control unit 26 does not receive an instruction related to the device from the user. In this manner, when the user exists in the area of the device, the user is able to give instructions to the device, and when the user exists outside the area of the device, the user is not able to give instructions to the device. Since the area where instructions are able to be given to the device is limited, the security of the device may be improved. For example, the security of the device may be improved by setting the area of the device such that only users who stay in a specific room in the office are able to give instructions to the device installed in the specific room.

For example, as illustrated in FIG. 7, when the user exists in the area 50 of the multifunction device (B) (see the user 52), the control unit 26 receives the user's instruction to the multifunction device (B). The user may instruct the multifunction device (B) to execute a process such as printing by using the UI unit 20 of the terminal device 10. Meanwhile, when the user exists outside the area 50 of the multifunction device (B) (see the user 54), the control unit 26 does not receive the user's instruction to the multifunction device (B). In this case, the user may not give an instruction to execute a process such as printing, to the multifunction device (B). In this manner, it is possible to construct a secure environment for the multifunction device (B).

In Modification 1, when the user exists in an area of a device, the control unit 26 may or may not switch the image associated with the conversation partner from the image associated with the general-purpose automatic response AI to an image associated with the device.

Second Exemplary Embodiment

Hereinafter, a second exemplary embodiment will be described. In the first exemplary embodiment, one device is identified. In the second exemplary embodiment, however, plural devices are identified. Hereinafter, the second exemplary embodiment will be described in detail.

Figure 9:
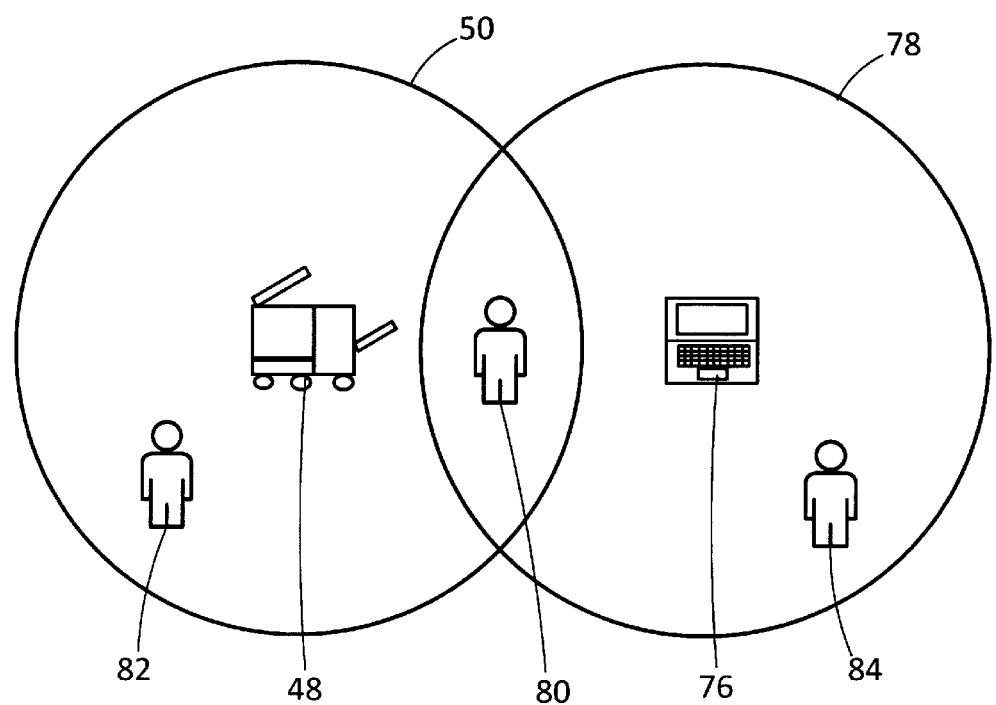
FIG. 9 is a diagram illustrating a positional relationship between a user and a device.

A positional relationship between the device and the user (the terminal device 10) will be described with reference to FIG. 9. FIG. 9 illustrates the positional relationship. Similarly to the first exemplary embodiment, an area is defined for each device. For example, an area 50 is defined for the multifunction device (B) as a device 48, and an area 78 is defined for the PC (A) as a device 76. The areas 50 and 78 may have the same size and the same shape as each other, or may have different sizes and different shapes from each other.

A user 80 is a user who exists in both areas 50 and 78. That is, the areas 50 and 78 partially overlap with each other, and the user 80 is a user who exists in the overlapping area. A user 82 is a user who exists in the area 50 and exists outside the area 78. A user 84 is a user who exists in the area 78 and exists outside the area 50.

The specifying unit 30 identifies the respective positions of the terminal device 10, the multifunction device (B), and the PC (A) based on the position information of each of the terminal device 10, the multifunction device (B), and the PC (A), and also identifies the areas 50 and 78.

The specifying unit 30 may calculate the distance between the multifunction device (B) and the user (the terminal device 10) based on the position information of the multifunction device (B) and the position information of the user, and similarly, the specifying unit 30 may calculate the distance between the PC (A) and the user based on the position information of the PC (A) and the position information of the user. When the distance between the multifunction device (B) and the user is equal to or less than a threshold value, the specifying unit 30 determines that the user exists in the area 50 of the multifunction device (B). When the distance exceeds the threshold value, the specifying unit 30 determines that the user exists outside the area 50 of the multifunction device (B). Similarly, when the distance between the PC (A) and the user is equal to or less than a threshold value, the specifying unit 30 determines that the user exists in the area 78 of the PC (A). When the distance exceeds the threshold value, the specifying unit 30 determines that the user exists outside the area 78 of the PC (A). The threshold value that regulates the positional relationship between the multifunction device (B) and the user and the threshold value that regulates the positional relationship between the PC (A) and the user may be the same as each other or may be different from each other. That is, the same threshold value or a different threshold value may be used for each device.

Figure 10:
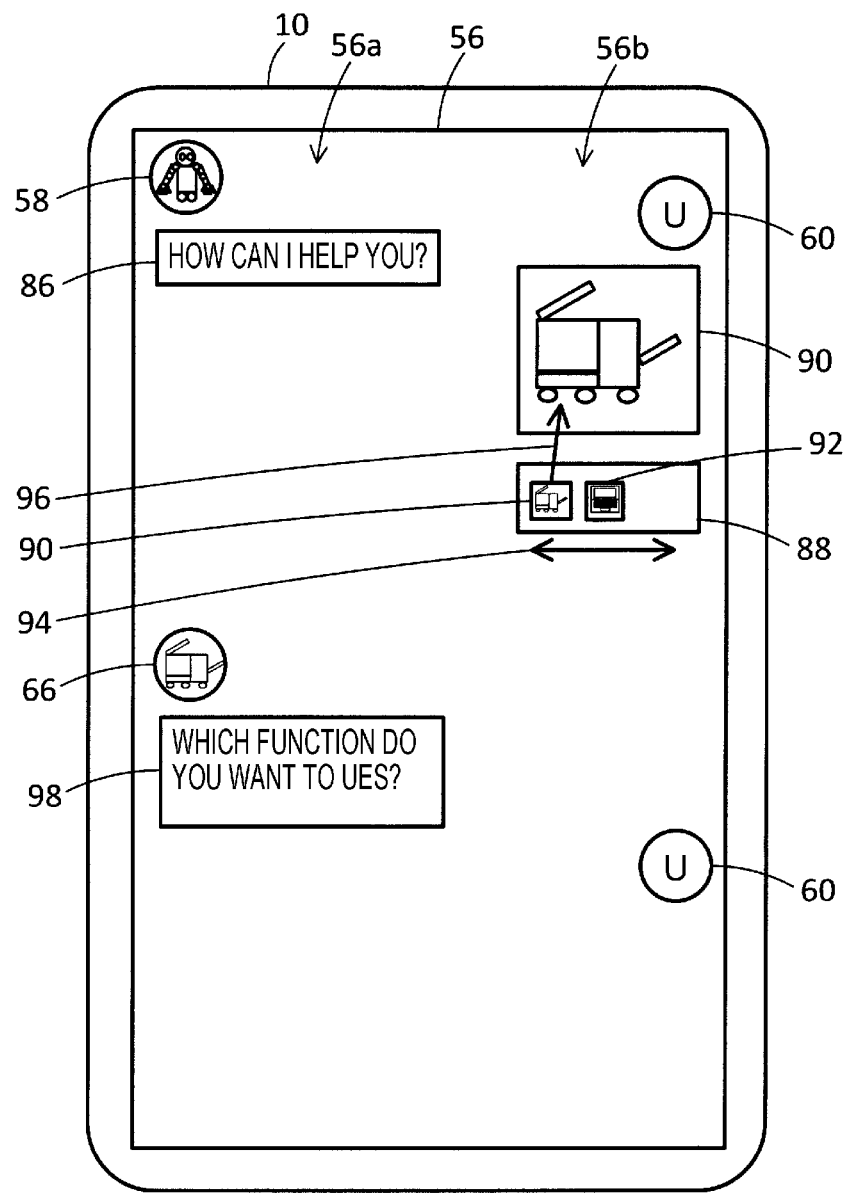
FIG. 10 is a diagram illustrating a screen.

Hereinafter, a screen displayed on the terminal device 10 will be described with reference to FIG. 10. FIG. 10 illustrates a screen 56. The screen 56 displays an image 58 associated with the automatic response AI and an image 60 associated with the user are displayed as in FIG. 8, and further displays information indicating the conversation between the user and the automatic response AI.

When the chatting program is activated, a message content 86 such as "How can I help you?" is displayed as a message content of the automatic response AI in the display area 56a, as in the first exemplary embodiment.

The position information acquiring unit 28 acquires position information of the terminal device 10 and position information of each device and specifies the positional relationship between the terminal device 10 (user) and each device based on the position information of the terminal device 10 and the position information of each device.

For example, as illustrated in FIG. 9, it is assumed that the user (the terminal device 10) exists in both areas 50 and 78 (see the user 80). That is, it is assumed that the user exists in an area where the areas 50 and 78 overlap each other. In this case, the specifying unit 30 determines that the user (the terminal device 10) exists in the area 50 of the multifunction device (B) based on the position information of the terminal device 10 and the multifunction device (B). In addition, the specifying unit 30 determines that the user (the terminal device 10) exists in the area 78 of the PC (A) based on the position information of the terminal device 10 and the PC (A). The specifying unit 30 may determine that the user (the terminal device 10) exists in the area 50 of the multifunction device (B) when the distance between the terminal device 10 and the multifunction device (B) is equal to or less than the threshold value, and may determine that the user (the terminal device 10) exists in the area 78 of the PC (A) when the distance between the terminal device 10 and the PC (A) is equal to or less than the threshold value.

When the user (the terminal device 10) exists in the area 50 of the multifunction device (B), the specifying unit 30 identifies the multifunction device (B) as a candidate of a device to be used and specifies a function associated with the device identification information included in the position information of the multifunction device (B), for example, in the device function management table illustrated in FIG. 5. Therefore, the function that the multifunction device (B) has is identified. Similarly, when the user (the terminal device 10) exists in the area 78 of the PC (A), the specifying unit 30 identifies the PC (A) as a candidate of a device to be used and specifies a function associated with the device identification information included in the position information of the PC (A), for example, in the device function management table illustrated in FIG. 5. Therefore, the function that the PC (A) has is identified.

When plural devices are identified as described above, the control unit 26 displays a stock area 88 in the display area 56*b* for the user and displays device images in the stock area 88. The stock area 88 is an area where information on the candidate of the device to be used is displayed. In the example illustrated in FIG. 10, the device images are displayed as an example of candidate information. For example, the control unit 26 displays the device images associated with the devices identified as described above in the stock area 88. In the example illustrated in FIG. 10, device images 90 and 92 are displayed in the stock area 88. The device image 90 is an image associated with the multifunction device (B) as a device. The device image 92 is an image associated with the PC (A) as a device. When the devices are identified in this manner, the control unit 26 displays device images associated with the devices in the stock area 88. Of course, the control unit 26 may display character information indicating the identified devices in the stock area 88, in place of the device images or along with the device images.

When the user exists only in the area 50 of the multifunction device (B), only the device image 90 associated with the multifunction device (B) is displayed in the stock area 88. Similarly, when the user exists only in the area 78 of the PC (A), only the device image 92 associated with the PC (A) is displayed in the stock area 88.

The device image 90 may be an image generated by capturing the multifunction device (B) (an image having a size at the time of image capturing, or an enlarged or reduced image), or a schematic image (for example, an icon) associated with the multifunction device (B). Similarly, the device image 92 may be an image generated by capturing the PC (A), or a schematic image associated with the PC (A).

When a schematic image is used, the specifying unit 30 specifies a schematic image associated with the identified device by referring to the device function management table illustrated in FIG. 5. The schematic image is displayed as a device image. The data of the schematic image may be stored in the terminal device 10 or may be stored in an external device such as the server 16.

In the case of using image data generated by capturing a device, the external appearance of the current device itself (for example, an external appearance reflecting scratches, memo, or a seal affixed to the device, etc.) is reflected in the image, so that the user may see the difference visually from other similar devices.

Further, when there are other device images that cannot be all displayed in the stock area 88, the user performs a scroll operation on the device images displayed in the stock area 88, as indicated by an arrow 94, such that the other device images are displayed in the stock area 88.

The user may select an image associated with the device to be used (the device image 90 in the example illustrated in FIG. 10) from the stock area 88 and move the device image 90 out of the stock area 88 as indicated by an arrow 96, so that the device image 90 may be transmitted to the automatic response AI as a message content of the user. For example, the user performs a drag operation to move the device image 90 from the stock area 88 to a position where the message content of the user is displayed, and performs a drop operation at the display position of the message content. With these operations, the control unit 26 transmits the device image 90 to the automatic response AI as a message content of the user. For example, when the user selects an image (for example, the device image 90) on the screen 56 and picks up the image from the stock area 88 using a pointer (for example, a user's finger, pen, or stylus), so that the image is included in the message content of the user and transmitted to the automatic response AI. The control unit 26 detects the contact of the pointer on the screen 56 and detects the movement of the indicator on the screen 56. The user may input character information or voice information indicating a device to be used to the terminal device 10 so that information indicating the device to be used is transmitted to the automatic response AI.

As described above, when a device to be used is designated by the user, the control unit 26 switches the display of the conversation partner from the display of the general-purpose automatic response AI to the display of the device. In the example illustrated in FIG. 10, since the user designates the multifunction device (B) as a device to be used by designating the device image 90, the control unit 26 displays the device image 66 associated with the multifunction device (B) in the display area 56*a* as an image associated with the conversation partner, in place of the image 58 associated with the automatic response AI.

Then, similarly to the first exemplary embodiment, the control unit 26 also displays a message content 98 such as "Which function do you want to use?" in the display area 56*a* as a message content of the multifunction device (B).

When the user (the terminal device 10) moves out of the area 50 of the multifunction device (B), the control unit 26 displays the image 58 associated with the general-purpose automatic response AI in the display area 56*a* as an image associated with the conversation partner, in place of the device image 66 associated with the multifunction device (B). Further, the control unit 26 deletes the device image 90 associated with the multifunction device (B) from the stock area 88. When the user (the terminal device 10) moves out of the area 78 of the PC (A), the control unit 26 deletes the device image 92 associated with the PC (A) from the stock area 88. When the user moves into an area of a new device, the new device is identified as a candidate of a device to be used, and information of the new device (for example, a device image associated with the new device) is displayed in the stock area 88.

As described above, according to the second exemplary embodiment, when the user (the terminal device 10) exists in an area of plural devices, the plural devices are identified as a candidate of a device to be used, and the display of a conversation partner who is responding is switched to the display of a device selected from the plural devices by the user. In this manner, the user may visually confirm the conversation partner who is responding.

The display of the conversation partner may be switched from the display of the general-purpose automatic response AI to the display of the device, and the automatic response AI (for example, the program) as a conversation partner for the user may be switched from the general-purpose automatic response AI to an automatic response AI equipped in the device.

When the user exists in the area of plural devices, the specifying unit 30 may identify a device closest to the user among the plural devices as the device to be used, and the control unit 26 may switch the display of the general-purpose automatic response AI to the display of the device closest to the user. For example, in the case where the user exists in both areas of the multifunction device (B) and the PC (A), when the multifunction device (B) is installed closer to the user than the PC (A), the specifying unit 30 identifies the multifunction device (B) as the device to be used. Further, the control unit 26 displays the device image 66 associated with the multifunction device (B) in the display area 56*a* as an image associated with the conversation partner, in place of the image 58 associated with the general-purpose automatic response AI.

(Modification 2)

Hereinafter, Modification 2 will be described. Similarly to Modification 1, in Modification 2, the control unit 26 controls the output of an instruction related to a device to the conversation partner who is responding, depending on the position of the user. For example, when the user exists in an area of plural devices, the control unit 26 receives an instruction related to each of the plural devices from the user.

For example, as illustrated in FIG. 9, when the user exists in both of the area 50 of the multifunction device (B) and the area 78 of the PC (A) (see the user 80), the control unit 26 receives the user's instruction related to the multifunction device (B) and the PC (A). For example, the user may use the UI unit 20 of the terminal device 10 to give an execution instruction of a process such as printing to the multifunction device (B) and give the execution instruction of the process to the PC (A).

Further, when a device is selected from plural devices by the user, the control unit 26 may receive an instruction related to the selected device from the user. In the example illustrated in FIG. 10, the user exists in both areas of the multifunction device (B) and the PC (A), but the multifunction device (B) is selected by the user. In this case, the control unit 26 receives a user's instruction related to the multifunction device (B).

Further, when the user exists in an area of plural devices, the control unit 26 may receive, from the user, an instruction related to a device closest to the user among the plural devices. For example, in the case where the user exists in both areas of the multifunction device (B) and the PC (A), when the multifunction device (B) is installed closer to the user than the PC (A), the control unit 26 receives an instruction related to the multifunction device (B) from the user and does not receive an instruction related to the PC (A) from the user.

According to Modification 2, when the user exists in an area of plural devices, it is possible to construct a secure environment for the devices.

In Modification 1, when the user exists in an area of a device, the control unit 26 may or may not switch the image associated with the conversation partner from the image associated with the general-purpose automatic response AI to an image associated with the device.

Third Exemplary Embodiment

Figure 11:
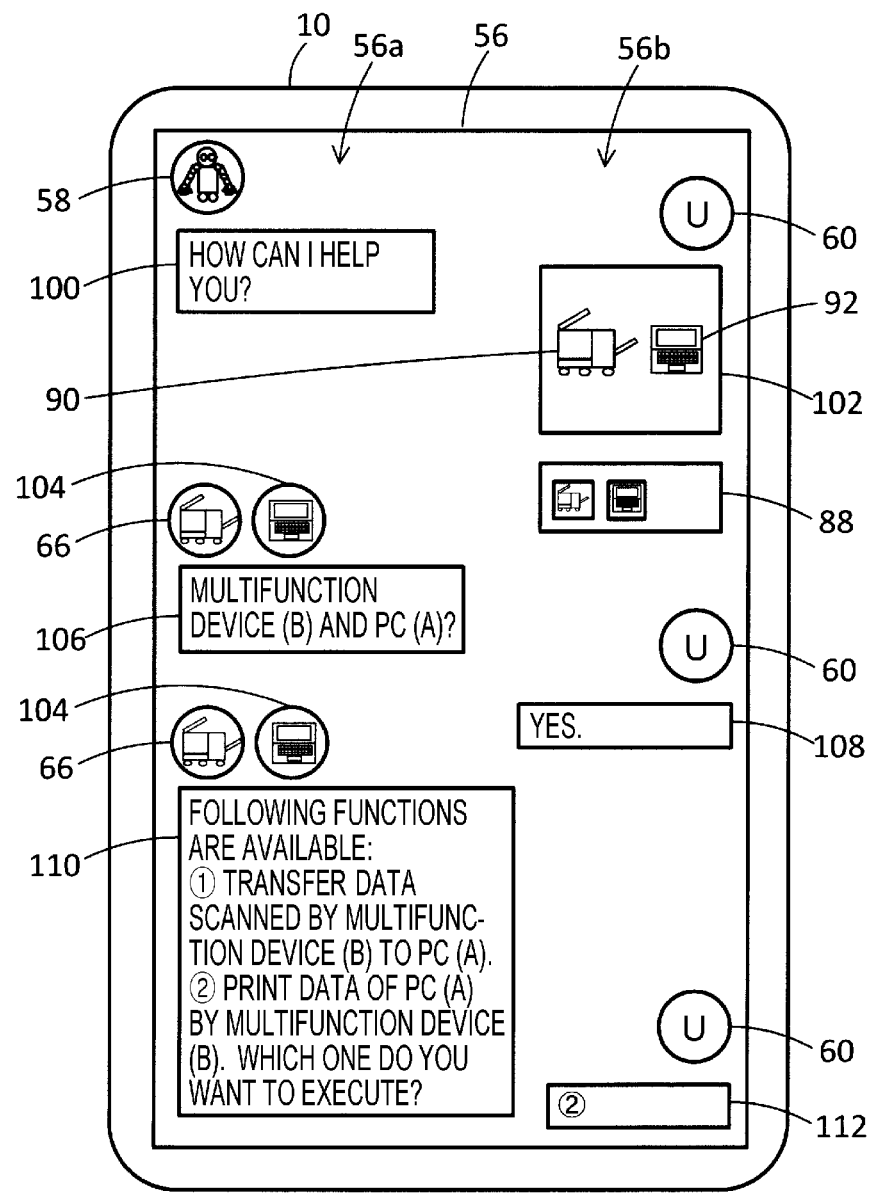
FIG. 11 is a diagram illustrating a screen.

Hereinafter, a third exemplary embodiment will be described with reference to FIG. 11. FIG. 11 illustrates a screen 56. In the second exemplary embodiment, one device is selected by the user. In the third exemplary embodiment, however, plural devices are selected by the user.

The screen 56 displays an image 58 associated with the automatic response AI and an image 60 associated with the user are displayed as in FIG. 8, and further displays information indicating the conversation between the user and the automatic response AI.

When the chatting program is activated, a message content 100 such as "How can I help you?" is displayed as a message content of the automatic response AI in the display area 56*a*.

In the third exemplary embodiment, similarly to the second exemplary embodiment described above, it is assumed that the user (the terminal device 10) exists in both areas 50 and 78 (see the user 80 in FIG. 9). That is, it is assumed that the user exists in an area where the areas 50 and 78 overlap each other. In this case, a device image 90 associated with the multifunction device (B) and a device image 92 associated with the PC (A) are displayed in the stock area 88.

For example, the user may select the device images 90 and 92 from the stock area 88 and move the device images 90 and 92 out of the stock area 88, so that the device images 90 and 92 may be transmitted to the automatic response AI as a message content of the user. In the example illustrated in FIG. 11, an image 102 in which the device images 90 and 92 are displayed is generated, and the image 102 is transmitted to the automatic response AI. The user may input character information or voice information indicating plural devices to be used to the terminal device 10 so that information indicating the plural devices to be used is transmitted to the automatic response AI.

As described above, when plural devices to be used are designated by the user, the specifying unit 30 identifies the plural devices as devices to be linked and specifies linkage functions associated with a combination of the plural devices, for example, in the linkage function management table illustrated in FIG. 6. Therefore, the linkage functions executable using the plural devices are identified.

In the above-described example, the specifying unit 30 identifies the multifunction device (B) associated with the device image 90 and the PC (A) associated with the device image 92 as devices to be linked and specifies linkage functions (for example, a "scan transfer function" and a "print function") associated with the combination of the PC (A) and the multifunction device (B) in the linkage function management table illustrated in FIG. 7. Therefore, linkage functions executable using the PC (A) and the multifunction device (B) are identified. The "scan transfer function" is a function of transferring image data generated by scanning by the multifunction device (B) to the PC (A). The "print function" is a function of transmitting image data stored in the PC (A) to the multifunction device (B) and printing it with the multifunction device (B). The process of specifying the devices and the linkage functions may be performed by the server 16.

Further, when plural devices to be used are designated by the user, the control unit 26 switches the display of the conversation partner from the display of the general-purpose automatic response AI to the display of the plural devices designated by the user.

In the above-described example, since the multifunction device (B) and the PC (A) are designated as devices to be linked, the control unit 26 displays the device image 66 associated with the multifunction device (B) and a device image 104 associated with the PC (A) in the display area 56*a* as images associated with the conversation partner, in place of the image 58 associated with the automatic response AI. The device image 104 may be an image generated by capturing the PC (A) (for example, an external appearance image of the PC (A)), or may be an image imitating the PC (A) (for example, an icon). Of course, the control unit 26 may display character strings indicating the multifunction device (B) and PC (A) in the display area 56*a* as information indicating the conversation partner, in place of the device images 66 and 104 or along with the device images 66 and 104.

Further, the control unit 26 displays a message content 106 for confirming the plural devices designated by the user in the display area 56*a* as a message content of the automatic response AI. In the case where the multifunction device (B) and the PC (A) are designated as the devices to be linked, for example, a message content 106 such as "Multifunction device (B) and PC (A)?" is displayed as a message content of the automatic response AI in the display area 56*a*.

When the user approves with respect to the message content 106 (for example, when the user issues a message content 108 such as "Yes"), the control unit 26 displays the information on the linkage functions executable using the PC (A) and the multifunction device (B) in the display area 56*a* as a message content 110 of the multifunction device (B) and the PC (A). The message content 110 itself is a message content created by the general-purpose automatic response AI. The control unit 26 displays the message content 110 in the display area 56*a* as a message content associated with the device image 66 of the multifunction device (B) and the device image 104 of the PC (A), in order to act as if the multifunction device (B) and the PC (A) make the message content 110. Since the linkage functions executable using the multifunction device (B) and the PC (A) are the "scan transfer function" and the "print function" (see FIG. 6), the control unit 26 displays character strings or images indicating the "scan transfer function" and the "print function" in the display area 56*a* as a message content of the multifunction device (B) and the PC (A).

When the user gives an execution instruction with respect to the message content 110 by designating linkage functions by a message content 112, the control unit 26 (for example, the control unit 26 implemented by the automatic response AI) receives the execution instruction and transmits information indicating the execution instruction (execution instruction information) to the devices to be linked. As another example, a button image for instructing the execution of the linkage functions is displayed on the screen 56, and the user may press the button image to give an execution instruction of the linkage functions. When the PC (A) and the multifunction device (B) are selected as the devices to be linked, the execution instruction information is transmitted to the PC (A) and the multifunction device (B). The PC (A) and the multifunction device (B) that have received the execution instruction information execute the linkage functions indicated in the execution instruction information (the linkage functions designated by the user). For example, when the execution instruction of the "print function" is given as a linkage function, the PC (A) transmits image data to be printed to the multifunction device (B), and the multifunction device (B) prints the image data on paper as a recording medium.

When the user (the terminal device 10) moves out of the areas 50 and 78, the control unit 26 displays the image 58 associated with the general-purpose automatic response AI in the display area 56*a* as an image associated with the conversation partner, in place of the images 66 and 104. Further, the control unit 26 deletes the device image 90 associated with the multifunction device (B) and the device image 92 associated with the PC (A) from the stock area 88.

When the user moves out of the area 50 but exists in the area 78, the control unit 26 may display the device image 104 in the display area 56*a* as an image associated with the conversation partner. In this case, similarly to the first exemplary embodiment, the specifying unit 30 identifies the PC (A) as a device to be used. The same is true when the user moves out of the area 78 but exists in the area 50.

As described above, according to the third exemplary embodiment, the display of the conversation partner who is responding may be switched to the display of the plural devices to be linked. In this manner, the user may visually confirm the conversation partner who is responding.

When the user designates linkage functions by the message contents 112, the control unit 26 (automatic response AI) may cause the UI unit 20 to display a screen for controlling the devices to be linked (a remote control screen), without giving the execution instruction of the linkage functions to the devices to be linked. The remote control screen displays, for example, button images for instructing execution of the linkage functions (for example, a button image for instructing execution of the "scan transfer image" and a button image for instructing execution of the "print function"). When the user presses a button image on the remote control screen, the linkage function associated with the button image is executed. Further, it is possible to set various parameters on the remote control screen.

As another example, a remote control screen for controlling each device individually may be displayed. For example, a remote control screen for controlling the multifunction device (B) and a remote control screen for controlling the PC (A) are displayed. The remote control screen for the multifunction device (B) displays button images for instructing execution of solo functions that the multifunction device (B) has (for example, a button image for instructing execution of the copy function and a button image for instructing execution of the print function). Further, various parameters used in the multifunction device (B) may be set on the remote control screen for the multifunction device (B). The remote control screen for the PC (A) displays, for example, data (files) stored in the PC (A) and the storage location (folders). Further, it is possible to set various parameters used in the PC (A) on the remote control screen for the PC (A). Further, it is possible to set and gives an instruction to execute the linkage functions (for example, the "scan transfer function" or the "print function" as a linkage function) on both remote control screens.

When plural devices are displayed as conversation partners, the conversation partner of the user may be a general-purpose automatic response AI installed in the terminal device 10, or may be switched from the general-purpose automatic response AI to an automatic response AI equipped in the plural devices. For example, when an automatic response AI is equipped in the multifunction device (B), the automatic response AI equipped in the multifunction device (B) may function as a conversation partner, and when an automatic response AI is equipped in the PC (A), the automatic response AI equipped in the PC (A) may function as a conversation partner. When automatic response AIs are equipped in both of the multifunction device (B) and the PC (A), any one of the automatic response AIs equipped in both of the multifunction device (B) and the PC (A) may function as a conversation partner.

In the example illustrated in FIG. 11, information of two devices is transmitted to the automatic response AI, but information of three or more devices (for example, three or more device images or character strings indicating three or more devices) may be transmitted to the automatic response AI. In this case, in place of the image 58 associated with the automatic response AI, three or more device images are displayed as images associated with the conversation partners in the display area 56a.

Modifications 1 and 2 may be applied to the third exemplary embodiment. That is, when the user exists in an area of plural devices, the control unit 26 receives an execution instruction of linkage functions executable using the plural devices, and when the user does not exist in the area of the plural devices, the control unit 26 does not receive any execution instruction of the linkage functions executable using the plural devices.

Fourth Exemplary Embodiment

Figure 12:
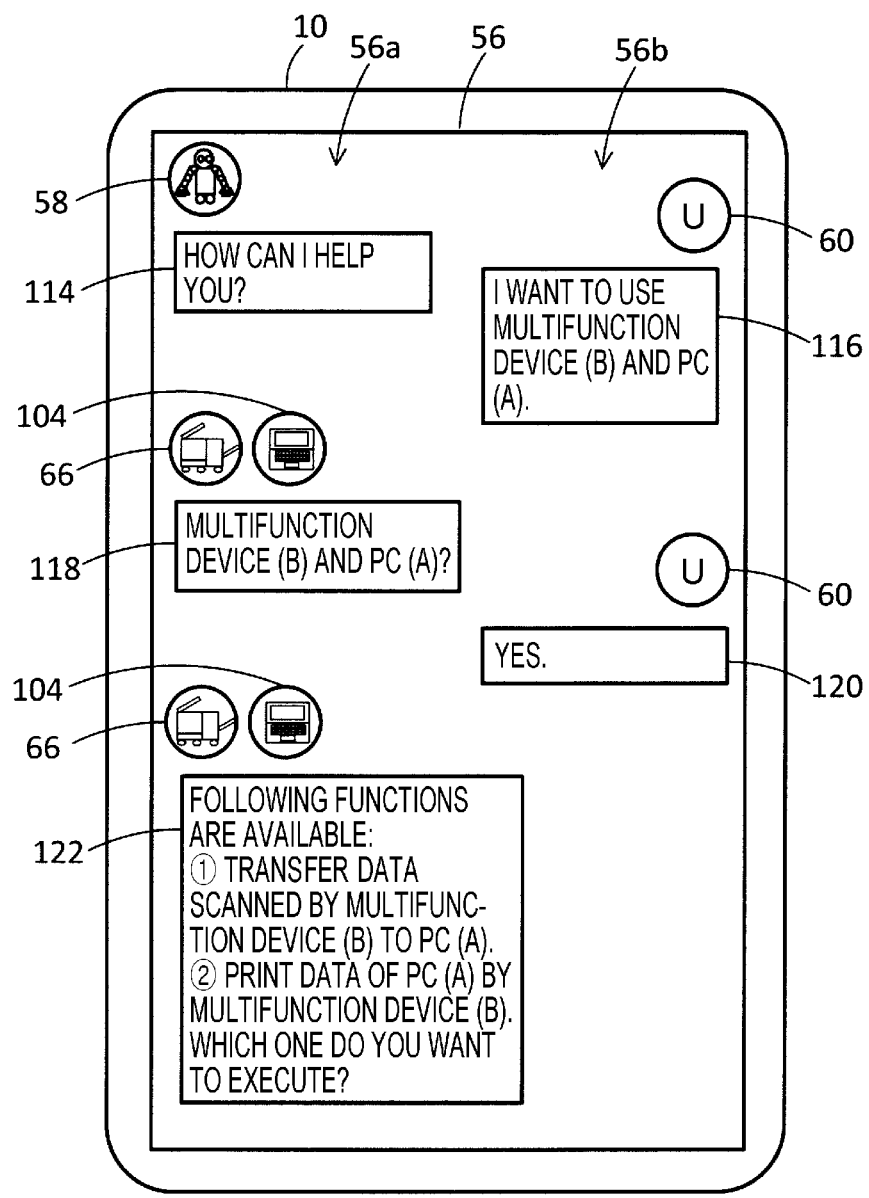
FIG. 12 is a diagram illustrating a screen.

Hereinafter, a fourth exemplary embodiment will be described with reference to FIG. 12. FIG. 12 illustrates a screen 56. The screen 56 displays an image 58 associated with the automatic response AI and an image 60 associated with the user are displayed as in FIG. 8, and further displays information indicating the conversation between the user and the automatic response AI.

When the chatting program is activated, a message content 114 such as "How can I help you?" is displayed as a message content of the automatic response AI in the display area 56a.

In the fourth exemplary embodiment, similarly to the third exemplary embodiment described above, it is assumed that the user (the terminal device 10) exists in both areas 50 and 78 (see the user 80 in FIG. 9). In this case, the specifying unit 30 identifies the multifunction device (B) and the PC (A) as devices to be linked and specifies linkage functions associated with the combination of the multifunction device (B) and the PC (A), for example, in the linkage function management table illustrated in FIG. 6. Therefore, the linkage functions executable using the multifunction device (B) and the PC (A) are identified.

Further, since the user exists in both of the areas 50 and 78, the control unit 26 displays the device image 66 associated with the multifunction device (B) and the device image 104 associated with the PC (A) in the display area 56a as images associated with the conversation partner, in place of the image 58 associated with the automatic response AI. The control unit 26 displays a message content 118 for confirming that the multifunction device (B) and the PC (A) have been identified as devices to be linked in the display area 56a as a message content of the multifunction device (B) and the PC (A).

Further, when the user requests use of a device by making a message such as "I want to use the multifunction device (B) and the PC (A)", a character string indicating the request may be displayed as a message content 116 of the user in the display area 56b. When the user inputs the message content 116 to the terminal device 10 as described above, the specifying unit 30 may identify the multifunction device (B) and the PC (A) as devices to be linked, and the control unit 26 may switch the image 58 associated with the automatic response AI to the images 66 and 104.

When the user approves with respect to the message content 118 (for example, when the user issues a message content 120 such as "Yes"), the control unit 26 displays the information on the linkage functions executable using the PC (A) and the multifunction device (B) in the display area 56a as a message content 122 of the multifunction device (B) and the PC (A). The message content 122 itself is a message content created by the general-purpose automatic response AI. The following process is the same as that of the third exemplary embodiment described above.

As described above, according to the fourth exemplary embodiment, when a user exists in an area of plural devices, the display of the conversation partner who is responding is switched to the display of the plural devices. In this manner, the user may visually confirm the conversation partner who is responding.

In the fourth exemplary embodiment, the conversation partner may be switched from the general-purpose automatic response AI to an automatic response AI equipped in the plural devices. Further, when the user exists in an area of three or more devices (that is, when the user exists in an area where areas of three or more devices overlap each other), the display of the conversation partner is switched to the display of the three or more devices.

(Display Example of Image Associated with Conversation Partner)

Hereinafter, a display example of an image associated with a conversation partner will be described with reference to FIGS. 13A to 13E. FIGS. 13A to 13E illustrate the display example. Here, it is assumed that the user exists in an area of plural devices (for example, the multifunction device (B) and the PC (A)), and the plural devices are identified as devices to be linked.

Figure 13A:
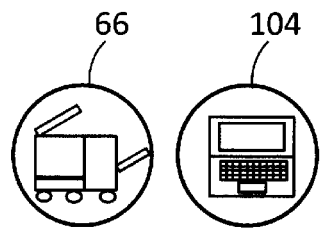
FIGS. 13A to 13E are diagrams illustrating an image associated with a conversation partner.

FIG. 13A illustrates images in the basic form. Similarly to the third exemplary embodiment described above, when the user exists in both areas 50 and 78 (that is, when the user exists in an area where the areas 50 and 78 overlap each other (see the user 80 in FIG. 9)), the device image 66 associated with the multifunction device (B) and the device image 104 associated with the PC (A) are displayed as images associated with the conversation partner in the display area 56a.

Figure 13B:
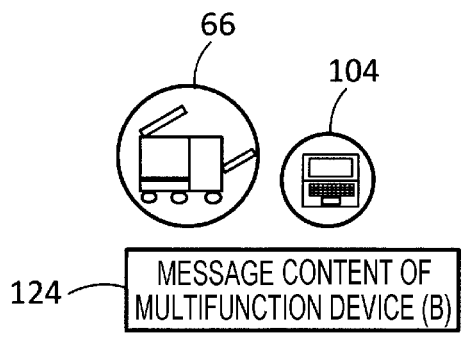

In the state where the device images 66 and 104 are displayed as images associated with the conversation partners as illustrated in FIG. 13A, when a message content 124 is displayed as a message content of the multifunction device (B) in the display area 56a as illustrated in FIG. 13B, the control unit 26 displays the device image 66 associated with the multifunction device (B) in the display area 56a, to be larger than the device image 104 associated with the PC (A). For example, when the PC (A) does not execute a process included in the linkage function but the multifunction device (B) executes the process included in the linkage function, information on the process is displayed as a message content of the multifunction device (B) in the display area 56a. In this case, the device image 66 is displayed larger than the device image 104. In this manner, the user may visually confirm the device that performs the process included in the linkage function. In the case where both the multifunction device (B) and the PC (A) perform the process included in the linkage function, as illustrated in FIG. 13A, the device images 66 and 104 are displayed with the same size as each other.

Figure 13C:
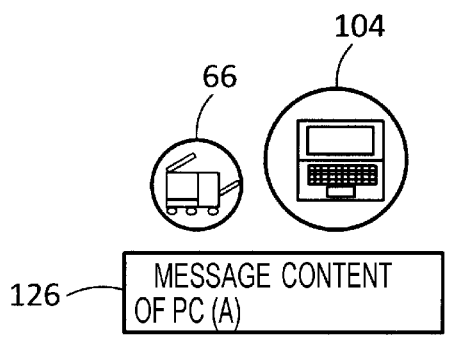

Meanwhile, when a message content 126 is displayed as a message content of the PC (A) in the display area 56a as illustrated in FIG. 13C, the control unit 26 displays the device image 104 in the display area 56a, to be larger than the device image 66. For example, when the PC (A) executes a process included in the linkage function but the multifunction device (B) does not execute the process included in the linkage function, information on the process is displayed as a message content of the PC (A) in the display area 56a.

Figure 13D:
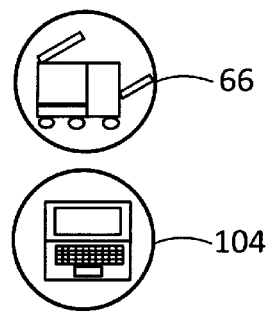

Further, in the example illustrated in FIG. 13A, the device images 66 and 104 are displayed so as to be arranged side by side in the lateral direction. However, as illustrated in FIG. 13D, the device images 66 and 104 may be displayed so as to be arranged side by side in the vertical direction. Of course, the device images 66 and 104 may be displayed in other arrangements.

Figure 13E:
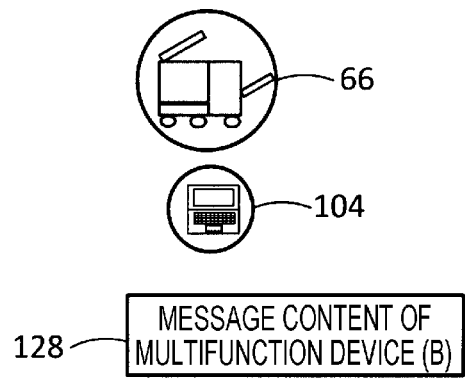

Further, when a message content 128 is displayed as a message content of the multifunction device (B) in the display area 56a as illustrated in FIG. 13E, the device image 66 associated with the multifunction device (B) may be displayed larger than the device image 104 associated with the PC (A). When a message content is displayed as a message content of the PC (A) in the display area 56a, the device image 104 is displayed larger than the device image 66.

Further, the size and display order of the device images may be changed depending on the positional relationship between each device and the user. For example, the control unit 26 may display a device image associated with a device closer to the user in an enlarged manner, or may display device images associated with respective devices in the order of closeness to the user.

Further, the display order of the device images may be changed depending on the message order of the user. For example, when the user makes messages in the order of the "multifunction device (B)" and the "PC (A)," the device images 66 and 104 may be displayed in the order of the device image 66 associated with the multifunction device (B) and the device image 104 associated with the PC (A). For example, the previously designated device (for example, the multifunction device (B)) may be displayed on the left or upper side, and the subsequently specified device (for example, PC (A)) may be displayed on the right or lower side. Of course, the order of display may be determined by the order of device identification, the order of registration, etc., irrespective of the order of designation. Further, a device image of a device that is making a message (a device associated with a message content) may be displayed at a predetermined position (for example, the left side or the upper side). In this manner, the user may visually confirm the device that is making a message (for example, the device that performs a process).

(Access Process to Device)

Figure 14:
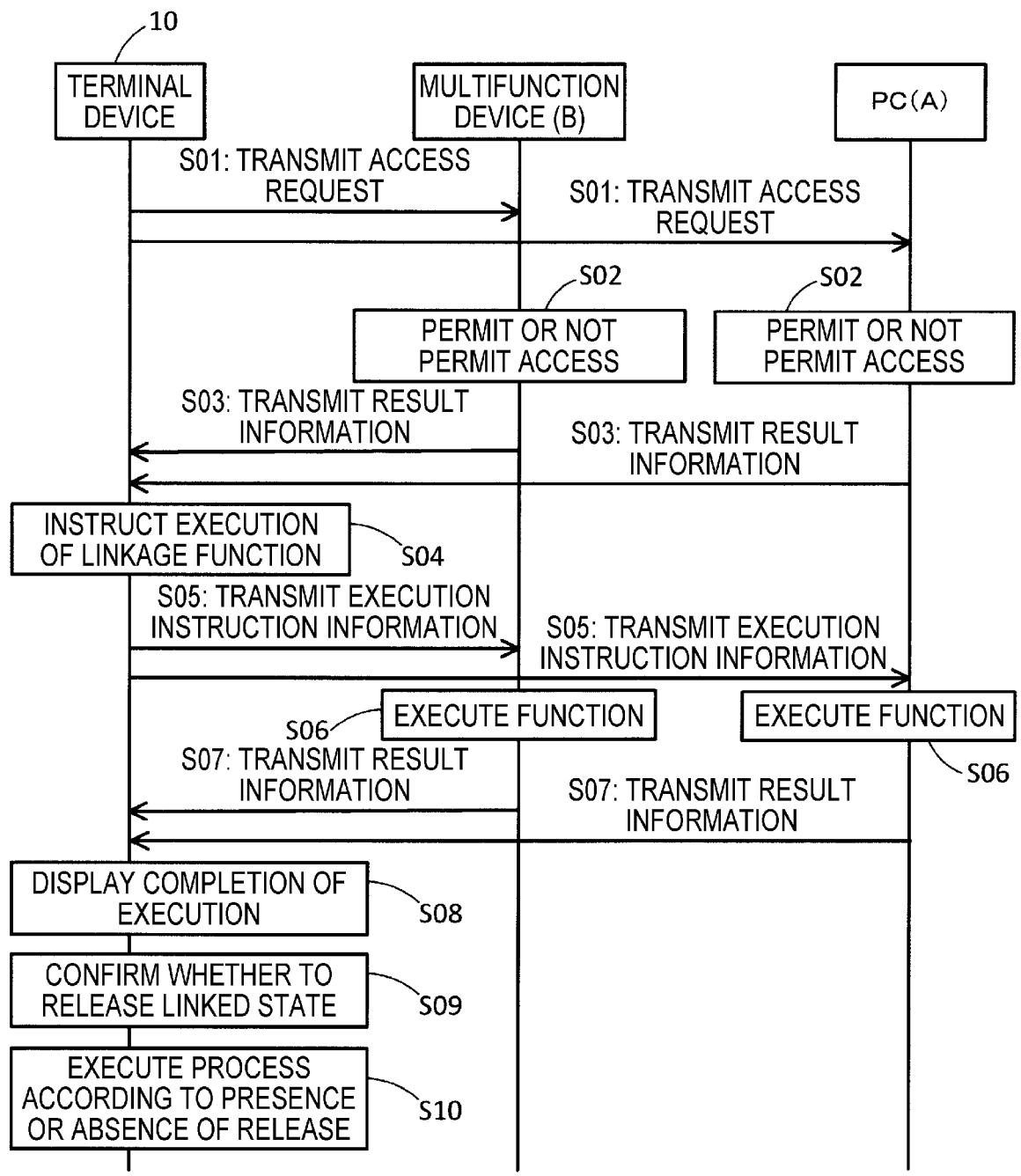
FIG. 14 is a sequence diagram illustrating an operation of the device system.

Hereinafter, an operation when executing a linkage function will be described. For example, when a linkage function is executed, an access request is transmitted from the terminal device 10 to each device to be linked, and the terminal device 10 and each device to be linked are connected. Hereinafter, the access process will be described with reference to FIG. 14. FIG. 14 is a sequence diagram illustrating the process.

When the multifunction device (B) and the PC (A) are identified as the devices to be linked in the terminal device 10 (that is, when the user exists in the area of the multifunction device (B) and the PC (A)), the terminal device 10 transmits the information indicating the access request to the devices to be linked (the multifunction device (B) and the PC (A)) (S01). This transmission may be controlled by an automatic response AI. For example, when address information indicating the address of each of the devices to be linked is stored in the server 16, the terminal device 10 acquires the address information of each of the devices to be linked from the server 16. In a case where the address information is included in the device identification information, the control unit 26 of the terminal device 10 may acquire the address information from the device identification information of each device. A process of acquiring the address information may be performed by an automatic response AI. Of course, the address information of each device may be stored in the storage unit 24 of the terminal device 10. The terminal device 10 may acquire the address information of each device by another method. The terminal device 10 transmits the information indicating the access request to each of the devices to be linked (for example, the multifunction device (B) and the PC (A)) by using the address information of each of the devices to be linked.

The multifunction device (B) and the PC (A) that have received the information indicating the access request determine whether to permit the access to the terminal device 10 (S02). For example, when the multifunction device (B) and the PC (A) correspond to devices that are not permitted to connect, or when the number of devices requesting access exceeds the upper limit, access is not permitted. When the access from the terminal device 10 is permitted, the changing operation may be prohibited such that setting information unique to each of the multifunction device (B) and the PC (A) is not changed from the terminal device 10. For example, it may be prohibited to change the color parameters of the multifunction device (B), the setting time when shifting to power saving, and the like. As a result, the security for the device to be linked is improved. As another example, when linking devices, change of setting information may be restricted as compared with a case where the devices are used alone without being linked. For example, it may be permitted to change a smaller number of setting items as compared with the case where the device is used alone. In addition, browsing of other users' personal information such as the operation history may be prohibited. As a result, the security for the user's personal information is improved.

Result information indicating permission or non-permission of the access is transmitted from the multifunction device (B) and the PC (A) to the terminal device 10 (S03). When the access to the multifunction device (B) and the PC (A) is permitted, communication is established between the terminal device 10 and the multifunction device (B), and further communication is established between the terminal device 10 and the PC (A).

Next, in the terminal device 10, the user instructs execution of a linkage function (for example, a "print function") (S04). The terminal device 10 transmits information indicating the execution instruction of the linkage function (execution instruction information) to each of the devices to be linked (the multifunction device (B) and the PC (A)) according to the instruction (S05). This transmission may be controlled by an automatic response AI. The execution instruction information transmitted to the multifunction device (B) includes information indicating a process to be executed by the multifunction device (B) (for example, job information), and the execution instruction information transmitted to the PC (A) includes information indicating a process to be executed by the PC (A) (for example, job information).

The multifunction device (B) and the PC (A) that have received the execution instruction information execute the linkage function (for example, the "print function") according to the execution instruction information (S06). When the linkage function to be executed includes a process of transmitting and receiving data between the multifunction device (B) and the PC (A), communication is established between the multifunction device (B) and the PC (A). For example, the execution instruction information transmitted to the multifunction device (B) includes address information of the PC (A), and the execution instruction information transmitted to the PC (A) includes address information of the multifunction device (B). Communication is established between the multifunction device (B) and the PC (A) using these pieces of address information. After the communication is established, the PC (A) transmits image data to be printed to the multifunction device (B), and the multifunction device (B) prints the image data on paper as a recording medium.

When the execution of the linkage function is completed, information indicating completion of execution of the linkage function is transmitted from the multifunction device (B) and the PC (A) to the terminal device 10 (S07). Information indicating that execution of the linkage function has been completed is displayed on the UI unit 20 of the terminal device 10 (S08). When information indicating completion of execution is not displayed even though a preset time has elapsed since the execution instruction is given, the control unit 26 of the terminal device 10 may cause the UI unit 20 to display information indicating an error, and again transmit execution instruction information or information indicating an access request to the multifunction device (B) and the PC (A).

Next, the user confirms whether or not to release the linked state between the multifunction device (B) and the PC (A) (S09), and a process is executed according to the presence or absence of the release (S10). When releasing the linked state, the user gives an instruction of release by using the terminal device 10. Therefore, the communication between the terminal device 10 and the multifunction device (B) is released, and further the communication between the terminal device 10 and the PC (A) is released. Similarly, the communication between the multifunction device (B) and the PC (A) is released as well. When the linked state is not to be released, the execution instruction may be given continuously.

Modifications 1 and 2 may be applied to the fourth exemplary embodiment. That is, when the user exists in an area of plural devices, the control unit 26 receives an execution instruction of linkage functions executable using the plural devices, and when the user does not exist in the area of the plural devices, the control unit 26 does not receive any execution instruction of the linkage functions executable using the plural devices.

Fifth Exemplary Embodiment

Hereinafter, a fifth exemplary embodiment will be described. In the fifth exemplary embodiment, the display of the conversation partner is switched to the display of the function depending on the position of the user. For example, depending on the position of the user, usable functions (for example, functions implemented by software or functions implemented by the device) change, and thus, the display of the conversation partner is switched to the display of a function.

For example, management information indicating association between an area and a usable function in the area is prepared in advance, and the management information is stored in the storage unit 24 of the terminal device 10. Of course, the management information may not be stored in the terminal device 10 but may be stored in an external device such as the server 16. The specifying unit 30 identifies the position of the terminal device 10 (the user) based on the position information of the terminal device 10 acquired by the position information acquiring unit 28 and specifies a function associated with the area including the position of the user in the management information. This function is a function that is usable by the terminal device 10 in the place where the user exists. For example, a function that is usable only in a specific office is determined, and the position of the specific office and the function are associated with each other and registered in the management information. When the user exists in the specific office, the terminal device 10 is enabled to use the function associated with the specific office.

When the function is implemented by software, the usable software may be software installed in the terminal device 10, or may be software installed in an external device such as the server 16. When the software is installed in an external device, a function for the software is provided to the terminal device 10 via a communication path.

Figure 15:
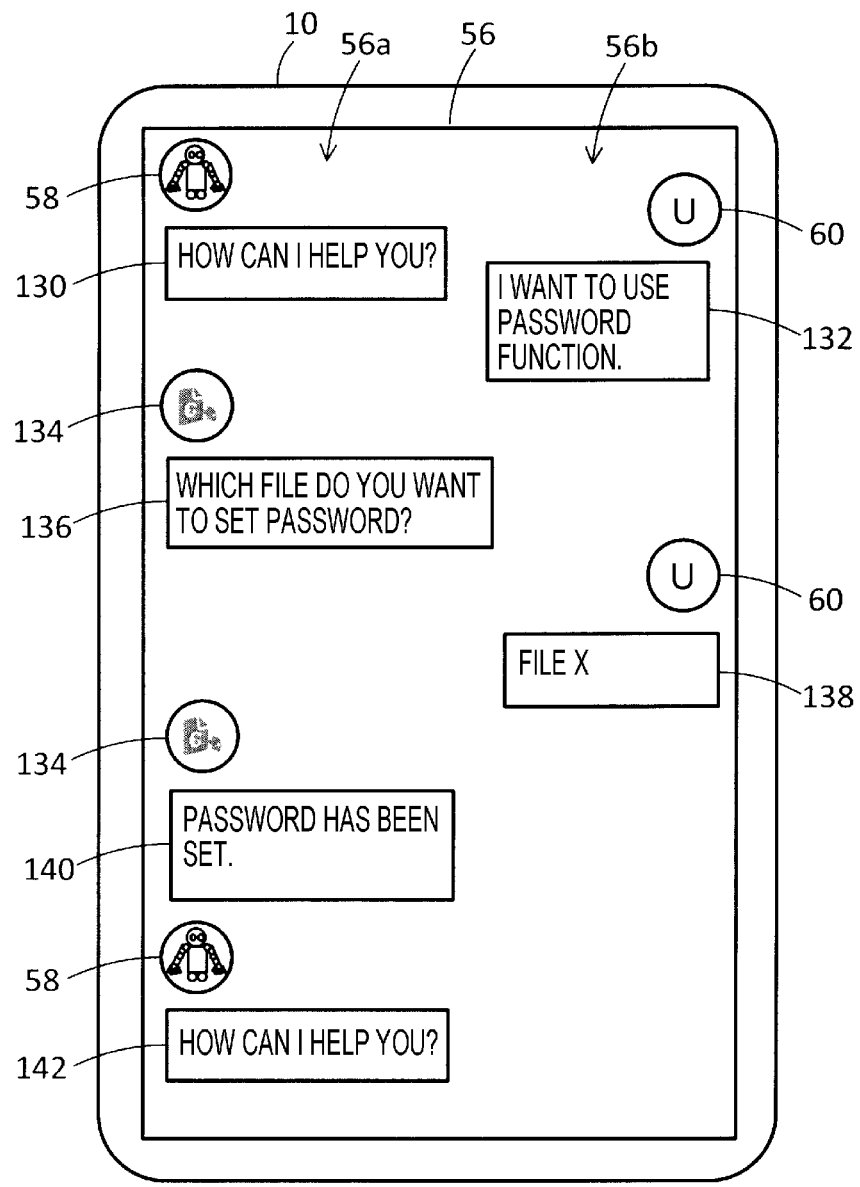
FIG. 15 is a diagram illustrating a screen.

Hereinafter, the fifth exemplary embodiment will be described in detail with reference to FIG. 15. FIG. 15 illustrates a screen 56. The screen 56 displays an image 58 associated with the automatic response AI and an image 60 associated with the user are displayed as in FIG. 8, and further displays information indicating the conversation between the user and the automatic response AI.

When the chatting program is activated, a message content 130 such as "How can I help you?" is displayed as a message content of the automatic response AI in the display area 56a, as in the first exemplary embodiment.

The position information acquiring unit 28 acquires position information of the terminal device 10 (the user), and the specifying unit 30 identifies the position of the terminal device 10 based on the position information. For example, when the user exists in an area where a password function is usable, the specifying unit 30 determines that the user (terminal device 10) exists in an area where the password function is usable, based on the position information of the terminal device 10. The password function is a function implemented by password setting software.

When the user (the terminal device 10) exists in an area where the password function is usable, the specifying unit 30 identifies the password function as a function to be used.

When the user (the terminal device 10) exists in an area of a function, the control unit 26 switches the display of the conversation partner from the display of the general-purpose automatic response AI to the display of the function (for example, an image associated with the function or a character string indicating the function).

In the above-described example, since the user exists in the area of the password function, the control unit 26 displays a function image 134 associated with the password function in the display area 56a as an image associated with the conversation partner, in place of the image 58 associated with the automatic response AI.

The function image may be, for example, an image associated with software (an application, etc.) or an image associated with a device in which a process is performed (a device present in the real space). The function image is, for example, an image such as an icon, which may be regarded as a virtual image in the sense of distinguishing an image representing an actual external appearance of a device as hardware (for example, a photograph) or an image representing the device itself. The function image 134 is an image associated with the password setting software.

The control unit 26 may display a character string indicating the password function in the display area 56a as information indicating the conversation partner, in place of the function image 134 or along with the function image 134.

Further, the control unit 26 displays a message content 136 such as "Which file do you want to set a password?" in the display area 56a as a message content of the password setting software. The message content 136 itself is a message content created by the general-purpose automatic response AI. The control unit 26 displays the message content 136 in the display area 56a as a message content associated with the function image 134 of the password setting software, in order to act as if the password setting software makes the message content 136.

Further, when the user requests use of a function by making a message such as "I want to use the password function", a character string indicating the request may be displayed as a message content 132 of the user in the display area 56b.

When the user inputs the message content 132 to the terminal device 10 as described above, the specifying unit 30 may identify the password function as a function to be used, and the control unit 26 may switch the image 58 associated with the automatic response AI to the function image 134 associated with the password function.

For the above message content 136, the user designates a file to be processed. In the example illustrated in FIG. 15, a message content 138 indicating a "file X" as an object to be processed is input to the terminal device 10 as a message content of the user.

The control unit 26 specifies the file X to be processed by analyzing the message content 138 of the user. The control unit 26 activates password setting software and sets a password to the file X by the password setting software.

When the setting of the password is completed, the control unit 26 displays a message content 140 indicating that the setting of the password has been completed, in the display area 56a as a message content of the password setting software. Even in this case, the control unit 26 displays the function image 134 associated with the password function in the display area 56a, and displays the message content 140 in the display area 56a as a message content associated with the function image 134 of the password function. The message content 140 itself is a message content created by the general-purpose automatic response AI.

When the user (the terminal device 10) moves out of the area of the password function, the control unit 26 displays the image 58 associated with the general-purpose automatic response AI in the display area 56a as an image associated with the conversation partner, in place of the function image 134 associated with the password function. Further, the control unit 26 displays a message content 142 indicating a common question such as "How can I help you?" in the display area 56a as a message content of the automatic response AI.

As described above, according to the fifth exemplary embodiment, when the user (the terminal device 10) exists in an area of a function, the function is identified as a function to be used, and the display of a conversation partner who is responding is switched to the display of the function. In this manner, the user may visually confirm the conversation partner who is responding.

When an automatic response AI is assigned for each function, the display of the conversation partner may be switched from the display of the general-purpose automatic response AI to the display of the function, and the automatic response AI (for example, the program) as a conversation partner for the user may be switched from the general-purpose automatic response AI to an automatic response AI assigned to the function.

(Modification 3)

Hereinafter, Modification 3 will be described. In Modification 3, the control unit 26 controls the output of an instruction related to a function to the conversation partner who is responding, depending on the position of the user. For example, when the user exists in the area of the function, the control unit 26 receives an instruction related to the function from the user. Meanwhile, when the user exists outside the area of the function, the control unit 26 does not receive an instruction related to the function from the user. In this manner, when the user exists in the area of the function, the user is able to give instructions to the function, and when the user exists outside the area of the function, the user is not able to give instructions to the function. Since the area where instructions are able to be given to the function is limited, the security of the function may be improved. For example, the security of the function may be improved by setting the area of the function such that only users who stay in a specific room in the office are able to give instructions to the function associated with the specific room.

For example, when the user exists in the area of the password function, the control unit 26 receives a user's instruction related to the password function. For example, the user may use the UI unit 20 of the terminal device 10 to give an instruction for a password setting process to the password setting software. Meanwhile, when the user exists outside the area of the password function, the control unit 26 does not receive a user's instruction related to the password function. In this case, the user is unable to give an instruction for the password setting process to the password setting software. In this manner, it is possible to construct a secure environment for the password setting software.

In Modification 3, when the user exists in an area of a function, the control unit 26 may or may not switch the image associated with the conversation partner from the image associated with the general-purpose automatic response AI to an image associated with the function.

Sixth Exemplary Embodiment

Hereinafter, a sixth exemplary embodiment will be described with reference to FIG. 16. In the fifth exemplary embodiment, one function is identified. In the sixth exemplary embodiment, however, plural functions are identified.

Figure 16:
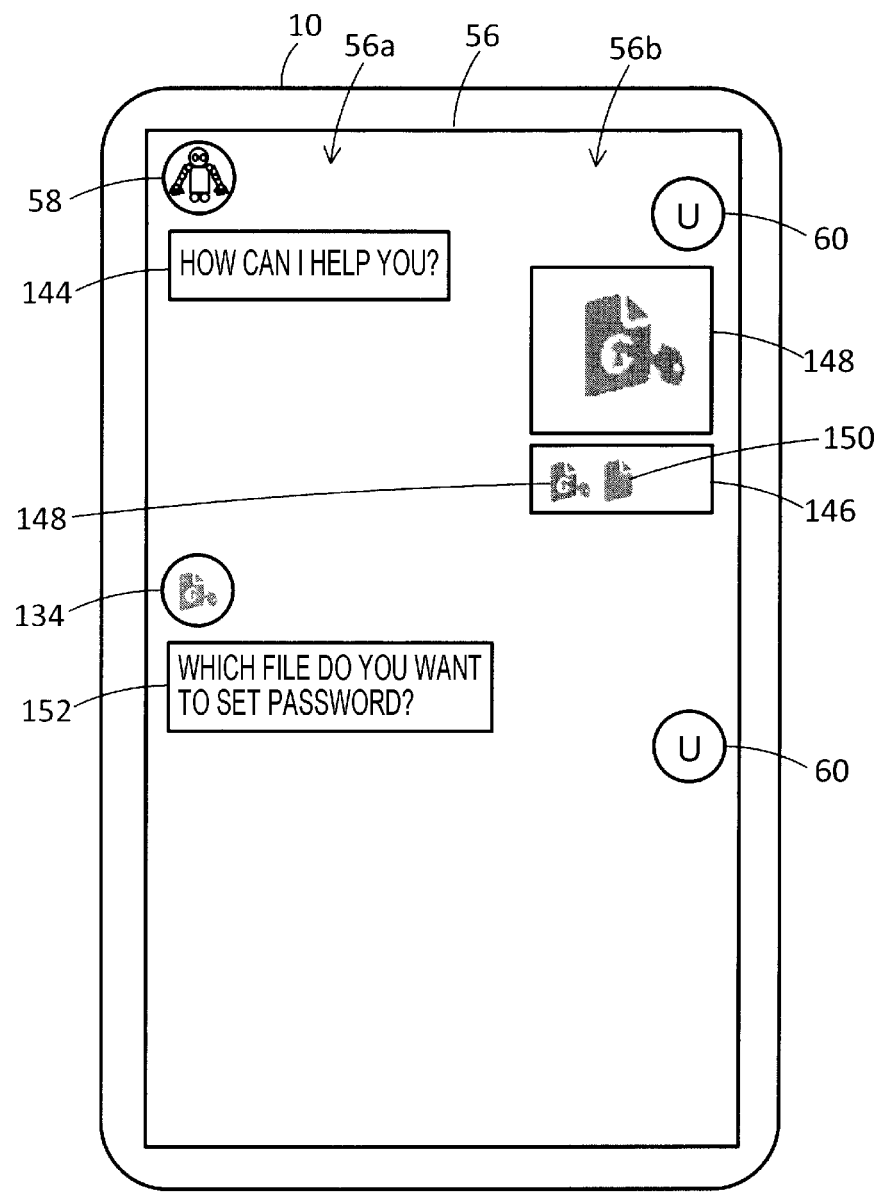
FIG. 16 is a diagram illustrating a screen.

FIG. 16 illustrates a screen 56. The screen 56 displays an image 58 associated with the automatic response AI and an image 60 associated with the user are displayed as in FIG. 8, and further displays information indicating the conversation between the user and the automatic response AI.

When the chatting program is activated, a message content 144 such as "How can I help you?" is displayed as a message content of the automatic response AI in the display area 56*a*, as in the first exemplary embodiment.

The position information acquiring unit 28 acquires position information of the terminal device 10, and the specifying unit 30 identifies the position of the terminal device 10 based on the position information.

For example, it is assumed that the user exists in both of an area where a password function is usable and an area where a data transmission function is usable. That is, it is assumed that the user exists in an area where the area of the password function and the area of the data transmission function overlap each other. In this case, the specifying unit 30 determines that the user (the terminal device 10) exists in the area where the password function is usable, based on the position information of the terminal device 10. Further, the specifying unit 30 determines that the user (the terminal device 10) exists in the area where the data transmission function is usable, based on the position information of the terminal device 10. The data transmission function is a function implemented by data transmission software.

When the user (the terminal device 10) exists in the area of the password function, the specifying unit 30 identifies the password function as a candidate of a function to be used. Similarly, when the user (the terminal device 10) exists in the area of the data transmission function, the specifying unit 30 identifies the data transmission function as a candidate of a function to be used.

When plural functions are identified as described above, the control unit 26 displays a stock area 146 in the display area 56*b* for the user and displays function images in the stock area 146. The stock area 146 is an area where information on the candidates of a function to be used is displayed. In the example illustrated in FIG. 16, the function images are displayed as an example of candidate information. For example, the control unit 26 displays the function images associated with the functions identified as described above, in the stock area 146. In the example illustrated in FIG. 16, function images 148 and 150 are displayed in the stock area 146. The function image 148 is an image associated with the password function (password setting software). The function image 150 is an image associated with the data transmission function (data transmission software). When the functions are identified in this manner, the control unit 26 displays function images associated with the functions in the stock area 146. Of course, the control unit 26 may display character information indicating the identified functions in the stock area 146, in place of the function images or along with the function images.

When the user exists only in the area of the password function, only the function image 148 associated with the password function is displayed in the stock area 146. Similarly, when the user exists only in the area of the data transmission function, only the function image 150 associated with the data transmission function is displayed in the stock area 146.

Further, when there are other function images that cannot be all displayed in the stock area 146, the user performs a scroll operation on the function images displayed in the stock area 146 such that the other device images are displayed in the stock area 146.

The user may select an image associated with the function to be used (the function image 148 in the example illustrated in FIG. 16) from the stock area 146 and move the function image 148 out of the stock area 146, so that the function image 148 may be transmitted to the automatic response AI as a message content of the user. The user may input character information or voice information indicating a function to be used to the terminal device 10 so that information indicating the function to be used is transmitted to the automatic response AI.

As described above, when a function to be used is designated by the user, the control unit 26 switches the display of the conversation partner from the display of the general-purpose automatic response AI to the display of the function. In the example illustrated in FIG. 16, since the user designates the password function as a function to be used by designating the function image 148, the control unit 26 displays the function image 134 associated with the password function in the display area 56*a* as an image associated with the conversation partner, in place of the image 58 associated with the automatic response AI.

Then, similarly to the fifth exemplary embodiment, the control unit 26 displays a message content 152 such as "Which file do you want to set a password?" in the display area 56*a* as a message content of the multifunction device (B).

When the user (the terminal device 10) moves out of the area of the password function, the control unit 26 displays the image 58 associated with the general-purpose automatic response AI in the display area 56*a* as an image associated with the conversation partner, in place of the function image 134 associated with the password function. Further, the control unit 26 deletes the function image 148 associated with the password function from the stock area 146. When the user (the terminal device 10) moves out of the area of the data transmission function, the control unit 26 deletes the function image 150 associated with the data transmission function from the stock area 146. When the user moves into an area of a new function, the new function is identified as a candidate of a function to be used, and information of the new function (for example, a function image associated with the new function) is displayed in the stock area 146.

As described above, according to the sixth exemplary embodiment, when the user (the terminal device 10) exists in an area of plural functions, the plural functions are identified as candidates of a function to be used, and the display of a conversation partner who is responding is switched to the display of a function selected from the plural functions by the user. In this manner, the user may visually confirm the conversation partner who is responding.

The display of the conversation partner may be switched from the display of the general-purpose automatic response AI to the display of the function, and the automatic response AI (for example, the program) as a conversation partner for the user may be switched from the general-purpose automatic response AI to an automatic response AI assigned to the function.

When the user exists in the area of plural functions, the specifying unit 30 may identify a function closest to the user among the plural functions as the function to be used, and the control unit 26 may switch the display of the general-purpose automatic response AI to the display of the function closest to the user.

(Modification 4)

Hereinafter, Modification 4 will be described. Similarly to Modification 3, in Modification 4, the control unit 26 controls the output of an instruction related to a function to the conversation partner who is responding, depending on the position of the user. For example, when the user exists in an area of plural functions, the control unit 26 receives an instruction related to each of the plural functions from the user.

For example, when the user exists in both the area of the password function and the area of the data transmission function, the control unit 26 receives a user's instruction related to the password function and the data transmission function. The user may use the UI unit 20 of the terminal device 10 to give an instruction for the password setting process to the password setting software and give an instruction for a data transmitting process to the data transmission software.

Further, similarly to the sixth exemplary embodiment described above, when a function is selected from plural functions by the user, the control unit 26 may receive an instruction related to the selected function from the user. In the example illustrated in FIG. 16, the user exists in both areas of the password function and the data transmission function, but the password function is selected by the user. In this case, the control unit 26 receives a user's instruction related to the password function.

Further, when the user exists in an area of plural functions, the control unit 26 may receive, from the user, an instruction related to a function closest to the user among the plural functions.

According to Modification 4, when the user exists in an area of plural functions, it is possible to construct a secure environment for the functions.

In Modification 4, when the user exists in an area of a function, the control unit 26 may or may not switch the image associated with the conversation partner from the image associated with the general-purpose automatic response AI to an image associated with the function.

Seventh Exemplary Embodiment

Hereinafter, a seventh exemplary embodiment will be described. In the sixth exemplary embodiment, one function is selected by the user. In the seventh exemplary embodiment, however, plural functions are selected by the user.

FIG. 17 illustrates an exemplary linkage function management table according to the seventh exemplary embodiment. The linkage function management table is information indicating linkage functions executable using plural functions. In the linkage function management table, as an example, a combination of function IDs (for example, a combination of IDs for identifying software), information indicating function names (for example, software names), and information indicating linkage functions executable using plural functions are associated with each other. The linkage functions executable using plural functions are specified by referring to the linkage function management table.

For example, software a as a function is software that transmits data, and software 13 as a function is software that locks the data with a password. For example, a linkage function of transmitting data after setting a password for the data is implemented by combining the software a and the software 13. For other software, executable linkage functions are similarly specified.

A linkage function executable using three or more functions (for example, software) may be specified. In this case, a combination of three or more functions and a linkage function are associated with each other, and the association is registered in the linkage function management table.

Figure 18:
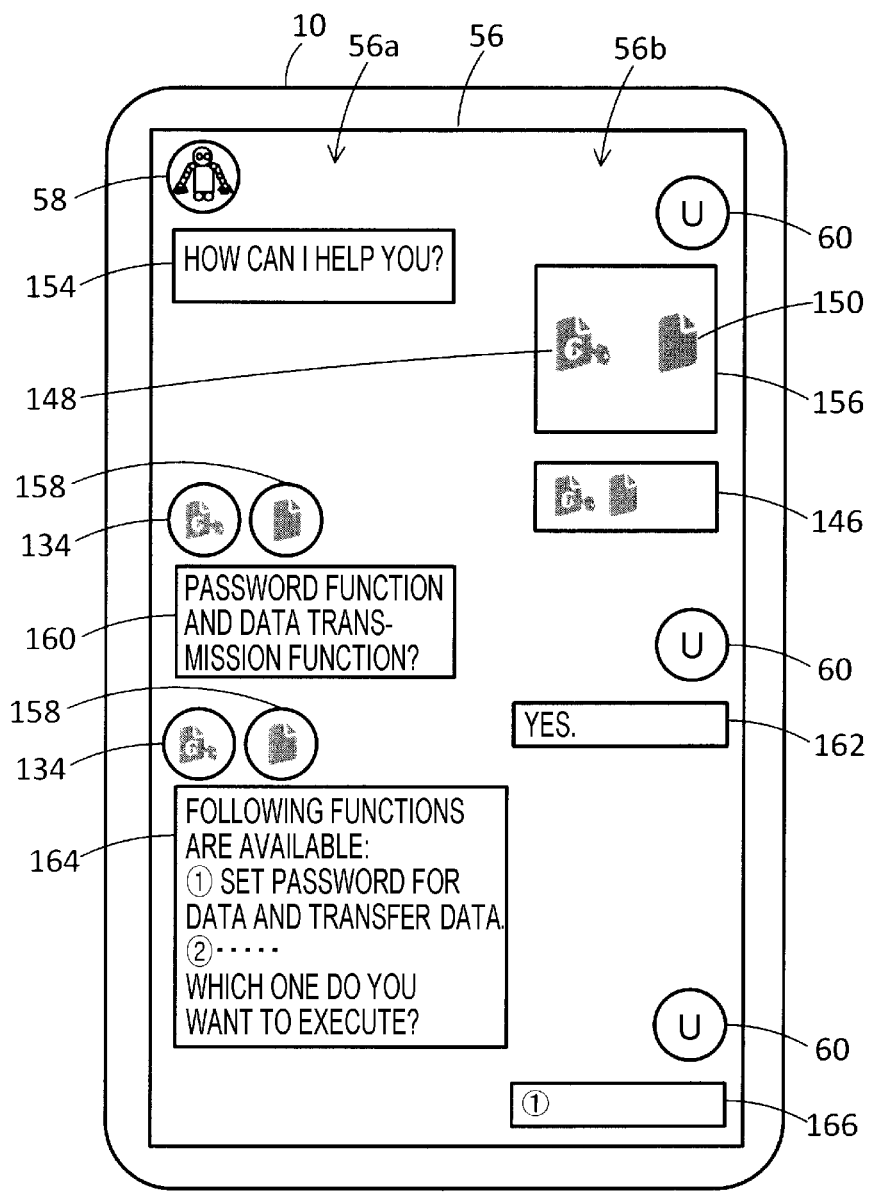
FIG. 18 is a diagram illustrating a screen.

FIG. 18 illustrates a screen 56. The screen 56 displays an image 58 associated with the automatic response AI and an image 60 associated with the user are displayed as in FIG. 8, and further displays information indicating the conversation between the user and the automatic response AI.

When the chatting program is activated, a message content 154 such as "How can I help you?" is displayed as a message content of the automatic response AI in the display area 56a.

In the seventh exemplary embodiment, similarly to the sixth exemplary embodiment described above, it is assumed that the user (the terminal device 10) exists in both an area of a password function and an area of a data transmission function. In this case, a function image 148 associated with the password function and a function image 150 associated with the data transmission function are displayed in the stock area 146.

For example, the user may select the function images 148 and 150 from the stock area 146 and move the function images 148 and 150 out of the stock area 146, so that the function images 148 and 150 may be transmitted to the automatic response AI as a message content of the user. In the example illustrated in FIG. 18, an image 156 in which the function images 148 and 150 are displayed is generated, and the image 156 is transmitted to the automatic response AI. The user may input character information or voice information indicating plural functions to be used to the terminal device 10 so that information indicating the plural functions to be used is transmitted to the automatic response AI.

As described above, when plural functions to be used are designated by the user, the specifying unit 30 identifies the plural functions as functions to be linked and specifies linkage functions associated with a combination of the plural functions, for example, in the linkage function management table illustrated in FIG. 17. Therefore, the linkage functions executable using the plural functions are identified.

In the above-described example, the specifying unit 30 identifies the password function associated with the function image 148 and the data transmission function associated with the function image 150 as functions to be linked and specifies linkage functions (for example, a function of setting a password for data and transferring the data, etc.) associated with the combination of the password function and the data transmission function in the linkage function management table illustrated in FIG. 17. Therefore, the linkage functions executable using the password function and the data transmission function are identified. The process of specifying the functions and the linkage functions may be performed by the server 16.

Further, when plural functions to be used are designated by the user, the control unit 26 switches the display of the conversation partner from the display of the general-purpose automatic response AI to the display of the plural functions designated by the user.

In the above-described example, since the password function and the data transmission function are designated as functions to be linked, the control unit 26 displays the function image 134 associated with the password function and the function image 158 associated with the data transmission function in the display area 56a as images associated with the conversation partner, in place of the image 58 associated with the automatic response AI. Of course, the control unit 26 may display character strings indicating the password function and the data transmission function in the display area 56a as information indicating the conversation partner, in place of the function images 134 and 158 or along with the function images 134 and 158.

Further, the control unit 26 displays a message content 160 for confirming the plural functions designated by the user in the display area 56a as a message content of the automatic response AI. In the case where the password function and the data transmission function are designated as the functions to be linked, for example, the message content 160 such as "Password function and Data transmission function?" is displayed as a message content of the automatic response AI in the display area 56a.

When the user approves with respect to the message content 160 (for example, when the user issues a message content 162 such as "Yes"), the control unit 26 displays the information on the linkage functions executable using the password function and the data transmission function in the display area 56a as a message content 164 of the password function and the data transmission function. The message content 164 itself is a message content created by the general-purpose automatic response AI. The control unit 26 displays the message content 164 in the display area 56a as a message content associated with the function image 134 of the password function and the function image 158 of the data transmission function, in order to act as if the password function and the data transmission function make the message content 164.

When the user gives an execution instruction with respect to the message content 164 by designating linkage functions by a message content 166, the control unit 26 (for example, the control unit 26 implemented by the automatic response AI) receives the execution instruction and controls the execution of the linkage functions. As another example, a button image for instructing the execution of the linkage functions is displayed on the screen 56, and the user may press the button image to give an execution instruction of the linkage functions. For example, the control unit 26 activates the password setting software and data transmission software, sets a password to a file designated by the user, by the password setting software, and transmits the file set with the password to a transfer destination designated by the user, by the data transmission software.

When the user (the terminal device 10) moves out of the area of the password function and the data transmission function, the control unit 26 displays the image 58 associated with the general-purpose automatic response AI in the display area 56a as an image associated with the conversation partner, in place of the function images 134 and 158. Further, the control unit 26 deletes the function image 148 associated with the password function and the function image 150 associated with the data transmission function from the stock area 146.

When the user moves out of the area of the password function but exists in the area of the data transmission function, the control unit 26 may display the function image 158 in the display area 56a as an image associated with the conversation partner. In this case, the specifying unit 30 identifies the data transmission function as a function to be used. The same is true when the user moves out of the area of the data transmission function but exists in the area of the password function.

As described above, according to the seventh exemplary embodiment, the display of the conversation partner who is responding may be switched to the display of the plural functions to be linked. In this manner, the user may visually confirm the conversation partner who is responding.

When plural functions are displayed as conversation partners, the conversation partner of the user may be a general-purpose automatic response AI equipped in the terminal device 10, or may be switched from the general-purpose automatic response AI to an automatic response AI assigned to each of the plural functions. For example, when the automatic response AI assigned to the password function is stored in the terminal device 10 or the server 16, the automatic response AI assigned to the password function may function as a conversation partner. Similarly, when the automatic response AI assigned to the data transmission function is stored in the terminal device 10 or the server 16, the automatic response AI assigned to the data transmission function may function as a conversation partner. When both automatic response AIs of the password function and the data transmission function are stored, an automatic response AI of either the password function or the data transmission function may function as a conversation partner.

In the example illustrated in FIG. 18, information of two functions is transmitted to the automatic response AI, but information of three or more functions (for example, three or more function images or character strings indicating three or more functions) may be transmitted to the automatic response AI. In this case, in place of the image 58 associated with the automatic response AI, three or more function images are displayed in the display area 56a as images associated with the conversation partners. Further, the display example illustrated in FIGS. 13A to 13E may be applied to the seventh exemplary embodiment.

Modifications 3 and 4 may be applied to the seventh exemplary embodiment. That is, when the user exists in an area of plural functions, the control unit 26 receives an execution instruction of linkage functions executable using the plural functions, and when the user does not exist in the area of the plural functions, the control unit 26 does not receive any execution instruction of the linkage functions executable using the plural functions.

Eighth Exemplary Embodiment

Figure 19:
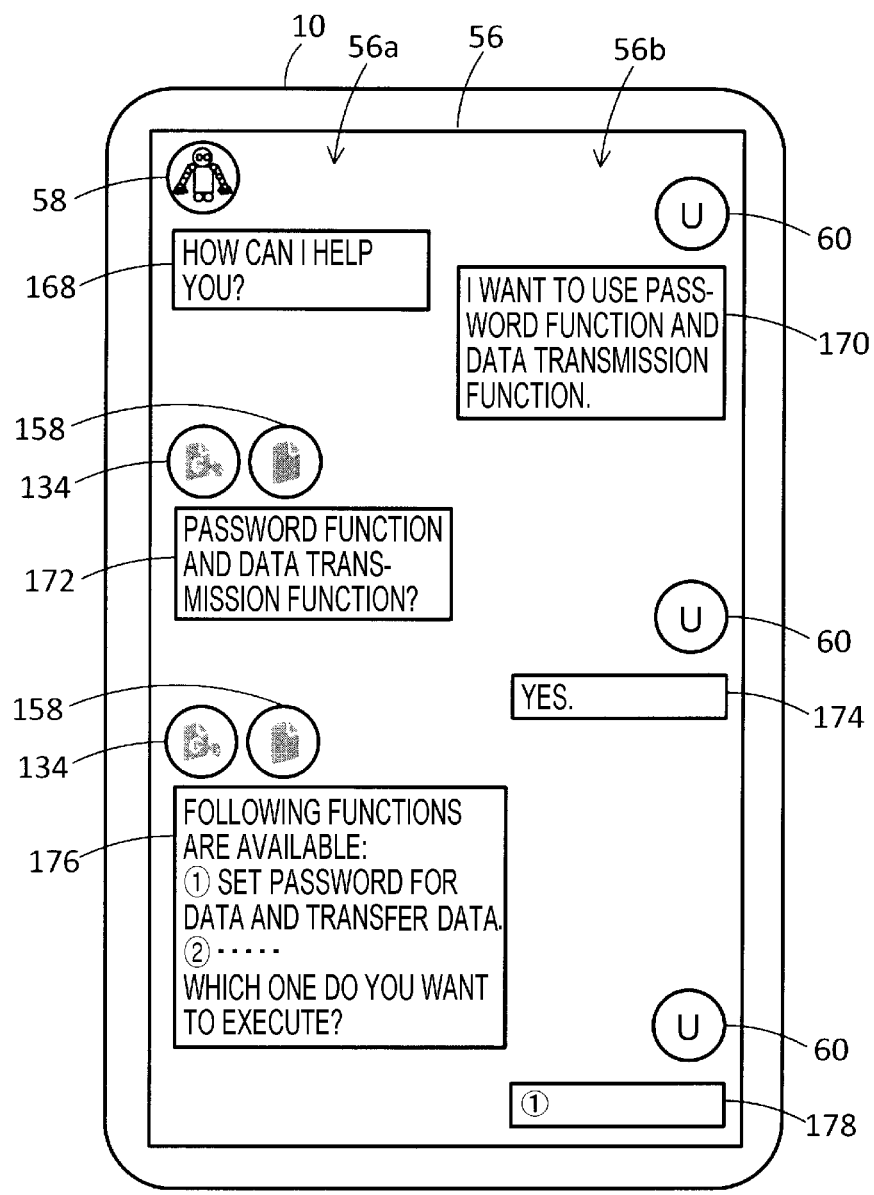
FIG. 19 is a diagram illustrating a screen.

Hereinafter, an eighth exemplary embodiment will be described with reference to FIG. 19. FIG. 19 illustrates a screen 56. The screen 56 displays an image 58 associated with the automatic response AI and an image 60 associated with the user are displayed as in FIG. 8, and further displays information indicating the conversation between the user and the automatic response AI.

When the chatting program is activated, a message content 168 such as "How can I help you?" is displayed as a message content of the automatic response AI in the display area 56a.

In the eighth exemplary embodiment, similarly to the seventh exemplary embodiment described above, it is assumed that the user (the terminal device 10) exists in both an area of a password function and an area of a data transmission function. In this case, the specifying unit 30 identifies the password function and the data transmission function as functions to be linked and specifies linkage functions associated with the combination of the password function and the data transmission function in the linkage function management table illustrated in FIG. 17. Therefore, the linkage functions executable using the password function and the data transmission function are identified.

Further, since the user exists in both the area of the password function and the area of the data transmission function, the control unit 26 displays the function image 134 associated with the password function and the function image 158 associated with the data transmission function in the display area 56a as images associated with the conversation partner, in place of the image 58 associated with the automatic response AI. The control unit 26 displays a message content 172 for confirming that the password function and the data transmission function have been identified as functions to be linked in the display area 56*a* as a message content of the password function and the data transmission function.

Further, when the user requests use of functions by making a message such as "I want to use the password function and the data transmission function", a character string indicating the request may be displayed as a message content 170 of the user in the display area 56*b*. When the user inputs the message content 170 to the terminal device 10 as described above, the specifying unit 30 may identify the password function and the data transmission function as functions to be linked, and the control unit 26 may switch the image 58 associated with the automatic response AI to the function images 134 and 158.

When the user approves with respect to the message content 172 (for example, when the user issues a message content 174 such as "Yes"), the control unit 26 displays the information on the linkage functions executable using the password function and the data transmission function, in the display area 56*a* as a message content 176 of the password function and the data transmission function. The message content 176 itself is a message content created by the general-purpose automatic response AI. A linkage function to be executed is designated by a message content 178 of the user. The following process is the same as that of the seventh exemplary embodiment described above.

As described above, according to the eighth exemplary embodiment, when a user exists in an area of plural functions, the display of the conversation partner who is responding is switched to the display of the plural functions. In this manner, the user may visually confirm the conversation partner who is responding.

The conversation partner may be switched from the general-purpose automatic response AI to an automatic response AI of the plural functions. Further, when the user exists in an area of three or more functions (that is, when the user exists in an area where areas of three or more functions overlap each other), the display of the conversation partner is switched to the display of the three or more functions. Further, the display example illustrated in FIGS. 13A to 13E may be applied to the eighth exemplary embodiment.

Modifications 3 and 4 may be applied to the eighth exemplary embodiment. That is, when the user exists in an area of plural functions, the control unit 26 receives an execution instruction of linkage functions executable using the plural functions, and when the user does not exist in the area of the plural functions, the control unit 26 does not receive any execution instruction of the linkage functions executable using the plural functions.

Ninth Exemplary Embodiment

Hereinafter, a ninth exemplary embodiment will be described. The ninth exemplary embodiment corresponds to the combination of the fourth exemplary embodiment and the eighth exemplary embodiment. That is, when the user exists both in an area of a device and in an area of a function, an image associated with a conversation partner is switched to a device image associated with the device and a function image associated with the function. Hereinafter, the ninth exemplary embodiment will be described in detail.

FIG. 20 illustrates an exemplary linkage function management table according to the ninth exemplary embodiment. The linkage function management table is information indicating linkage functions executable using devices and functions (for example, software). In the linkage function management table, as an example, a combination of IDs (for example, a combination of a device ID and a function ID), information indicating device names and function names, and information indicating linkage functions executable using devices and functions are associated with each other. The linkage functions executable using devices and functions are specified by referring to the linkage function management table. For example, a linkage function of transmitting data using the PC (A) is implemented by combining, for example, the PC (A) as a device A with the data transmission function as a function a. For other devices and functions, executable linkage functions are similarly specified.

A linkage function executable using three or more devices and functions may be specified. In this case, a combination of three or more devices and functions and a linkage function are associated with each other, and the association is registered in the linkage function management table.

Figure 21:
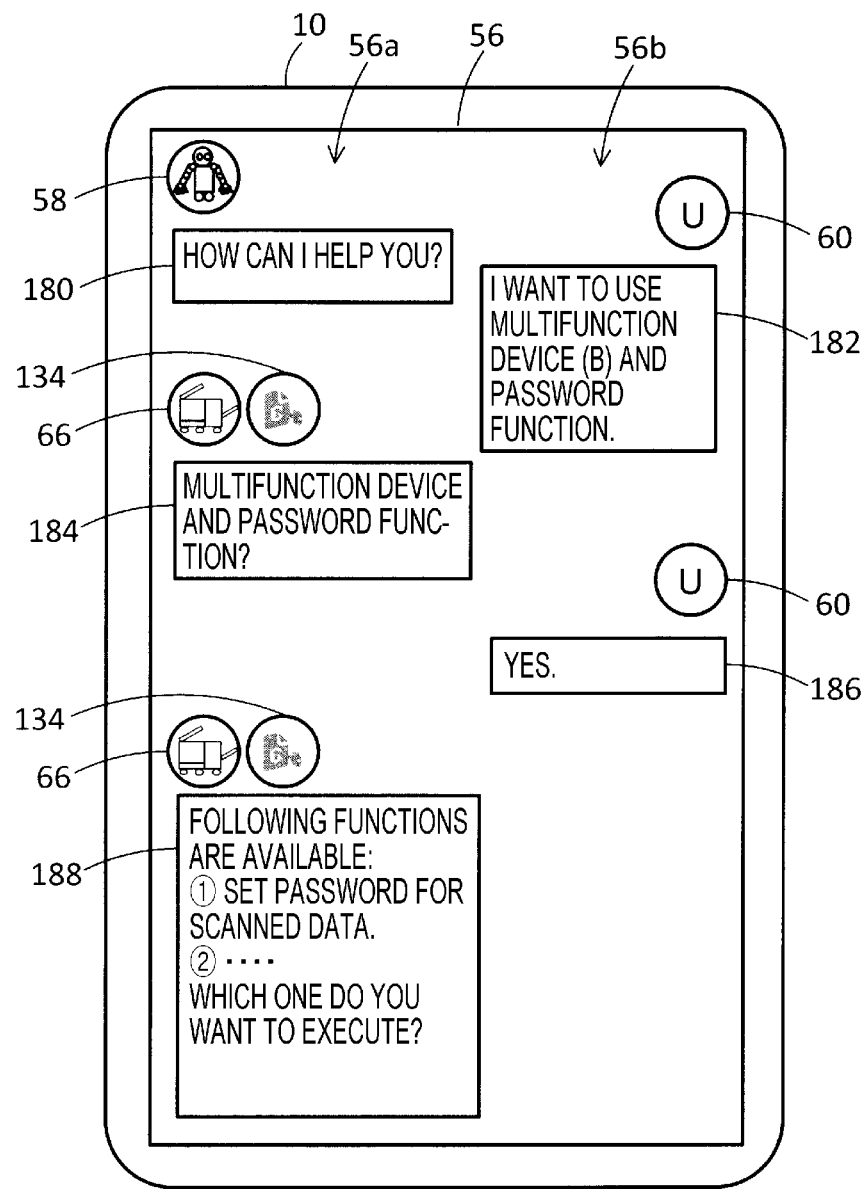
FIG. 21 is a diagram illustrating a screen.

FIG. 21 illustrates a screen 56. The screen 56 displays an image 58 associated with the automatic response AI and an image 60 associated with the user are displayed as in FIG. 8, and further displays information indicating the conversation between the user and the automatic response AI.

When the chatting program is activated, a message content 180 such as "How can I help you?" is displayed as a message content of the automatic response AI in the display area 56*a*.

In the ninth exemplary embodiment, it is assumed that the user (the terminal device 10) exists in both an area of a multifunction device (B) and an area of a password function. In this case, the specifying unit 30 identifies the multifunction device (B) as a device to be linked and identifies the password function as a function to be linked. The specifying unit 30 specifies linkage functions associated with the combination of the multifunction device (B) and the password function in the linkage function management table illustrated in FIG. 20. Therefore, the linkage functions executable using the multifunction device (B) and the password function are specified.

Further, since the user exists in both the area of the multifunction device (B) and the area of the password function, the control unit 26 displays the device image 66 associated with the multifunction device (B) and the function image 134 associated with the password function, in the display area 56*a* as images associated with the conversation partner, in place of the image 58 associated with the automatic response AI. The control unit 26 displays a message content 184 for confirming that the multifunction device (B) and the password function have been identified as objects to be linked in the display area 56*a* as a message content of the multifunction device (B) and the password function.

Further, when the user requests use of a device and a function by making a message such as "I want to use the multifunction device (B) and the password function", a character string indicating the request may be displayed as a message content 182 of the user in the display area 56*b*. When the user inputs the message content 182 to the terminal device 10 as described above, the specifying unit 30 may identify the multifunction device (B) and the password function as objects to be linked, and the control unit 26 may switch the image 58 associated with the automatic response AI to the images 66 and 134.

When the user approves with respect to the message content 184 (for example, when the user issues a message content 186 such as "Yes"), the control unit 26 displays the information on the linkage functions executable using the multifunction device (B) and the password function in the display area 56*a* as a message content 188 of the multifunction device (B) and the password function. The message content 188 itself is a message content created by the general-purpose automatic response AI. The following process is the same as that of the seventh exemplary embodiment described above.

For example, when the user gives an execution instruction of "a function of setting a password to scanned data," the control unit 26 gives the execution instruction of scan transfer to the multifunction device (B). The multifunction device (B) scans according to the execution instruction and transfers data thus generated to the terminal device 10. The control unit 26 activates password setting software and sets a password to the data by the password setting software.

When the user (the terminal device 10) moves out of the area of the multifunction device (B) and the password function, the control unit 26 displays the image 58 associated with the general-purpose automatic response AI in the display area 56*a* as an image associated with the conversation partner, in place of the device image 66 and the function image 134.

When the user moves out of the area of the password function but exists in the area of the multifunction device (B), the control unit 26 may display the device image 66 in the display area 56*a* as an image associated with the conversation partner. In this case, the specifying unit 30 identifies the multifunction device (B) as a device to be used. The same is true when the user moves out of the area of the multifunction device (B) but exists in the area of the password function.

As described above, according to the ninth exemplary embodiment, the display of the conversation partner who is responding may be switched to the display of the device and function to be linked. In this manner, the user may visually confirm the conversation partner who is responding.

In the ninth exemplary embodiment, a stock area for a device image or a stock area for a function image may be displayed in the display area 56*b*. In the above-described example, a device image associated with the multifunction device (B) is displayed in a stock area for the device image, and a function image associated with the password function is displayed in a stock area for the function image. The user may select the device image and the function image from the respective stock areas and transmit the images to the automatic response AI as a message content of the user. The specifying unit 30 identifies the device associated with the device image and the function associated with the function image, which are selected by the user, as objects to be linked. When the user selects only one device image without selecting any function image, the specifying unit 30 identifies the device associated with the device image as a device to be used. When the user selects plural device images without selecting any function image, the specifying unit 30 identifies the plural devices as devices to be linked. Similarly, when the user selects only one function image without selecting any device image, the specifying unit 30 identifies the function associated with the function image as a function to be used. When the user selects plural function images without selecting any device image, the specifying unit 30 identifies the plural functions as functions to be linked.

The conversation partner of the user may be a general-purpose automatic response AI equipped in the terminal device 10, or may be switched from the general-purpose automatic response AI to an automatic response AI assigned to each of the device and the function.

Modifications 1 to 4 may be applied to the ninth exemplary embodiment.

Tenth Exemplary Embodiment

Hereinafter, a tenth exemplary embodiment will be described. In the tenth exemplary embodiment, the display of the conversation partner is switched to the display of a file (data) depending on the position of the user. For example, usable files change depending on the position of the user, and accordingly, the display of the conversation partner is switched to the display of the file.

For example, management information indicating association between an area and a usable file in the area is prepared in advance, and the management information is stored in the storage unit 24 of the terminal device 10. Of course, the management information may not be stored in the terminal device 10 but may be stored in an external device such as the server 16. The specifying unit 30 identifies the position of the terminal device 10 (the user) based on the position information of the terminal device 10 acquired by the position information acquiring unit 28 and specifies a file associated with the area including the position of the user in the management information. This file is a file that is usable by the terminal device 10 in the place where the user exists. For example, a file that is usable only in a specific office is determined, and the position of the specific office and the file are associated with each other and registered in the management information. When the user exists in the specific office, the terminal device 10 is enabled to use the file associated with the specific office. The file may be stored in the terminal device 10 or may be stored in an external device such as the server 16.

Here, the file will be described. Examples of the file include a document file, an image file, a video file, a spreadsheet file, a presentation file, a graphic (figure) file, and an audio file.

The document file is a file having a document format, and is a file configured with character strings and other pieces of information. The document file may include images, tables, or figures as other pieces of information. The document format is, for example, a text format or a document format. The document file corresponds to, for example, data having a text format (for example, data appended with a character string ".txt" as an extension) or data having a document format (for example, data appended with a character string ".doc" or ".docx" as an extension).

The image file is a file having an image format. The image file may be image data having a raster format or image data having a vector format. The image format is, for example, a JPEG format, a BMP (bitmap) format, a PDF format, a GIF format, a TIFF format, a PNG format, or a PICT format. The image file corresponds to, for example, data having a JPEG format (data appended with a character string ".jpeg" as an extension), data having a BMP format (data appended with a character string ".bmp" as an extension), data having a PDF format (data appended with a character string ".pdf" as an extension), data having a GIF format (data appended with a character string ".gif" as an extension), data having a TIFF format (data appended with a character string ".tiff" as an extension), data having a PNG format (data appended with a character string ".png" as an extension), or data having a PICT format (data appended with a character string ".pict" as an extension). Image files having other formats may be used.

The video file is a file having a video format. The video format is, for example, an AVI format, an MP4 format, an MOV format, an MPEG2-TS format, an MPEG2-PS format, a WMV format, or an FLV format. The video file corresponds to, for example, data having an AVI format (data appended with a character string ".avi" as an extension), data having an MP4 format (data appended with a character string ".mp4" as an extension), data having an MOV format (data appended with a character string ".mov" as an extension), data having an MPEG2-TS format (data appended with a character string ".m2ts" as an extension), data having an MPEG2-PS format (data appended with a character string ".mpeg" as an extension), data having a WMV format (data appended with a character string ".wmv" as an extension), or data having an FLV format (data appended with a character string ".flv" as an extension). Video files having other formats may be used.

The spreadsheet file is a file having a table format and is configured with tables, graphs, or other pieces of information. The spreadsheet file may include character strings, images, or figures as other pieces of information. For example, the spreadsheet file is data appended with a character string ".csv," ".xls" or ".xlsx" as an extension.

The presentation file is a file having a presentation sheet format. For example, the presentation file corresponds to data appended with a character string ".ppt" or ".pptx" as an extension. The presentation file is configured with, for example, character strings, images (still images or moving images), figures, and voice.

The graphic file is a file having a graphic (figure) format. The graphic file is created by, for example, graphic generating software (for example, two-dimensional CAD or three-dimensional CAD). For example, the graphic file corresponds to data having a DXF format (data appended with a character string ".dxf" as an extension) or data having a DWG format (data appended with a character string ".dwg" as an extension). In addition, data appended with a character string ".vsd" or ".vsdx" as an extension may be treated as the graphic file.

The audio file is a file having an audio format. The audio format is, for example, an uncompressed audio format (for example, a WAV format, an AIFF format, or a BWF format), an irreversible compressed audio format (for example, an mp3 format, an AAC format, or a WMA format), or a reversible compressed audio format (for example, a TAK format or an FLAC format). The audio file corresponds to data having an uncompressed audio format (data appended with, for example, a character string ".wav" as an extension), data having an irreversible compressed audio format (data appended with, for example, a character string ".mp3" as extension), or data having an uncompressed audio format (data appended with, for example, a character string ".tak" as an extension).

Figure 22:
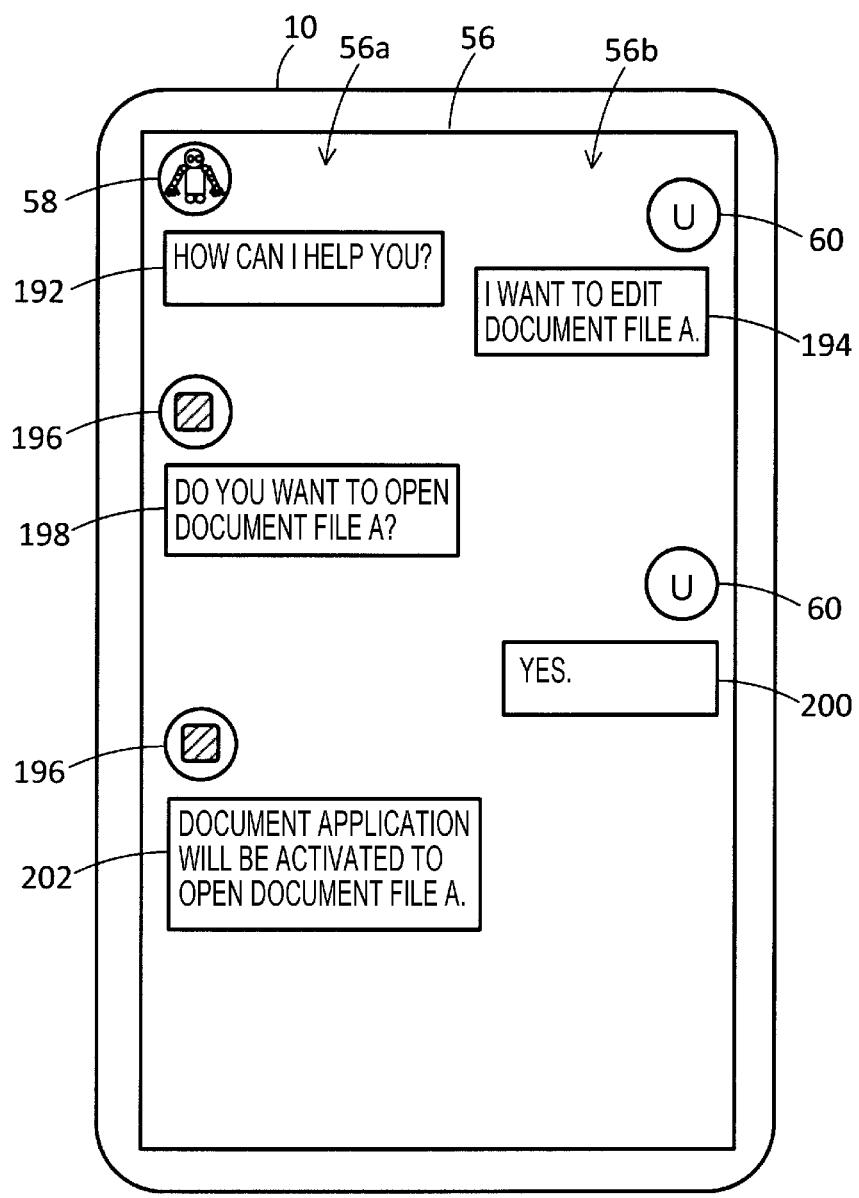
FIG. 22 is a diagram illustrating a screen.

Hereinafter, the tenth exemplary embodiment will be described in detail with reference to FIG. 22. FIG. 22 illustrates a screen 56. The screen 56 displays an image 58 associated with the automatic response AI and an image 60 associated with the user are displayed as in FIG. 8, and further displays information indicating the conversation between the user and the automatic response AI.

When the chatting program is activated, a message content 192 such as "How can I help you?" is displayed as a message content of the automatic response AI in the display area 56a.

The position information acquiring unit 28 acquires position information of the terminal device 10 (the user), and the specifying unit 30 identifies the position of the terminal device 10 based on the position information. For example, when the user exists in an area where a document file A is usable, the specifying unit 30 determines that the user (terminal device 10) exists in an area where the document file A is usable, based on the position information of the terminal device 10.

When the user (the terminal device 10) exists in an area where the document file A is usable, the specifying unit 30 identifies the document file A as a file to be used.

When the user (the terminal device 10) exists in an area of a file, the control unit 26 switches the display of the conversation partner from the display of the general-purpose automatic response AI to the display of the file (for example, an image associated with the file or a character string indicating the file).

In the above-described example, since the user exists in the area of the document file A, the control unit 26 displays a file image 196 associated with the document file A in the display area 56a as an image associated with the conversation partner, in place of the image 58 associated with the automatic response AI. The file image is, for example, an image such as an icon representing the file.

The control unit 26 may display a character string indicating the document file A in the display area 56a as information indicating the conversation partner, in place of the file image 196 or along with the file image 196.

Further, the control unit 26 displays a message content 198 such as "Do you want to open the document file A?" in the display area 56a as a message content of the document file A. The message content 198 itself is a message content created by the general-purpose automatic response AI. The control unit 26 displays the message content 198 in the display area 56a as a message content associated with the file image 196 of the document file A, in order to act as if the document file A makes the message content 198.

Further, when the user requests use of a file by making a message such as "I want to use the document file A", a character string indicating the request may be displayed as a message content 194 of the user in the display area 56b.

When the user inputs the message content 194 to the terminal device 10 as described above, the specifying unit 30 may identify the document file A as a file to be used, and the control unit 26 may switch the image 58 associated with the automatic response AI to the file image 196 associated with the document file A.

When the user instructs disclosure of the file (for example, when a message content 200 such as "Yes" is input) with respect to the message content 198 described above, the message content 200 is displayed in the display area 56b as the message content of the user.

Upon receiving the disclosure instruction, the control unit 26 displays a message content 202 indicating that document software associated with the document file A is activated, in the display area 56a as a message content of the automatic response AI. Further, the control unit 26 activates the document software and causes the document software to display the document file A on the display unit of the UI unit 20. For example, the user may edit the document file A using the document software.

When the user (the terminal device 10) moves out of the area of the document file A, the control unit 26 displays the image 58 associated with the general-purpose automatic response AI in the display area 56a as an image associated with the conversation partner, in place of the file image 196 associated with the document file A.

As described above, according to the tenth exemplary embodiment, when the user (the terminal device 10) exists in an area of a file, the file is identified as a file to be used, and the display of a conversation partner who is responding is switched to the display of the file. In this manner, the user may visually confirm the conversation partner who is responding.

When an automatic response AI is assigned for each file, the display of the conversation partner may be switched from the display of the general-purpose automatic response AI to the display of the file, and the automatic response AI as a conversation partner for the user may be switched from the general-purpose automatic response AI to an automatic response AI assigned to the file.

(Modification 5)

Hereinafter, Modification 5 will be described. In Modification 5, the control unit 26 controls the output of an instruction related to a file to the conversation partner who is responding, depending on the position of the user. For example, when the user exists in the area of the file, the control unit 26 receives an instruction related to the file from the user. Meanwhile, when the user exists outside the area of the file, the control unit 26 does not receive an instruction related to the file from the user. In this manner, when the user exists in the area of the file, the user is able to give instructions to the file, and when the user exists outside the area of the file, the user is not able to give instructions to the file. Since the area where instructions are able to be given to the file is limited, the security of the file may be improved. For example, the security of the file may be improved by setting the area of the file such that only users who stay in a specific room in the office are able to give instructions to the file associated with the specific room.

For example, when the user exists in the area of the document file A, the control unit 26 receives a user's instruction related to the document file A. For example, the user may edit the document file A using the UI unit 20 of the terminal device 10. Meanwhile, when the user exists outside the area of the document file A, the control unit 26 does not receive a user's instruction related to the document file A. In this case, the user is unable to edit the document file A. The display of the document file A may be prohibited. In this manner, it is possible to construct a secure environment for the document file A.

In Modification 5, when the user exists in an area of a file, the control unit 26 may or may not switch the image associated with the conversation partner from the image associated with the general-purpose automatic response AI to an image associated with the file.

Eleventh Exemplary Embodiment

Hereinafter, an eleventh exemplary embodiment will be described with reference to FIG. 23. In the tenth exemplary embodiment, one file is identified. In the eleventh exemplary embodiment, however, plural files are identified.

Figure 23:
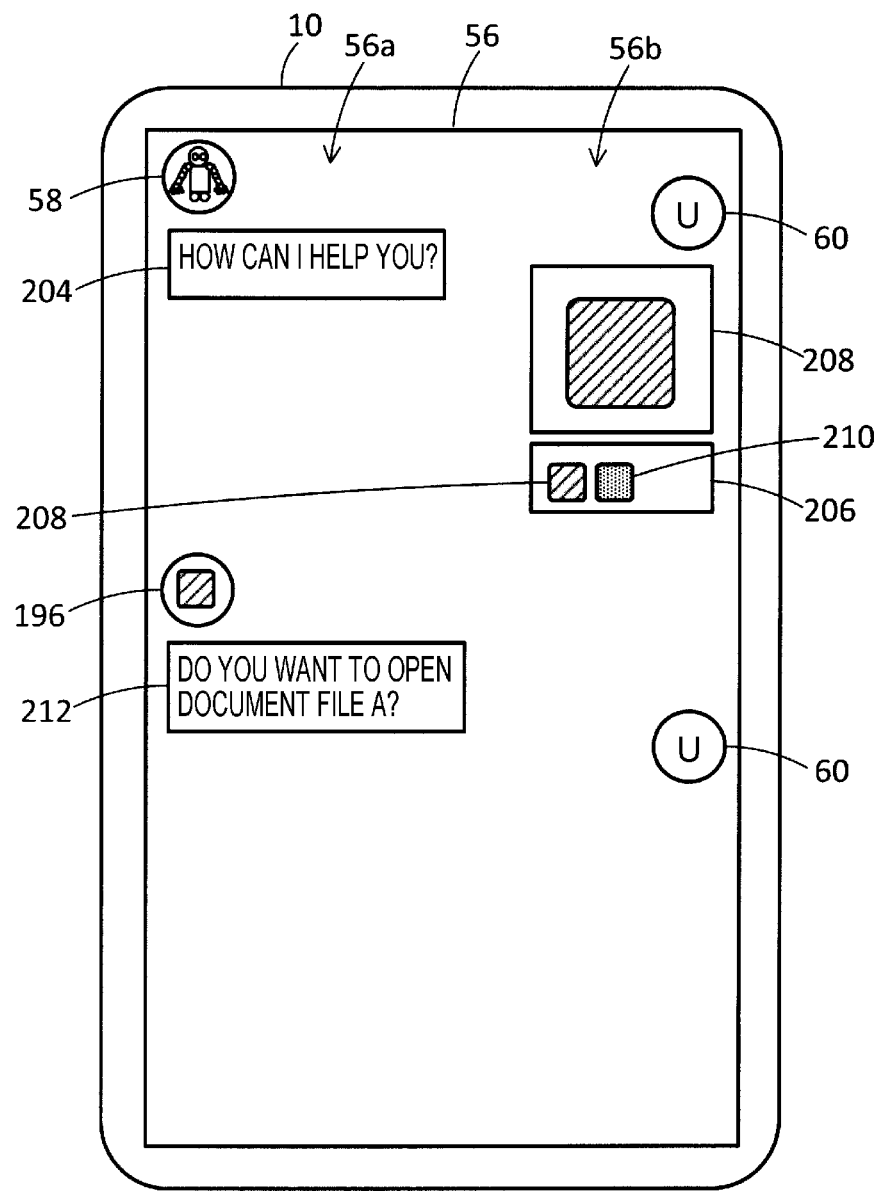
FIG. 23 is a diagram illustrating a screen.

FIG. 23 illustrates a screen 56. The screen 56 displays an image 58 associated with the automatic response AI and an image 60 associated with the user are displayed as in FIG. 8, and further displays information indicating the conversation between the user and the automatic response AI.

When the chatting program is activated, a message content 204 such as "How can I help you?" is displayed as a message content of the automatic response AI in the display area 56*a*.

The position information acquiring unit 28 acquires position information of the terminal device 10, and the specifying unit 30 identifies the position of the terminal device 10 based on the position information.

For example, it is assumed that the user exists in both of an area where a document file A is usable and an area where an image file C is usable. That is, it is assumed that the user exists in an area where the area of the document file A and the area of the image file C overlap each other. In this case, the specifying unit 30 determines that the user (the terminal device 10) exists in the area where the document file A is usable, based on the position information of the terminal device 10. Further, the specifying unit 30 determines that the user (the terminal device 10) exists in the area where the image file C is usable, based on the position information of the terminal device 10.

When the user (the terminal device 10) exists in the area of the document file A, the specifying unit 30 identifies the document file A as a candidate of a file to be used. Similarly, when the user (the terminal device 10) exists in the area of the image file C, the specifying unit 30 identifies the image file C as a candidate of a file to be used.

When plural files are identified as described above, the control unit 26 displays a stock area 206 in the display area 56*b* for the user and displays file images in the stock area 206. The stock area 206 is an area where information on candidates of a file to be used is displayed. In the example illustrated in FIG. 23, the file images are displayed as an example of candidate information. For example, the control unit 26 displays the file images associated with the files identified as described above in the stock area 206. In the example illustrated in FIG. 23, file images 208 and 210 are displayed in the stock area 206. The file image 208 is an image associated with the document file A. The file image 210 is an image associated with the image file C. When the files are identified in this manner, the control unit 26 displays file images associated with the files in the stock area 206. Of course, the control unit 26 may display character information indicating the identified files in the stock area 206, in place of the file images or along with the file images.

When the user exists only in the area of the document file A, only the file image 208 associated with the document file A is displayed in the stock area 206. Similarly, when the user exists only in the area of the image file C, only the file image 210 associated with the image file C is displayed in the stock area 206.

Further, when there are other file images that cannot be all displayed in the stock area 206, the user performs a scroll operation on the file images displayed in the stock area 206 such that the other file images are displayed in the stock area 206.

The user may select an image associated with the file to be used (the file image 208 in the example illustrated in FIG. 23) from the stock area 206 and move the file image 208 out of the stock area 206, so that the file image 208 may be transmitted to the automatic response AI as a message content of the user. The user may input character information or voice information indicating a file to be used to the terminal device 10 so that information indicating the file to be used is transmitted to the automatic response AI.

As described above, when a file to be used is designated by the user, the control unit 26 switches the display of the conversation partner from the display of the general-purpose automatic response AI to the display of the file. In the example illustrated in FIG. 23, since the user designates the document file A as a file to be used by designating the file image 208, the control unit 26 displays the file image 196 associated with the document file A in the display area 56*a* as an image associated with the conversation partner, in place of the image 58 associated with the automatic response AI.

Then, similarly to the tenth exemplary embodiment, the control unit 26 displays a message content 212 such as "Do you want to open the document file A?" in the display area 56a as a message content of the document file A.

When the user (the terminal device 10) moves out of the area of the document file A, the control unit 26 displays the image 58 associated with the general-purpose automatic response AI in the display area 56a as an image associated with the conversation partner, in place of the file image 196 associated with the document file A. Further, the control unit 26 deletes the file image 208 associated with the document file A from the stock area 206. When the user (the terminal device 10) moves out of the area of the image file C, the control unit 26 deletes the file image 210 associated with the image file C from the stock area 206. When the user moves into an area of a new file, the new file is identified as a candidate of a file to be used, and information of the new file (for example, a file image associated with the new file) is displayed in the stock area 206.

As described above, according to the eleventh exemplary embodiment, when the user (the terminal device 10) exists in an area of plural files, the plural files are identified as candidates of a file to be used, and the display of a conversation partner who is responding is switched to the display of a file selected from the plural files by the user. In this manner, the user may visually confirm the conversation partner who is responding.

The display of the conversation partner may be switched from the display of the general-purpose automatic response AI to the display of the file, and the automatic response AI (for example, the program) as a conversation partner for the user may be switched from the general-purpose automatic response AI to an automatic response AI assigned to the file.

When the user exists in the area of plural files, the specifying unit 30 may identify a file closest to the user among the plural files as the file to be used, and the control unit 26 may switch the display of the general-purpose automatic response AI to the display of the file closest to the user.

(Modification 6)

Hereinafter, Modification 6 will be described. Similarly to Modification 5, in Modification 6, the control unit 26 controls the output of an instruction related to a file to the conversation partner who is responding, depending on the position of the user. For example, when the user exists in an area of plural files, the control unit 26 receives an instruction related to each of the plural files from the user.

For example, when the user exists in both the area of the document file A and the area of the image file C, the control unit 26 receives a user's instruction related to the document file A and the image file C. For example, the user may edit the document file A and the image file C using the UI unit 20 of the terminal device 10.

Further, when a file is selected from plural files by the user, the control unit 26 may receive an instruction related to the selected file from the user. In the example illustrated in FIG. 23, the user exists in both areas of the document file A and the image file C, but the document file A is selected by the user. In this case, the control unit 26 receives a user's instruction related to the document file A.

Further, when the user exists in an area of plural files, the control unit 26 may receive, from the user, an instruction related to a file closest to the user among the plural file.

According to Modification 6, when the user exists in an area of plural files, it is possible to construct a secure environment for the files.

In Modification 6, when the user exists in an area of a file, the control unit 26 may or may not switch the image associated with the conversation partner from the image associated with the general-purpose automatic response AI to an image associated with the file.

Twelfth Exemplary Embodiment

Hereinafter, a twelfth exemplary embodiment will be described. In the eleventh exemplary embodiment, one file is selected by the user. In the twelfth exemplary embodiment, however, plural files are selected by the user.

The linkage function management information according to the twelfth exemplary embodiment is information for managing linkage functions executed by linking plural functions to each other. The linkage function is a function implemented by linking plural software to each other. Of course, the linkage function may be a function implemented by linking the function that the device has as hardware and the function implemented by software to each other.

In the twelfth exemplary embodiment, the linkage function is a function to be executed on plural files. For example, each file is associated with software (application) for executing a process on the file. The linkage function is a function implemented by linking applications associated with each of the plural files selected by the user.

A linkage function is defined for each file format (attribute), and the linkage function management information is, for example, information indicating association between information indicating a combination of plural file formats and information indicating a linkage function (linkage function information). The linkage function information includes, for example, a linkage function ID, a linkage function name, or the like. The file format is, for example, the above-described document format, image format, video format, table format, sheet format, graphic format, or audio format. A linkage function compatible with a combination of the plural file formats is specified (identified) by referring to the linkage function management information.

The linkage function may be a function implemented by linking plural different functions (for example, different pieces of software) to each other or a function implemented by linking identical functions (for example, identical pieces of software) to each other. The linkage function may be a function that is unusable before the linkage. A function which is unusable before the linkage may be a function which becomes usable by linking identical functions to each other, or a function which becomes usable by combining different functions to each other. For example, when a document creation function (document creation software) and an image display function (image display software (for example, an image viewer)) are linked to each other, a function of inserting (attaching) an image into a document or a function of superimposing a document (a character string or a text) on an image is implemented as a linkage function. That is, an image insertion function or a text superimposition function is implemented by linking the document creation function and the image display function to each other.

The linkage function managed by the linkage function management information may be a function executable by software installed in the terminal device 10, a function executable by software installed in an external device (for example, a server or another terminal device), or a function executable by software installed in the terminal device 10 and software installed in an external device.

Hereinafter, the linkage function management information according to the twelfth exemplary embodiment will be described in detail with reference to FIG. 24. FIG. 24 illustrates an exemplary linkage function management table according to the twelfth exemplary embodiment. In the linkage function management table, as an example, information indicating a combination of plural file formats and information indicating a linkage function (linkage function information) are associated with each other. When plural files are identified as files to be linked, the specifying unit 30 specifies a linking function associated with a combination of file formats of the plural files in the linkage function management table. Information on the linkage function is displayed on the display unit of the UI unit 20. Although FIG. 24 illustrates a combination of two file formats, association between a combination of three or more file formats and a linkage function may be registered in the linkage function management table.

Hereinafter, each linkage function illustrated in FIG. 24 will be described.

In FIG. 24, the "document format" is a text format (with an extension of ".txt") or a document format (with an extension of ".doc" or ".docx"). The "table format" is a format with an extension expressed as ".csv," ".xls" or the like. The "image format" is a format with an extension expressed as ".jpeg," ".pdf" or the like. The "video format" is a format with an extension expressed as, for example, ".avi," ".mpeg" or the like. The "sheet format" is a format with an extension expressed as ".ppt" or the like. While FIG. 24 does not illustrate the graphic format and the audio format, association between a combination including the graphic format and the audio format and a linkage function may be registered in the linkage function management table. Of course, association between a combination including file formats other than the file formats illustrated in FIG. 24 and a linkage function may be set and registered in the linkage function management table.

Hereinafter, each linkage function illustrated in FIG. 24 will be described. When a document file A and a spreadsheet file B are identified as files to be linked, a "function of inserting a table into a document" and a "function of inserting a document into a table" which are associated with a combination of the document format and the table format are specified as linkage functions. The "function of inserting a table into a document" is a function of inserting the table represented by the spreadsheet file B into the document represented by the document file A. The "function of inserting a document into a table" is a function of inserting the document represented by the document file A into the table represented by the spreadsheet file B.

When a document file A and an image file C are identified as files to be linked, a "function of inserting an image into a document" and a "function of superimposing a document on an image" which are associated with a combination of the document format and the image format are specified as linkage functions. The "function of inserting an image into a document" is a function of inserting the image represented by the image file C into the document represented by the document file A. The "function of superimposing a document on an image" is a function of superimposing the document represented by the document file A on the image represented by the image file C.

When a document file A and a video file D are identified as files to be linked, a "function of inserting a video into a document" and a "function of inserting a still image into a document" which are associated with a combination of the document format and the video format are specified as linkage functions. The "function of inserting a video into a document" is a function to insert the video represented by the video file D into the document represented by the document file A. The "function of inserting a still image into a document" is a function of inserting one or more frames (still images) included in the video file D into the document represented by the document file A. For example, when the "function of inserting a still image into a document" is executed in a case where the document file A is a document file which is not compatible with a video, that is, a file into which a video cannot be inserted, one or more frames (still images) included in the video file D are inserted into the document represented by the document file A.

Plural files having the same file format may be identified as files to be linked. For example, when document files A1 and A2 are identified as files to be linked, a "function of integrating documents" which is associated with the combination of the document format and the document format is specified as a linkage function. The "function of integrating documents" is a function of integrating the documents represented by the document files A1 and A2 with each other (for example, combining the two documents with each other) to generate a new document file A3 while saving or removing the document files A1 and A2.

When spreadsheet files B1 and B2 are identified as files to be linked, a "function of integrating tables" which is associated with the combination of the table format and the table format is specified as a linkage function. The "function of integrating tables" is a function of integrating the tables represented by the spreadsheet files B1 and B2 with each other (for example, combining the two tables with each other) to generate a new spreadsheet file B3 while saving or removing the spreadsheet files B1 and B2.

When video files D1 and D2 are identified as files to be linked, a "function of integrating videos" which is associated with the combination of the video format and the video format is specified as a linkage function. The "function of integrating tables" is a function of integrating the videos represented by the video files D1 and D2 with each other (for example, combining the two videos with each other) to generate a new video file D3 while saving or removing the video files D1 and D2.

In addition, when a presentation file E and the document file A are identified as files to be linked, a "function of inserting a document into a presentation sheet" which is associated with the combination of the sheet format and the document format is specified as a linkage function. The "function of inserting a document into a presentation sheet" is a function of inserting the document represented by the document file A into the presentation sheet represented by the presentation file E.

A linkage function associated with three or more files may be registered in the linkage function management table.

In the linkage function management table, combinations of file names and a linkage function may be associated with each other. When plural files are identified as files to be linked, the specifying unit 30 specifies a linkage function associated with a combination of plural file names in the linkage function management table.

Further, the specifying unit 30 may specify a file to which a content to be added, based on a name of a file transmitted to the automatic response AI. For example, when a name of a file (file name) includes a character string suggesting a file for collecting data (that is, a file assumed or predicted to incorporate a content of other data), such as "ledger," "collection," "management," "statistics," "graph," "table," or "list," the specifying unit 30 identifies the file as a file to which the content is to be added. Further, the specifying unit 30 identifies a file having a file name including no character string for the collection or a file having a file name including a character string suggesting a file for providing a content (material), as a file containing a content (material) to be added. For example, a file having a file name including a character string such as "receipt," "slip," "personal data," or "device data" does not correspond to the file for the collection described above and is determined to correspond to a file for providing a content (material).

Figure 25:
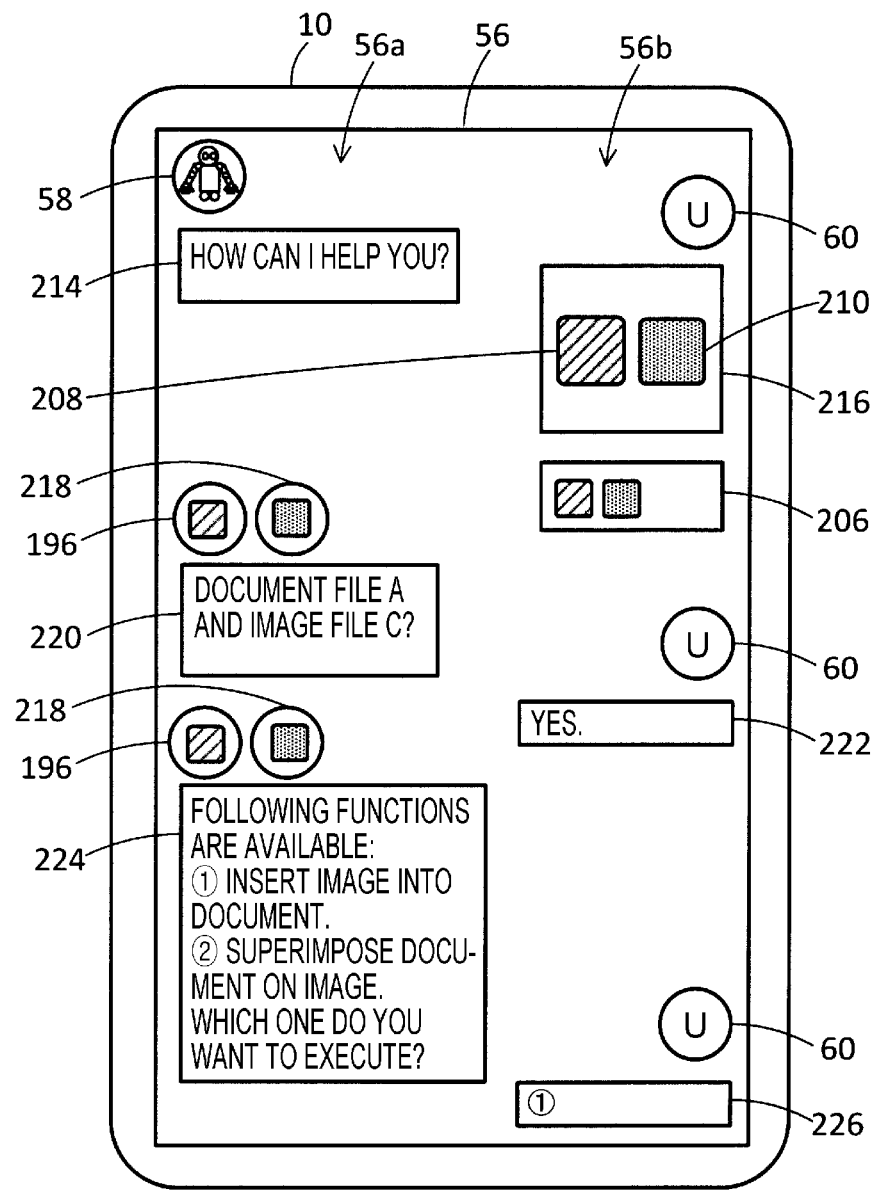
FIG. 25 is a diagram illustrating a screen.

FIG. 25 illustrates a screen 56. The screen 56 displays an image 58 associated with the automatic response AI and an image 60 associated with the user are displayed as in FIG. 8, and further displays information indicating the conversation between the user and the automatic response AI.

When the chatting program is activated, a message content 214 such as "How can I help you?" is displayed as a message content of the automatic response AI in the display area 56a.

In the twelfth exemplary embodiment, similarly to the eleventh exemplary embodiment described above, it is assumed that the user (the terminal device 10) exists in both an area of a document file A and an area of an image file C. In this case, a file image 208 associated with the document file A and a file image 210 associated with the image file C are displayed in the stock area 206.

For example, the user may select the file images 208 and 210 from the stock area 206 and move the file images 208 and 210 out of the stock area 206, so that the file images 208 and 210 may be transmitted to the automatic response AI as a message content of the user. In the example illustrated in FIG. 25, an image 216 in which the file images 208 and 210 are displayed is generated, and the image 216 is transmitted to the automatic response AI. The user may input character information or voice information indicating plural files to be used to the terminal device 10 so that information indicating the plural files to be used is transmitted to the automatic response AI.

As described above, when plural files to be used are designated by the user, the specifying unit 30 identifies the plural files as files to be linked and specifies linkage functions associated with a combination of the plural files, for example, in the linkage function management table illustrated in FIG. 24. Therefore, the linkage functions executable using the plural files are identified.

In the above-described example, the specifying unit 30 identifies the document file A associated with the file image 208 and the image file C associated with the file image 210 as files to be linked and specifies linkage functions (for example, a "function of inserting an image into a document" and a "function of superimposing a document on an image") associated with the combination of the document format and the image format in the linkage function management table illustrated in FIG. 24. Therefore, the linkage functions executable for the document file A and the image file C are identified. The process of specifying the files and the linkage functions may be performed by the server 16.

Further, when plural files to be used are designated by the user, the control unit 26 switches the display of the conversation partner from the display of the general-purpose automatic response AI to the display of the plural files designated by the user.

In the above-described example, since the document file A and the image file C are designated as files to be linked, the control unit 26 displays the file image 196 associated with the document file A and the file image 218 associated with the image file C in the display area 56a as images associated with the conversation partner, in place of the image 58 associated with the automatic response AI. Of course, the control unit 26 may display a character string indicating the document file A and the image file C in the display area 56a as information indicating the conversation partner, in place of the file images 196 and 218 or along with the file images 196 and 218.

Further, the control unit 26 displays a message content 220 for confirming the plural files designated by the user in the display area 56a as a message content of the automatic response AI. In the case where the document file A and the image file C are designated as the files to be linked, for example, a message content 220 such as "Document file A and Image file C?" is displayed as a message content of the automatic response AI in the display area 56a.

When the user approves with respect to the message content 220 (for example, when the user issues a message content 222 such as "Yes"), the control unit 26 displays the information on the linkage functions executable using the document file A and the image file C in the display area 56a as a message content 224 of the document file A and the image file C. The message content 224 itself is a message content created by the general-purpose automatic response AI. The control unit 26 displays the message content 224 in the display area 56a as a message content associated with the file image 196 of the document file A and the file image 218 of the image file C, in order to act as if the document file A and the image file C make the message content 224.

When the user gives an execution instruction with respect to the message content 224 by designating linkage functions by a message content 226, the control unit 26 receives the execution instruction and controls the execution of the linkage functions. As another example, a button image for instructing the execution of the linkage functions is displayed on the screen 56, and the user may press the button image to give an execution instruction of the linkage functions. For example, when the "function of inserting an image into a document" is designated by the user, the control unit 26 activates document software and image software to inserts the image file C into the document file A.

When the user (the terminal device 10) moves out of the area of the document file A and the image file C, the control unit 26 displays the image 58 associated with the general-purpose automatic response AI in the display area 56a as an image associated with the conversation partner, in place of the file images 196 and 218. Further, the control unit 26 deletes the file image 208 associated with the document file A and the file image 210 associated with the image file C from the stock area 206.

When the user moves out of the area of the document file A but exists in the area of the image file C, the control unit 26 may display the file image 218 in the display area 56a as an image associated with the conversation partner. In this case, the specifying unit 30 identifies the image file C as a file to be used. The same is true when the user moves out of the area of the image file C but exists in the area of the document file A.

As described above, according to the twelfth exemplary embodiment, the display of the conversation partner who is responding may be switched to the display of the plural files to be linked. In this manner, the user may visually confirm the conversation partner who is responding.

When plural files are displayed as conversation partners, the conversation partner of the user may be a general-purpose automatic response AI equipped in the terminal device 10, or may be switched from the general-purpose automatic response AI to an automatic response AI assigned to each of the plural files.

In the example illustrated in FIG. 25, information of two files is transmitted to the automatic response AI, but information of three or more files (for example, three or more file images or character strings indicating three or more files) may be transmitted to the automatic response AI. In this case, in place of the image 58 associated with the automatic response AI, three or more file images are displayed as images associated with the conversation partners in the display area 56a. Further, the display example illustrated in FIGS. 13A to 13E may be applied to the twelfth exemplary embodiment.

Modifications 5 and 6 may be applied to the twelfth exemplary embodiment. That is, when the user exists in an area of plural files, the control unit 26 receives an execution instruction of linkage functions executable using the plural files, and when the user does not exist in the area of the plural files, the control unit 26 does not receive any execution instruction of the linkage functions executable using the plural files.

Thirteenth Exemplary Embodiment

Figure 26:
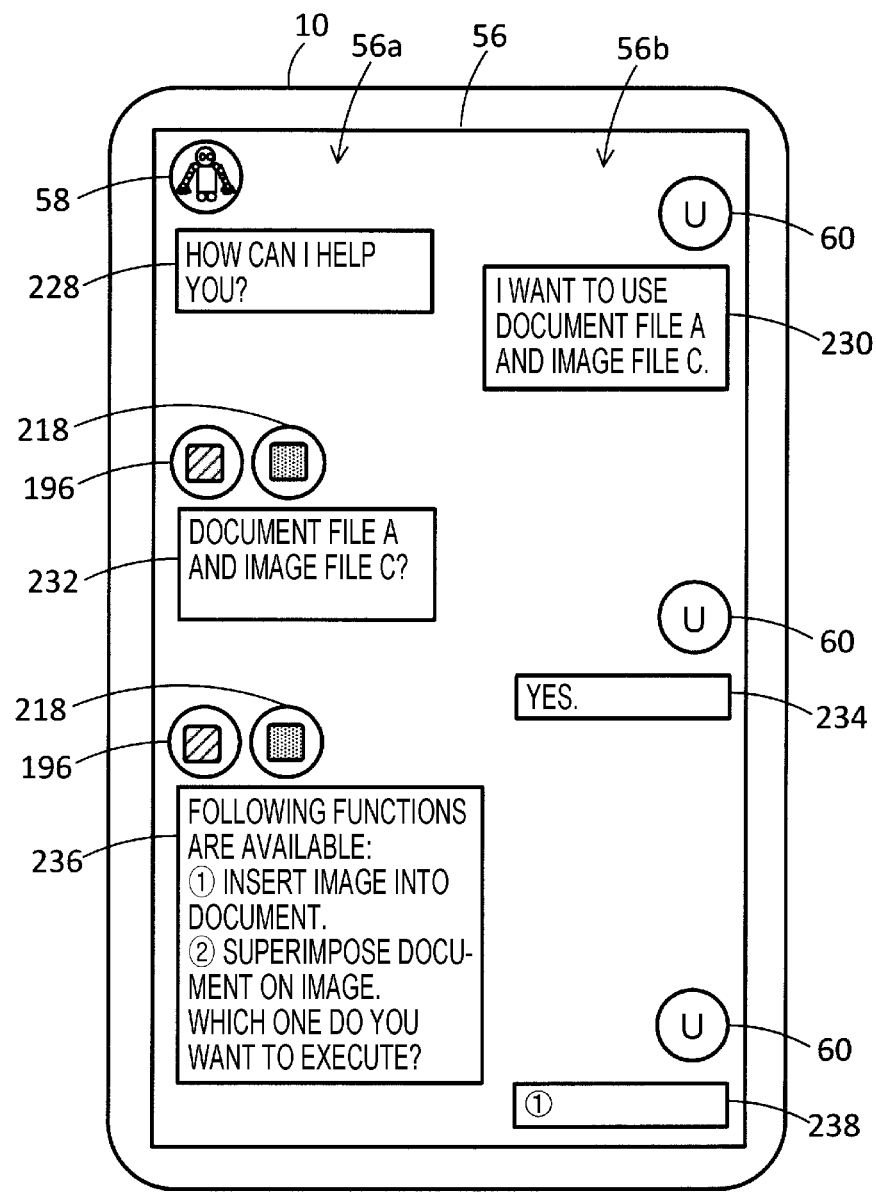
FIG. 26 is a diagram illustrating a screen.

Hereinafter, a thirteenth exemplary embodiment will be described with reference to FIG. 26. FIG. 26 illustrates a screen 56. The screen 56 displays an image 58 associated with the automatic response AI and an image 60 associated with the user are displayed as in FIG. 8, and further displays information indicating the conversation between the user and the automatic response AI.

When the chatting program is activated, a message content 228 such as "How can I help you?" is displayed as a message content of the automatic response AI in the display area 56a.

In the thirteenth exemplary embodiment, similarly to the twelfth exemplary embodiment described above, it is assumed that the user (the terminal device 10) exists in both an area of a document file A and an area of an image file C. In this case, the specifying unit 30 identifies the document file A and image file C as files to be linked and specifies linkage functions associated with the combination of the document file A and the image file C, for example, in the linkage function management table illustrated in FIG. 24. Therefore, the linkage functions executable for the document file A and the image file C are identified.

Further, since the user exists in both areas of the document file A and the image file C, the control unit 26 displays the file image 196 associated with the document file A and the file image 218 associated with the image file C in the display area 56a as images associated with the conversation partner, in place of the image 58 associated with the automatic response AI. The control unit 26 displays a message content 232 for confirming that the document file A and the image file C have been identified as files to be linked in the display area 56a as a message content of the document file A and the image file C.

Further, when the user requests use of a file by making a message such as "I want to use the document file A and the image file C", a character string indicating the request may be displayed as a message content 230 of the user in the display area 56b. When the user inputs the message content 230 to the terminal device 10 as described above, the specifying unit 30 may identify the document file A and the image file C as files to be linked, and the control unit 26 may switch the image 58 associated with the automatic response AI to the file images 196 and 218.

When the user approves with respect to the message content 232 (for example, when the user issues a message content 234 such as "Yes"), the control unit 26 displays the information on the linkage functions executable using the document file A and the image file C in the display area 56a as a message content 236 of the document file A and the image file C. The message content 236 itself is a message content created by the general-purpose automatic response AI. A linkage function to be executed is designated by the message content 238 of the user. The following process is the same as that of the twelfth exemplary embodiment described above.

As described above, according to the thirteenth exemplary embodiment, when a user exists in an area of plural files, the display of the conversation partner who is responding is switched to the display of the plural files. In this manner, the user may visually confirm the conversation partner who is responding.

The conversation partner may be switched from the general-purpose automatic response AI to an automatic response AI of the plural files. Further, when the user exists in an area of three or more files (that is, when the user exists in an area where areas of three or more files overlap each other), the display of the conversation partner is switched to the display of the three or more files. Further, the display example illustrated in FIGS. 13A to 13E may be applied to the thirteenth exemplary embodiment.

Modifications 5 and 6 may be applied to the thirteenth exemplary embodiment. That is, when the user exists in an area of plural files, the control unit 26 receives an execution instruction of linkage functions executable using the plural files, and when the user does not exist in the area of the plural files, the control unit 26 does not receive any execution instruction of the linkage functions executable using the plural files.

Fourteenth Exemplary Embodiment

Hereinafter, a fourteenth exemplary embodiment will be described. In the fourteenth exemplary embodiment, the message content of the automatic response AI changes depending on the position of the user. The message content of the automatic response AI may be changed depending on the position of the user, and the display of the conversation partner may be switched from the display of the general-purpose automatic response AI to the display depending on the position of the user.

For example, management information indicating association between an area and contents provided to the terminal device 10 in the area is prepared in advance, and the management information is stored in the storage unit 24 of the terminal device 10. Of course, the management information may be stored in an external device such as the server 16. In this case, the management information may not be stored in the terminal device 10. Examples of the contents include character information, voice information, image data (still image data or video data), and the like. The contents are, for example, information related to a place. The information related to a place may be information related to the place itself or may be information on a person relating to the place. Information related to a place itself includes, for example, information on a place name, map information, tourist information (for example, information on sightseeing spots), shopping information, information on facilities (shops, accommodations, public facilities, etc.), information on famous products, information on industry, information on traffic guidance, weather information, information on an event occurred at the place (for example, information on a historical incident or the like), and the like. Information on a person is, for example, information on a historical figure (such as a great person or a famous person). The data of the contents may be stored in the storage unit 24 of the terminal device 10 or may be stored in an external device such as the server 16. When the contents are stored in the external device, the terminal device 10 acquires data of the contents from the external device and provides the data to the user. The specifying unit 30 receives the position information of the user (the terminal device 10) and specifies contents associated with an area including the position of the user in the management information. The contents are contents provided to the terminal device 10 at the place where the user is located. For example, contents are prepared for each area, and the contents for each area is provided.

Further, the management information may be information indicating the association between information of an area and a conversation partner displayed on the terminal device 10 in the area, and contents provided to the terminal device 10 at the position. The specifying unit 30 receives the position information of the user and specifies a conversation partner and contents associated with an area including the position of the user in the management information. The control unit 26 provides the contents to the user and switches the display of the conversation partner from the display of the general-purpose automatic response AI to the display of a conversation partner associated with the position of the user.

Figure 27:
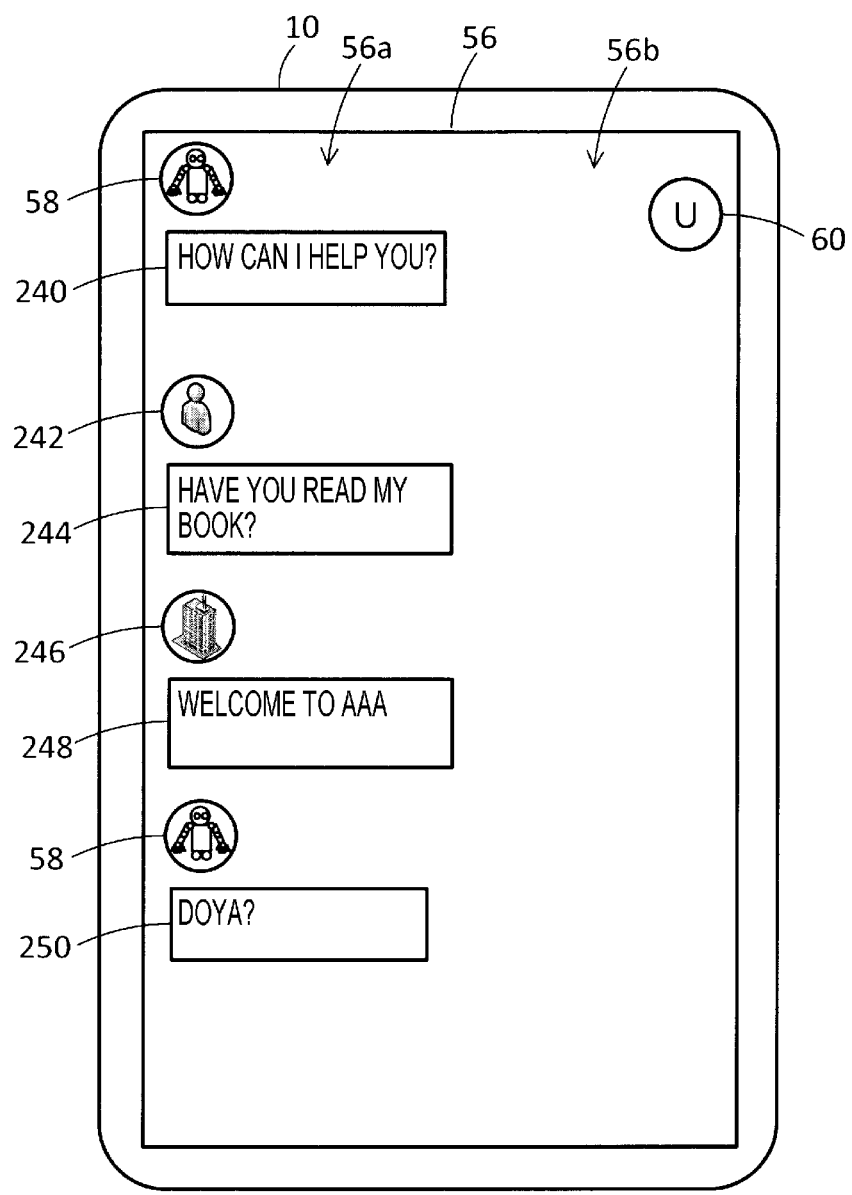
FIG. 27 is a diagram illustrating a screen.

Hereinafter, the fourteenth exemplary embodiment will be described in detail with reference to FIG. 27. FIG. 27 illustrates a screen 56. The screen 56 displays an image 58 associated with the automatic response AI and an image 60 associated with the user are displayed as in FIG. 8, and further displays information indicating the conversation between the user and the automatic response AI.

When the chatting program is activated, a message content 240 such as "How can I help you?" is displayed as a message content of the automatic response AI in the display area 56a.

The position information acquiring unit 28 acquires position information of the terminal device 10 (the user), and the specifying unit 30 identifies the position of the terminal device 10 based on the position information and specifies the contents and the conversation partner associated with the area including the position in the management information.

For example, when the user exists in an area U, the specifying unit 30 specifies the contents and the conversation partner associated with the area U in the above-described management information. It is assumed that the area U is associated with information on a great person Y as a writer as contents information, and a person image associated with the great person Y as an image associated with the conversation partner. In this case, the control unit 26 switches the display of the conversation partner from the display of the general-purpose automatic response AI to the display of the great person Y (for example, a person image associated with the great person Y or a character string indicating the great person Y). Further, the control unit 26 provides contents. The great person Y corresponds to an example of the "partner."

In the example illustrated in FIG. 27, the control unit 26 displays a person image 242 associated with the great person Y in the display area 56a as an image associated with the conversation partner, in place of the image 58 associated with the general-purpose automatic response AI. The person image may be a picture or a moving image representing a person, or a still image or a moving image schematically representing the person.

The control unit 26 may display a character string indicating the great person Y in the display area 56a as information indicating the conversation partner, in place of the person image 242 or along with the person image 242.

Further, the control unit 26 displays, as contents related to the great person Y, a message content 244 such as "Have you read my book?" in the display area 56a as a message content of the great person Y. Further, as contents related to the great person Y, a work such as a novel may be provided to the user via the terminal device 10.

Further, when the user exists in an area V, the specifying unit 30 specifies the contents and the conversation partner associated with the area V in the above-described management information. It is assumed that the area V is associated with information on a commercial facility Z as contents information, and a building image associated with the commercial facility Z as an image associated with the conversation partner. In this case, the control unit 26 switches the display of the conversation partner from the display of the general-purpose automatic response AI to the display of the commercial facility Z (for example, a building image associated with the commercial facility Z or a character string indicating the commercial facility Z). Further, the control unit 26 provides contents. The commercial facility Z corresponds to an example of the "partner."

In the example illustrated in FIG. 27, the control unit 26 displays a building image 246 associated with the commercial facility Z in the display area 56a as an image associated with the conversation partner, in place of the image 58 associated with the automatic response AI. The building image may be a picture or a moving image representing a building such as a facility, or a still image or a moving image schematically representing the building.

The control unit 26 may display a character string indicating the commercial facility Z in the display area 56a as information indicating the conversation partner, in place of the building image 246 or along with the building image 246.

Further, the control unit 26 displays a message content 248 such as "Welcome to AAA (the name of the commercial facility Z)" as contents related to the commercial facility Z, in the display area 56a as a message content of the commercial facility Z. Further, as contents related to the commercial facility Z, service and shopping information provided at the commercial facility Z may be provided to the user via the terminal device 10.

Further, the control unit 26 may change the expression of the message content of the automatic response AI without switching the display of the conversation partner depending on the position of the user. For example, a language or a dialect is associated with each area, and the control unit 26 expresses the message content of the automatic response AI using the language or the dialect associated with the area including the position of the user. For example, when the user is in the Kansai area, the control unit 26 displays a message content 250 expressed by the Kansai dialect in the display area 56a as a message content of the automatic response AI. Further, when the user is in an English speaking area, the control unit 26 displays a message content expressed in English in the display area 56a as a message content of the automatic response AI.

As described above, according to the fourteenth exemplary embodiment, the message content of the conversation partner is changed depending on the position of the user. As a result, information corresponding to the position of the user is provided to the user. Further, the display of the conversation partner who is responding is switched depending on the position of the user. In this manner, the user may visually confirm the conversation partner who is responding.

When the fourteenth exemplary embodiment is applied to, for example, a tourist information service, regional information on sightseeing and the like is provided to the user.

The fourteenth exemplary embodiment is not limited to the above example, but may be applied to a game or the like using the position of the user. For example, information on a character or an item depending on the position of the user may be provided to the user as contents information, or an image associated with the character or the item may be displayed as an image associated with the conversation partner.

Fifteenth Exemplary Embodiment

Hereinafter, a fifteenth exemplary embodiment will be described. In the fifteenth exemplary embodiment, similarly to the fourteenth exemplary embodiment described above, the message content of the automatic response AI is changed depending on the position of the user, and the display of the conversation partner is switched from the display of the automatic response AI to the display according to the position of the user. The process according to the fifteenth exemplary embodiment is a process applied when the user exists in plural areas.

Figure 28:
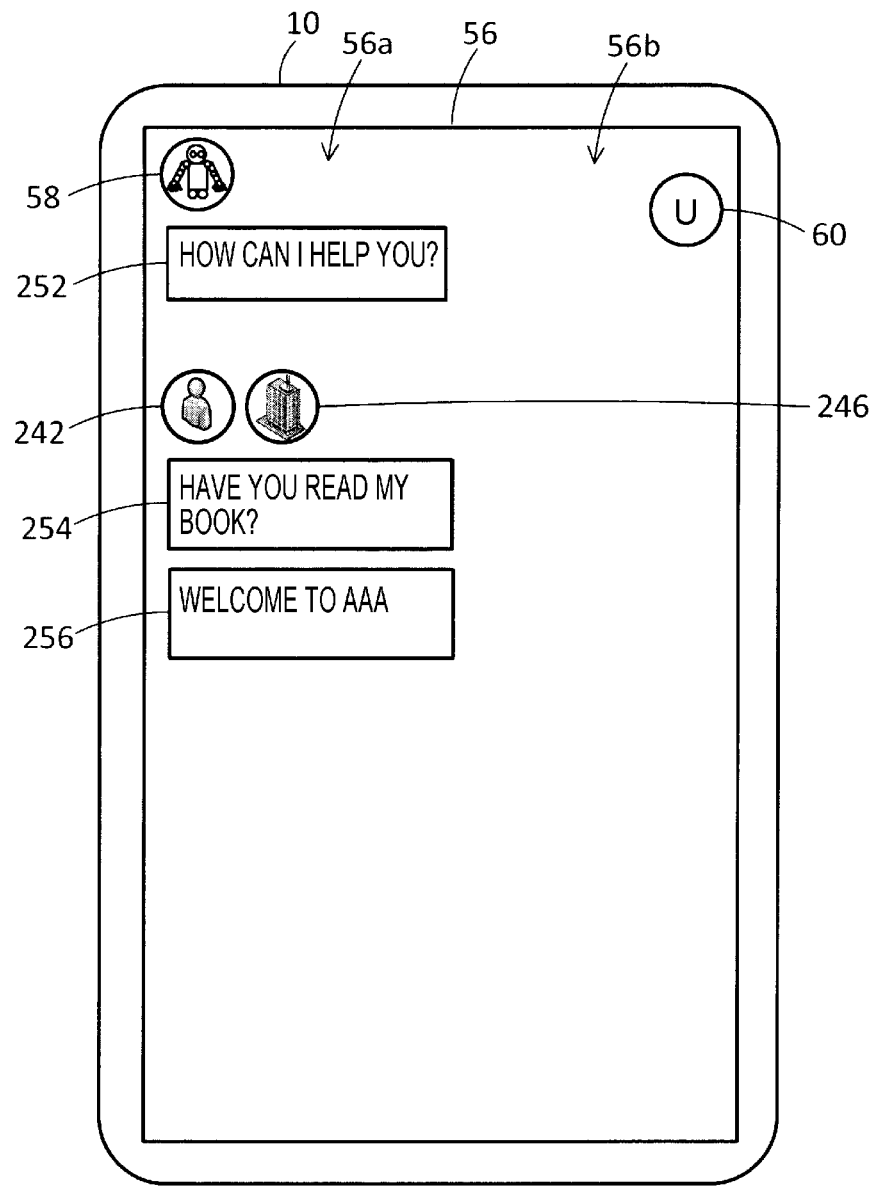
FIG. 28 is a diagram illustrating a screen.

Hereinafter, the fifteenth exemplary embodiment will be described in detail with reference to FIG. 28. FIG. 28 illustrates a screen 56. The screen 56 displays an image 58 associated with the automatic response AI and an image 60 associated with the user are displayed as in FIG. 8, and further displays information indicating the conversation between the user and the automatic response AI.

When the chatting program is activated, a message content 252 such as "How can I help you?" is displayed as a message content of the automatic response AI in the display area 56a.

The position information acquiring unit 28 acquires position information of the terminal device 10 (the user), and the specifying unit 30 identifies the position of the terminal device 10 based on the position information and specifies the contents and the conversation partner associated with the area including the position in the management information according to the fourteenth exemplary embodiment.

For example, when the user exists in areas U and V (that is, when the user exists in an area where the area U and the area V overlap each other), the specifying unit 30 specifies the contents and the conversation partner associated with the area U and also specifies the contents and the conversation partner associated with the area V, in the above-described management information according to the fourteenth exemplary embodiment.

Similarly to the fourteenth exemplary embodiment, information on the great person Y is associated with the area U, and information on the commercial facility Z is associated with the area V. In this case, the control unit 26 switches the display of the conversation partner from the display of the general-purpose automatic response AI to the display of the great person Y and the commercial facility Z.

In the example illustrated in FIG. 28, the control unit 26 displays a person image 242 associated with the great person Y and a building image 246 associated with the commercial facility Z, in the display area 56a as images associated with the conversation partner, in place of the image 58 associated with the automatic response AI.

Further, the control unit 26 displays a message content 254 as contents relating to the great person Y in the display area 56a as a message content of the great person Y and displays a message content 256 as contents relating to the commercial facility Z in the display area 56a as a message content of the commercial facility Z.

The display example illustrated in FIGS. 13A to 13E may also be applied to the fifteenth exemplary embodiment. Further, the control unit 26 may determine the priority order of each partner (for example, the great person Y or the commercial facility Z) based on famousness, evaluation, access number, etc. of the partners, and change the display order and size of the image associated with the partner according to the priority order of the partner. The control unit 26 acquires information such as famousness, evaluation, access number, etc. of each partner using, for example, the Internet, social network service (SNS), or the like, and determines the priority order of each partner. For example, the control unit 26 may display an image associated with the higher-priority partner as being enlarged, or display images associated with the respective partners in the order of priority. For example, the control unit 26 may display an image associated with a partner closer to the user in an enlarged manner, or may display images associated with respective partners in the order of closeness to the user.

Sixteenth Exemplary Embodiment

Hereinafter, a sixteenth exemplary embodiment will be described. In the sixteenth exemplary embodiment, when device identification information is acquired to identify a device, the control unit 26 switches the display of the conversation partner from the display of the general-purpose automatic response AI to the display of the device. Further, the control unit 26 receives an instruction related to the device from the user.

The device identification information is, for example, code information for identifying the device or an external appearance image representing the external appearance of the device. For example, when applying an augmented reality (AR) technology, the device identification information is acquired so that the device is identified. For example, by applying the AR technology, the device identification information of the device used alone is acquired, so that the device is identified, and the device identification information of the device to be linked is acquired, so that the device to be linked is identified. As the AR technology, any known AR technology is used. Examples thereof include a marker AR technique using a marker such as a two-dimensional barcode, a markerless AR technique using an image recognition technology, a position information AR technique using position information, and the like. Of course, the device identification information may be acquired without using the AR technology, and then the device may be identified. For example, when the device is connected to the network, the device may be identified based on the IP address, or the device ID may be read to identify the device. Further, in a case of using a device or a terminal device having various wireless communication functions such as infrared communication, visible light communication, Wi-Fi, Bluetooth, etc., the ID of the device may be acquired using the wireless communication function, so that the device is identified.

Figure 29:
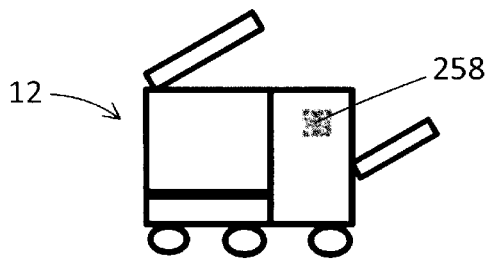
FIG. 29 is a schematic diagram illustrating an external appearance of the image forming device.

Hereinafter, the process of acquiring the device identification information will be described in detail with reference to FIG. 29. As an example, a case of acquiring the device identification information of the image forming device 12 will be described. FIG. 29 schematically illustrates the external appearance of the image forming device 12. Here, a process for acquiring device identification information by applying the marker AR technique will be described. A marker 258 such as a two-dimensional barcode or the like is provided on the casing of the image forming device 12. The marker 258 is information in which the device identification information of the image forming device 12 is encoded. A user activates the camera 22 of the terminal device 10 and captures the marker 258 provided in the image forming device 12 to be used with the camera 22. As a result, image data representing the marker 258 is generated. The control unit 26 of the terminal device 10 extracts the device identification information by applying a decoding process to the marker image represented in the image data. As a result, the image forming device 12 to be used (the image forming device 12 having the captured marker 258) is identified. The specifying unit 30 of the terminal device 10 specifies the function information indicating the function associated with the extracted device identification information in the device function management information. Therefore, the function that the image forming device 12 to be used has is specified (identified). The decoding process may be performed by an external device such as the server 16.

Function information indicating the functions that the image forming device 12 has may be encoded and included in the marker 258. In this case, when the decoding process is applied to the image data representing the marker 258, the device identification information of the image forming device 12 is extracted, and the function information indicating the function that the image forming device 12 has is extracted as well. As a result, the image forming device 12 is specified (identified), and functions that the image forming device 12 has are specified (identified). The decoding process may be performed by the terminal device 10 or may be performed by the server 16.

Further, the device identification information of each of plural devices is acquired by capturing a marker of each of the plural devices.

In a case of acquiring the device identification information by applying the markerless AR technique, for example, the user captures the entirety or a part of the external appearance of the device to be used (for example, the image forming device 12) by the camera 22 of the terminal device 10. Of course, it is useful to acquire information for specifying devices such as the name (for example, product name) of a device to be used, a model number, or an asset management number, by capturing the external appearance. External appearance image data representing the entirety or a part of the external appearance of the device to be used is generated by image capturing. The control unit 26 of the terminal device 10 identifies the device to be used based on the external appearance image data. For example, the storage unit 24 of the terminal device 10 stores, for each device, external appearance image association information indicating the association between the external appearance image data representing the entirety or a part of the external appearance of the device and the device identification information of the device. For example, the control unit 26 compares the external appearance image data with each external appearance image data included in the external appearance image association information, and specifies the device identification information of the device to be used based on the comparison result. For example, the control unit 26 extracts features of the external appearance of the device to be used from the appearance image data, specifies the external appearance image data representing the same or similar features as the features of the external appearance in the external appearance image data group included in the external appearance image association information, and specifies the device identification information associated with the external appearance image data. As a result, the device to be used (the device captured by the camera 22) is identified. As another example, when the name (for example, product name) or model number of the device is captured and external appearance image data representing the name or model number is generated, the device to be used may be identified based on the name or model number indicated in the external appearance image data. The specifying unit 30 of the terminal device 10 specifies the function information indicating the functions associated with the specified device identification information in the device function management information. Therefore, the functions that the device to be used (for example, the image forming device 12) has are specified. An external device such as the server 16 may specify the device identification information of the device based on the external appearance image data.

The device identification information of each of plural devices is acquired by capturing the entirety or a part of the external appearance of each of the plural devices.

When acquiring the device identification information by applying the position information AR technique, position information indicating the position where the device (for example, the image forming device 12) is installed is acquired by using, for example, the GPS function. For example, each device has the GPS function and acquires device position information indicating the position of the device itself. The terminal device 10 outputs information indicating a device position information acquisition request to the device to be used, and receives device position information of the device from the device as a response to the acquisition request. The control unit 26 of the terminal device 10 identifies the device to be used based on the device position information. For example, the storage unit 24 of the terminal device 10 stores, for each device, position association information indicating the association between the device position information indicating the position where the device is installed and the device identification information of the device. The control unit 26 specifies the device identification information associated with the device position information in the position association information. Therefore, the device to be used is specified (identified). The specifying unit 30 of the terminal device 10 specifies the function information indicating the functions associated with the specified device identification information in the device function management information. Therefore, the function that the device to be used (for example, the image forming apparatus 12) has is specified (identified). An external device such as the server 16 may specify the device based on the device position information.

Device position information of each of plural devices is acquired, and device identification information of each device is specified based on each piece of the device position information.

Plural identification techniques may be used to identify devices. For example, a device may be identified using plural techniques selected from the marker AR technique, the markerless AR technique, and the position information AR technique. Further, when a device cannot be identified by a certain identification technique, the device may be identified using another identification technique. For example, when a device cannot be identified by the marker AR technique or the markerless AR technique, the device may be identified using the position information AR technique.

When respective devices are identified by the marker AR technique or the markerless AR technique, each device may be captured separately and identified, or may be captured together and identified. For example, the multifunction device (B) is captured in a state where the multifunction device (B) is included in the image capturing area of the camera 22, and then, the PC (A) is captured in a state where the PC (A) is included in the image capturing area of the camera 22, so that the multifunction device (B) and the PC (A) are sequentially identified. It is not necessary that the respective devices to be linked are arranged close to each other and both the multifunction device (B) and the PC (A) are included together in the capturing area of the camera 22. This circumstance may be coped with by, for example, changing the angle of the capturing area, or enlarging or reducing the capturing area. However, there may be cases where such operation may not cope with the circumstance. In this case, the respective devices are identified by capturing the devices plural times.

For example, when the user captures the marker 258 of the image forming device 12 with the camera 22 after the automatic response AI issues a common message content such as "How can I help You?" on the screen 56, the specifying unit 30 reads the device identification information from the marker 258 by applying the marker AR technique, and identifies the image forming device 12. When the image forming device 12 is identified, the control unit 26 switches the image associated with the conversation partner from the image 58 of the general-purpose automatic response AI to the device image associated with the image forming device 12. Further, the control unit 26 receives an instruction related to the image forming device 12 from the user. In the case where the device identification information is read so that the device is identified, for example as in the example illustrated in FIG. 8, the message content 68 is displayed in the display area 56a. Further, when the user inputs the message content 70, the control unit 26 receives the message content 70. That is, when the device identification information is acquired and the device is identified, the control unit 26 receives the message content of the user with respect to the device. Thereafter, printing is performed, and the message content 72 is displayed in the display area 56a.

Meanwhile, in a case where the marker 258 is not captured and the device identification information is not read from the marker 258, the control unit 26 displays the image 58 associated with the general-purpose automatic response AI in the display area 56a as an image associated with the conversation partner without switching the image associated with the conversation partner, and does not receive an instruction related to the image forming device 12 from the user. In the example illustrated in FIG. 8, the message contents 68 and 72 are not displayed, and even though the user inputs the message content 70 into the terminal device 10, the control unit 26 does not receive the message content 70. A common message content such as "How can I help you?" is displayed as a message content of the automatic response AI.

Even when the markerless AR technique or the position information AR technique is used, the same process as in the case where the marker AR technique is used is performed.

As described above, according to the sixteenth exemplary embodiment, when the device identification information of the device is read, the display of the conversation partner is switched from the display of the automatic response AI to the display of the device, and an instruction with respect to the device is received. In this manner, the user may visually confirm the conversation partner who is responding, and a secure environment for the device is constructed.

Further, by using the marker AR technique or the markerless AR technique, it is possible to identify and use the device even when the position information of the device cannot be acquired.

The sixteenth exemplary embodiment may be applied to the case where a linkage function is executed. That is, when the device identification information of each of plural devices is read, the display of the conversation partner is switched from the display of the automatic response AI to the display of the plural devices, and an instruction related to a linkage function executable using the plural devices is received. In this manner, the user may visually confirm the conversation partner who is responding even when a linkage function is executed, and a secure environment for the plural devices is constructed.

The same process as described above may be performed when using functions that the device has, software installed in the device, or files stored in the device. That is, when the device identification information of the device is read and the device is identified, it is possible to use the function that the device has, the software installed in the device, and the files stored in the device. Meanwhile, when the device identification information of the device is not read and the device is not identified, the use of the functions, the software, or the files is prohibited.

Seventeenth Exemplary Embodiment

Hereinafter, a seventeenth exemplary embodiment will be described. In the seventeenth exemplary embodiment, the control unit 26 acquires information indicating the state of the device (status information), and switches the display of the conversation partner who is responding from the display of the general-purpose automatic response AI to the display of the device in which the state is reflected.

Figure 30:
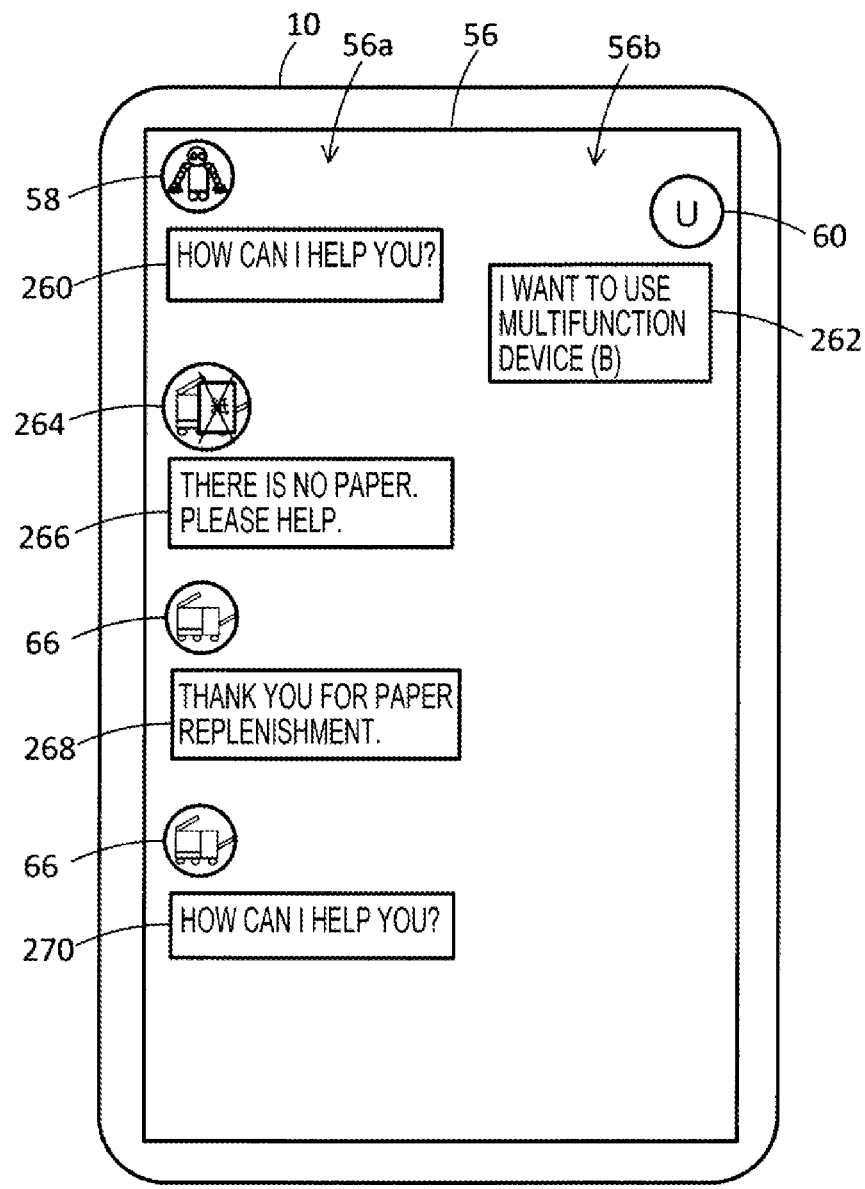
FIG. 30 is a diagram illustrating a screen.

Hereinafter, the seventeenth exemplary embodiment will be described in detail with reference to FIG. 30. FIG. 30 illustrates a screen 56. The screen 56 displays an image 58 associated with the automatic response AI and an image 60 associated with the user are displayed as in FIG. 8, and further displays information indicating the conversation between the user and the automatic response AI.

When the chatting program is activated, a message content 260 such as "How can I help you?" is displayed as a message content of the automatic response AI in the display area 56a.

For example, it is assumed that the user gives an instruction to use the multifunction device (B) to the automatic response AI by inputting a message content 262 such as "I want to use the multifunction device (B)" to the terminal device 10. The control unit 26 transmits the message content 262 to the automatic response AI.

Upon receiving the message content 262, the control unit 26 acquires information indicating the state of the multifunction device (B) (status information) from the multifunction device (B). Of course, when the state of the device is managed by an external device such as the server 16 or the like, the control unit 26 may acquire the status information of the multifunction device (B) from the external device.

For example, in a case where no paper is accommodated in the multifunction device (B), the status information of the multifunction device (B) includes information indicating the status.

The control unit 26 identifies the state of the multifunction device (B) by analyzing the status information of the multifunction device (B). For example, in a case where the status information of the multifunction device (B) includes information indicating that no paper is accommodated, the control unit 26 identifies that no paper is accommodated in the multifunction device (B). In this case, the control unit 26 switches the display of the conversation partner who is responding from the display of the general-purpose automatic response AI to the display of the multifunction device (B) in which the state where no paper is accommodated is reflected. In the example illustrated in FIG. 30, the control unit 26 displays a device image 264 associated with the multifunction device (B) in which the state is reflected, in the display area 56*a* as an image associated with the conversation partner who is responding. The device image 264 is an image representing the multifunction device (B) and indicating the state where no paper is accommodated in the multifunction device (B). Of course, the control unit 26 may output character information or voice information indicating a state where no paper is accommodated in the multifunction device (B), in place of the device image 264 or along with the device image 264.

Further, the control unit 26 notifies the user that there is no paper by displaying a message content 266 indicating that no paper is accommodated in the multifunction device (B) in the display area 56*a* as a message content of the multifunction device (B).

The control unit 26 acquires the status information from the multifunction device (B), for example, at predetermined time intervals. When the multifunction device (B) is replenished with paper, the control unit 26 acquires from the multifunction device (B) status information including information indicating that paper has been replenished. In this case, the control unit 26 displays the device image 66 associated with the multifunction device (B) in the normal state in the display area 56*a* as an image associated with the conversation partner who is responding. Further, the control unit 26 displays a message content 268 indicating that paper has been replenished in the display area 56*a* as a message content of the multifunction device (B). Thereafter, as a normal operation, the control unit 26 displays a message content 270 as a common question such as "How can I help you?" in the display area 56*a* as a message content of the multifunction device (B). The following process is the same as that of the first exemplary embodiment.

As described above, according to the seventeenth exemplary embodiment, the user may visually confirm the state of the device.

As the status information indicating the state of the device, for example, information indicating that the device is in failure, information indicating that the device is in a sleep state, information indicating that the device is in use, information indicating that the device is in maintenance, information on consumables equipped in the device (for example, information on the remaining amount of consumables), and the like may be acquired. The control unit 26 performs display depending on each state of the device. For example, the control unit 26 changes the device image for each state and displays the device image in the display area 56*a*.

Further, the control unit 26 acquires information indicating the state of the function (status information), and switches the display of the conversation partner who is responding from the display of the general-purpose automatic response AI to the display of the function in which the state is reflected. As the status information indicating the state of the function, for example, information indicating that the function is stopped, information indicating that the function is in a sleep state, information indicating that the function is in use, information indicating that the function is being updated, information on the expiration date of the function, and the like may be acquired. The control unit 26 performs display depending on each state of the function. For example, the control unit 26 changes the function image for each state and displays the function image in the display area 56*a*.

Other Exemplary Embodiments

The combinations of objects to be linked described above are not limited to the combinations in the above-described exemplary embodiments. For example, when at least two combinations among devices, functions (including functions executed by devices and functions executed by software), files, and software are identified as objects to be linked, notification of linkage functions executable using the combinations may be controlled. For example, when a device image and a file image are identified as objects to be linked, the specifying unit 30 specifies linkage functions executable using the device associated with the device image and the file associated with the file image, and as a notification of information on the linkage functions, the control unit 26 may display the information on the linkage functions on the screen 56 as a message content of the automatic response AI, or may output the information on the linkage functions as voice information. As a specific example, when a device image associated with the multifunction device (B) and a file image associated with a document file are transmitted to the automatic response AI as information on objects to be linked, the specifying unit 30 specifies linkage functions executable using the multifunction device (B) and the document file (for example, a function of printing the document file by the multifunction device (B), a function of facsimile transmitting the document file by the multifunction device (B), etc.). The control unit 26 controls the notification of the information on the linkage functions. Similarly, when a function image associated with software and a file image are transmitted to the automatic response AI as information on objects to be linked, the specifying unit 30 may specify linkage functions executable using the function associated with the function image and the file associated with the file image, and the control unit 26 may control notification of the information on the linkage functions. As a specific example, when a function image associated with a document application and a file image associated with a document file are transmitted to the automatic response AI as information on objects to be linked, the specifying unit 30 specifies linkage functions executable using the document application and the document file (for example, a function of editing or outputting the document file by the document application, etc.). Further, when a device image, a function image, and a file image are transmitted to the automatic response AI as information on objects to be linked, the specifying unit 30 may specify linkage functions executable using the device associated with the device image, the function associated with the function image (for example, software), and the file associated with the file image, and the control unit 26 may control notification of the information on the linkage functions. As a specific example, when a device image associated with the multifunction device (B), a function image associated with a document application, and a file image associated with a document file are transmitted to the automatic response AI as information on objects to be linked, the specifying unit 30 specifies linkage functions executable using the multifunction device (B), the document application, and the document file (for example, a function of editing the document file by a document application and outputting it to the multifunction device (B), and printing and facsimile transmitting of the document file by the multifunction device (B), etc.). The combinations in the above-described specific examples are merely illustrative, and linkage functions executable by combining devices, functions, files, and software other than those described above may be determined. Further, the information of the device, the function, the file, and the software may be transmitted to the automatic response AI by voice.

Further, when the above-described combination is identified as objects to be linked, the control unit 26 switches the display of the conversation partner who is responding from the display of the general-purpose automatic response AI to the display of the combination. For example, when a device and a file are identified as objects to be linked, the control unit 26 displays a device image associated with the device and a file image associated with the file in the display area 56a as images associated with the conversation partner who is responding. The same applies to other combinations.

Each of the terminal device 10, the devices 12 and 14, and the server 16 is implemented by, for example, cooperation of hardware and software. Specifically, each of the terminal device 10, the devices 12 and 14, and the server 16 includes one or plural processors such as CPUs (not illustrated). As the one or plural processors read and execute a program stored in the storage device (not illustrated), the functions of each unit of the terminal device 10, the devices 12 and 14, and the server 16 are implemented. The program is stored in a storage device via a recording medium such as a CD or a DVD, or via a communication path such as a network. As another example, each unit of the terminal device 10, the devices 12 and 14, and the server 16 may be implemented by hardware resources such as a processor, an electronic circuit, an application specific integrated circuit (ASIC), or the like. A device such as a memory may be used in the implementation. As still another example, each unit of the terminal device 10, the devices 12 and 14, and the server 16 may be implemented by a digital signal processor (DSP), a Field programmable gate array (FPGA), or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
a communication unit capable of communicating with a plurality of devices;
a display unit, used as a screen for showing a conversation between a user using the information processing device and a first conversation partner which is an automatic response artificial intelligence (AI) implemented in the information processing device; and
a controller that includes a processor that implement the automatic response artificial intelligence and is configured to
acquire position information of the information processing device and position information of each of the plurality of devices,
specify a positional relationship by calculating a distance between the information processing device and each of the plurality of devices based on the acquired position information of the information processing device and the acquired position information of each of the plurality of devices,
determine whether the information processing device exists in a predetermined area in which at least one of the plurality of devices is located based on the positional relationship,
when the information processing device is determined to be existed in the predetermined area of the one of the plurality of devices in which the distance between the information processing device and the one of the plurality of devices is equal to or less than a threshold value, the first conversation partner issues a message content to ask the user's request, the user identifies and selects the one of the plurality of devices in response to the message content issued by the first conversation partner, and
the controller controls the display unit to change display of the first conversation partner who is responding in an interface for the user to display of a second conversation partner who corresponds to the one of the plurality of devices with the predetermined area, so as to make a conversation with the second conversation partner of the one of the plurality of devices.

2. The information processing device according to claim 1, wherein depending on the positional relationship between the information processing device and at least one device as the second conversation partner, the controller controls the display unit to change the display of the first conversation partner who is responding, to display of the at least one device.

3. The information processing device according to claim 2, wherein
the at least one device is included in the plurality of devices, and
depending on the positional relationship between the information processing device and the plurality of devices, the controller controls the display unit to change the display of the first conversation partner who is responding, to display of the one of the plurality of devices.

4. The information processing device according to claim 3, wherein the controller controls the display unit to change the display of the conversation partner who is responding, to display of a device closest to the user among the plurality of devices.

5. The information processing device according to claim 2, wherein
the at least one device is included in the plurality of devices, and
depending on the positional relationship between the information processing device and the plurality of devices, the controller controls the communication unit to notify the user of information of the plurality of devices as candidates of the second conversation partner.

6. The information processing device according to claim 5, wherein the controller controls the display unit to change the display of the first conversation partner who is responding, to display of a device selected by the user from the plurality of devices.

7. The information processing device according to claim 2, wherein depending on the positional relationship between the information processing device and the at least one device, the controller further controls an output of an instruction related to the at least one device to the second conversation partner who is responding.

8. The information processing device according to claim 1, wherein the controller controls the display unit to change the display of the first conversation partner who is responding, to display of a function usable at a position of the information processing device.

9. The information processing device according to claim 1, wherein the controller controls the display unit to change the display of the first conversation partner who is responding, to display of a file usable at a position of the information processing device.

10. The information processing device according to claim 1, wherein depending on the position of the information processing device, the controller further controls the display unit to change a message content of the first conversation partner who is responding.

11. An information processing device comprising:
a communication unit capable of communicating with a plurality of devices;
a display unit, used as a screen for showing a conversation between a user using the information processing device and a first conversation partner which is an automatic response artificial intelligence (AI) implemented in the information processing device; and
a controller that includes a processor that implement the automatic response artificial intelligence and is configured to
acquire position information of the information processing device and position information of each of the plurality of devices,
specify a positional relationship by calculating a distance between the information processing device and each of the plurality of devices based on the acquired position information of the information processing device and the acquired position information of each of the plurality of devices,
determine whether the information processing device exists in a predetermined area in which at least one of the plurality of devices is located based on the positional relationship,
when the information processing device is determined to be existed in the predetermined area of the one of the plurality of devices in which the distance between the information processing device and the one of the plurality of devices is equal to or less than a threshold value, the first conversation partner issues a message content to ask the user's request, the user identifies and selects the one of the plurality of devices in response to the message content issued by the first conversation partner, and
the controller controls the display unit to change a message content of the first conversation partner who is responding in an interface for the user to display of a second conversation partner who corresponds to the one of the plurality of devices with the predetermined area, so as to make a conversation with the second conversation partner of the one of the plurality of devices.

12. The information processing device according to claim 11, wherein when the user exists in the predetermined area including the second conversation partner of the one of the plurality of devices, the controller controls the display unit to change the message content of the first conversation partner who is responding, to a message content of the second conversation partner of the one of the plurality of devices.

13. The information processing device according to claim 11, wherein the second conversation partner of the one of the plurality of devices is related to a position of the information processing device.

14. The information processing device according to claim 11, wherein the controller further controls the display unit to express the message content of the first conversation partner who is responding, using a language depending on a position of the information processing device.

15. A non-transitory computer readable medium storing a program causing an information processing device to execute information processing,
wherein the information processing device comprises a communication unit capable of communicating with a plurality of devices; a display unit, used as a screen for showing a conversation between a user using the information processing device and a first conversation partner which is an automatic response artificial intelligence (AI) implemented in the information processing device; and a controller that includes the processor that implement the automatic response artificial intelligence,
the information processing executed by the processor comprising:
acquiring position information of the information processing device and position information of each of the plurality of devices,
specifying a positional relationship by calculating a distance between the information processing device and each of the plurality of devices based on the acquired position information of the information processing device and the acquired position information of each of the plurality of devices,
determining whether the information processing device exists in a predetermined area in which at least one of the plurality of devices is located based on the positional relationship,
when the information processing device is determined to be existed in the predetermined area of the one of the plurality of devices in which the distance between the information processing device and the one of the plurality of devices is equal to or less than a threshold value, the first conversation partner issues a message content to ask the user's request, the user identifies and selects the one of the plurality of devices in response to the message content issued by the first conversation partner, and the controller controls the display unit to change display of the first conversation partner who is responding in an interface for the user to display of a second conversation partner who corresponds to the one of the plurality of devices with the predetermined area, so as to make a conversation with the second conversation partner of the one of the plurality of devices.

16. A non-transitory computer readable medium storing a program causing an information processing device to execute information processing,
wherein the information processing device comprises a communication unit capable of communicating with a plurality of devices; a display unit, used as a screen for showing a conversation between a user using the information processing device and a first conversation partner which is an automatic response artificial intelligence (AI) implemented in the information processing device; and a controller that includes the processor that implement the automatic response artificial intelligence, the information processing executed by the processor comprising:

acquiring position information of the information processing device and position information of each of the plurality of devices, specifying a positional relationship by calculating a distance between the information processing device and each of the plurality of devices based on the acquired position information of the information processing device and the acquired position information of each of the plurality of devices, determining whether the information processing device exists in a predetermined area in which at least one of the plurality of devices is located based on the positional relationship, when the information processing device is determined to be existed in the predetermined area of the one of the plurality of devices in which the distance between the information processing device and the one of the plurality of devices is equal to or less than a threshold value, the first conversation partner issues a message content to ask the user's request, the user identifies and selects the one of the plurality of devices in response to the message content issued by the first conversation partner, and the controller controls the display unit to change a message content of the first conversation partner who is responding in an interface for the user to a message content of a second conversation partner who corresponds to the one of the plurality of devices with the predetermined area, so as to make a conversation with the second conversation partner of the one of the plurality of devices.

* * * * *